US010544753B2

(12) United States Patent
Filippone

(10) Patent No.: US 10,544,753 B2
(45) Date of Patent: Jan. 28, 2020

(54) WASTE HEAT RECOVERY AND CONVERSION

(71) Applicant: Claudio Filippone, College Park, MD (US)

(72) Inventor: Claudio Filippone, College Park, MD (US)

(*) Notice: Subject to any disclaimer, the term of this patent is extended or adjusted under 35 U.S.C. 154(b) by 139 days.

(21) Appl. No.: 15/547,767

(22) PCT Filed: Feb. 1, 2016

(86) PCT No.: PCT/US2016/015963
§ 371 (c)(1),
(2) Date: Jul. 31, 2017

(87) PCT Pub. No.: WO2016/123614
PCT Pub. Date: Aug. 4, 2016

(65) Prior Publication Data
US 2018/0051652 A1 Feb. 22, 2018

Related U.S. Application Data

(60) Provisional application No. 62/125,743, filed on Jan. 30, 2015, provisional application No. 62/110,596, filed on Feb. 1, 2015.

(51) Int. Cl.
*F02G 5/02* (2006.01)
*F01K 23/10* (2006.01)
*F01N 5/02* (2006.01)

(52) U.S. Cl.
CPC ............... *F02G 5/02* (2013.01); *F01K 23/10* (2013.01); *F01N 5/02* (2013.01)

(58) Field of Classification Search
CPC ............... F02G 5/02; F01N 5/02; F01K 23/10
See application file for complete search history.

(56) References Cited

U.S. PATENT DOCUMENTS

| 4,366,674 A | 1/1983 | Eakman |
| 4,517,799 A | 5/1985 | Hanaoka et al. |
| (Continued) | | |

FOREIGN PATENT DOCUMENTS

| JP | 2012184697 A | * | 9/2012 |
| WO | 2013/019761 A1 | | 2/2013 |

OTHER PUBLICATIONS

JP-2012184697-A English Translation (Year: 2012).*

*Primary Examiner* — Mark A Laurenzi
*Assistant Examiner* — Shafiq Mian

(57) ABSTRACT

Embodiments in accordance with the present disclosure provide systems and methods for a waste heat recovery and conversion. The waste heat recovery and conversion system includes a housing non-invasively mountable onto an engine. The waste heat recovery and conversion system also includes a power conversion unit (PCU) entirely within the housing. The PCU includes heat exchangers, an expander, an electrical power generator, and a fluid pump. The heat exchangers, the expander, the fluid pump, and the fluid reservoir form a thermodynamic loop that drives the electrical power generator using thermal energy from waste heat. Under various configurations the waste heat recovery and conversion system offer pollutant reduction features all together with fuel savings.

18 Claims, 43 Drawing Sheets

(56) References Cited

U.S. PATENT DOCUMENTS

| | | | | |
|---|---|---|---|---|
| 4,992,669 A * | 2/1991 | Parmley | ............ | F01B 1/12 123/2 |
| 4,996,845 A | 3/1991 | Kim | | |
| 5,327,987 A * | 7/1994 | Abdelmalek | ............ | B60K 6/24 180/65.25 |
| 5,517,822 A * | 5/1996 | Haws | ............ | F01K 17/025 122/1 R |
| 6,374,613 B1 | 4/2002 | Filippone | | |
| 6,729,137 B2 | 5/2004 | Filippone | | |
| 6,748,906 B1 * | 6/2004 | White | ............ | F01P 3/207 123/41.01 |
| 6,895,903 B2 * | 5/2005 | Campion | ............ | F02B 63/04 123/2 |
| 7,272,932 B2 | 9/2007 | Watson et al. | | |
| 7,430,865 B2 | 10/2008 | Filippone | | |
| 8,336,311 B2 * | 12/2012 | Ogino | ............ | F01D 15/10 60/670 |
| 9,097,205 B2 | 8/2015 | Filippone | | |
| 9,145,149 B2 * | 9/2015 | Frazier | ............ | B61C 3/00 |
| 9,618,273 B2 | 4/2017 | Filippone | | |
| 2002/0174796 A1 * | 11/2002 | Kumar | ............ | B60L 7/12 105/26.05 |
| 2003/0033994 A1 * | 2/2003 | Campion | ............ | F02B 63/04 123/41.56 |
| 2004/0104577 A1 * | 6/2004 | Alger | ............ | F02B 63/04 290/1 A |
| 2005/0109031 A1 * | 5/2005 | Inaba | ............ | B60H 1/00878 60/670 |
| 2005/0279242 A1 * | 12/2005 | Maier | ............ | B60L 7/04 105/26.05 |
| 2006/0112693 A1 * | 6/2006 | Sundel | ............ | F01K 15/00 60/670 |
| 2006/0260562 A1 * | 11/2006 | Otterstrom | ............ | F02B 47/02 123/3 |
| 2007/0012492 A1 * | 1/2007 | Deng | ............ | B60K 6/26 180/65.1 |
| 2007/0187957 A1 * | 8/2007 | Harrison | ............ | F03G 7/08 290/1 R |
| 2010/0005775 A1 * | 1/2010 | Kipping | ............ | F01K 15/02 60/39.182 |
| 2010/0060093 A1 * | 3/2010 | Hunter | ............ | B60L 8/003 310/89 |
| 2011/0278859 A1 * | 11/2011 | Taylor | ............ | F01K 13/02 290/1 R |
| 2012/0272648 A1 * | 11/2012 | Ast | ............ | F01K 13/00 60/645 |
| 2014/0075970 A1 * | 3/2014 | Benson | ............ | F25B 27/02 62/79 |
| 2014/0137554 A1 | 5/2014 | Ernst et al. | | |
| 2014/0165562 A1 * | 6/2014 | Nagai | ............ | F01P 7/165 60/615 |
| 2015/0000274 A1 * | 1/2015 | Ernst | ............ | B60H 1/00878 60/616 |
| 2015/0300291 A1 * | 10/2015 | Yamanaka | ............ | F02G 5/02 60/618 |

* cited by examiner

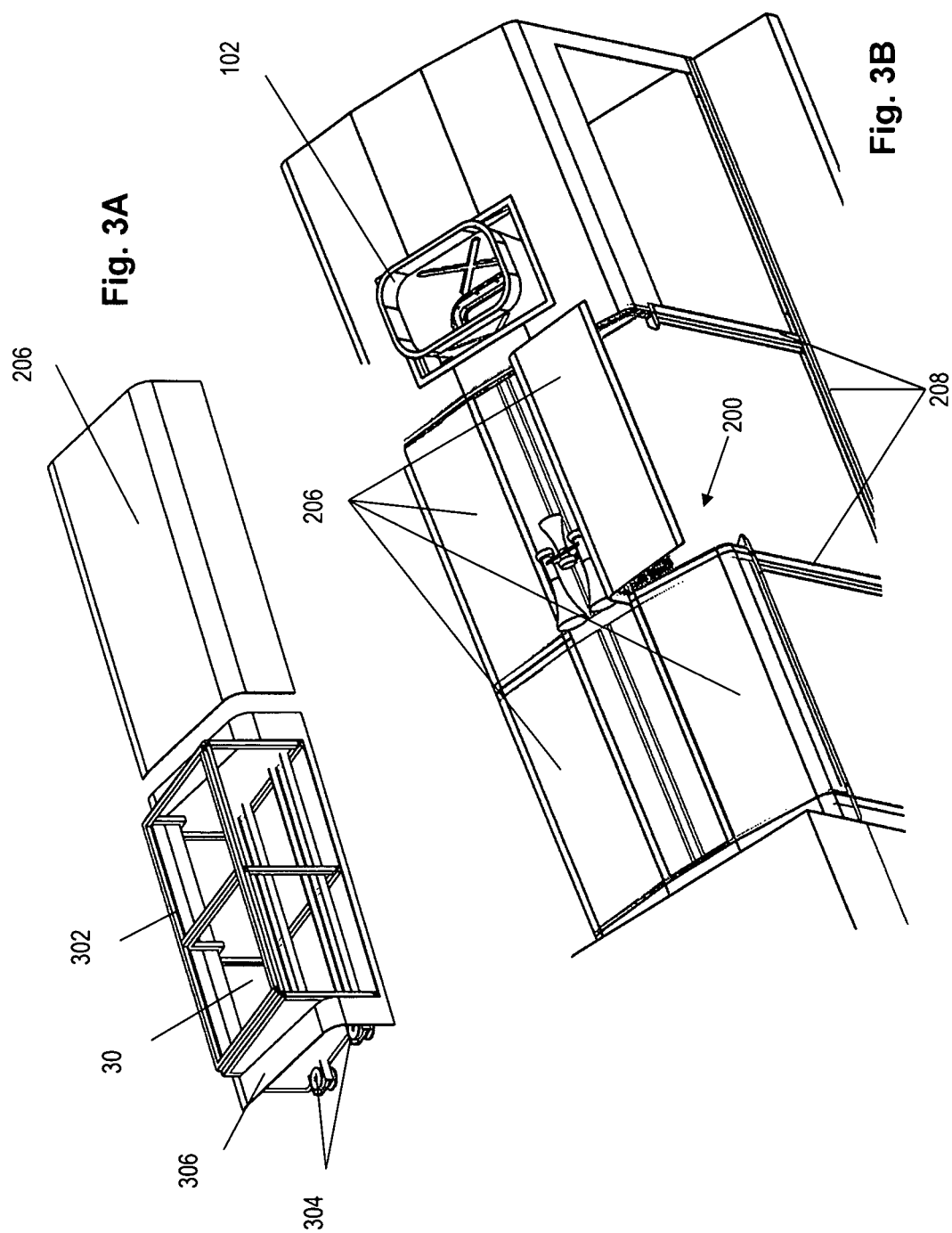

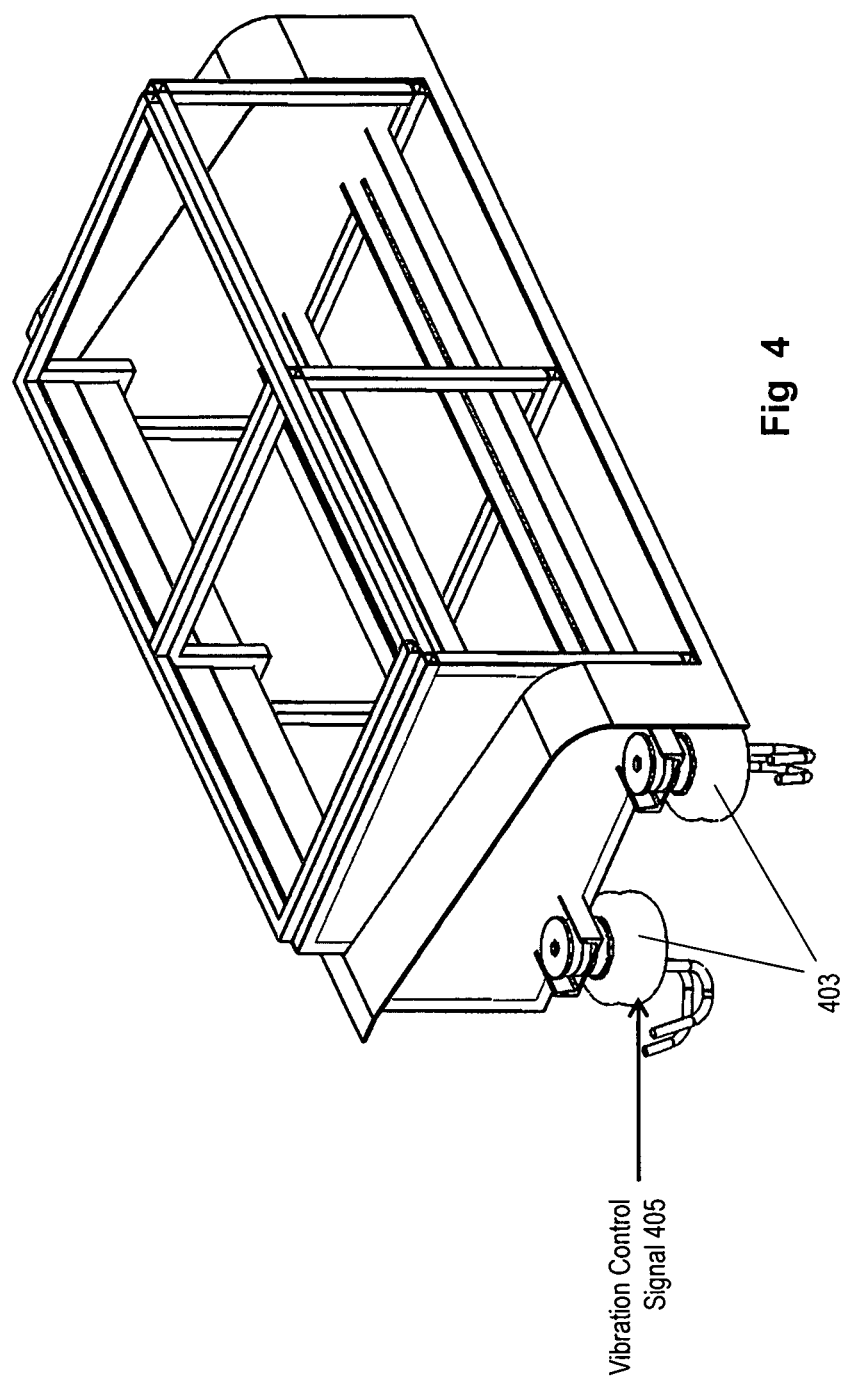

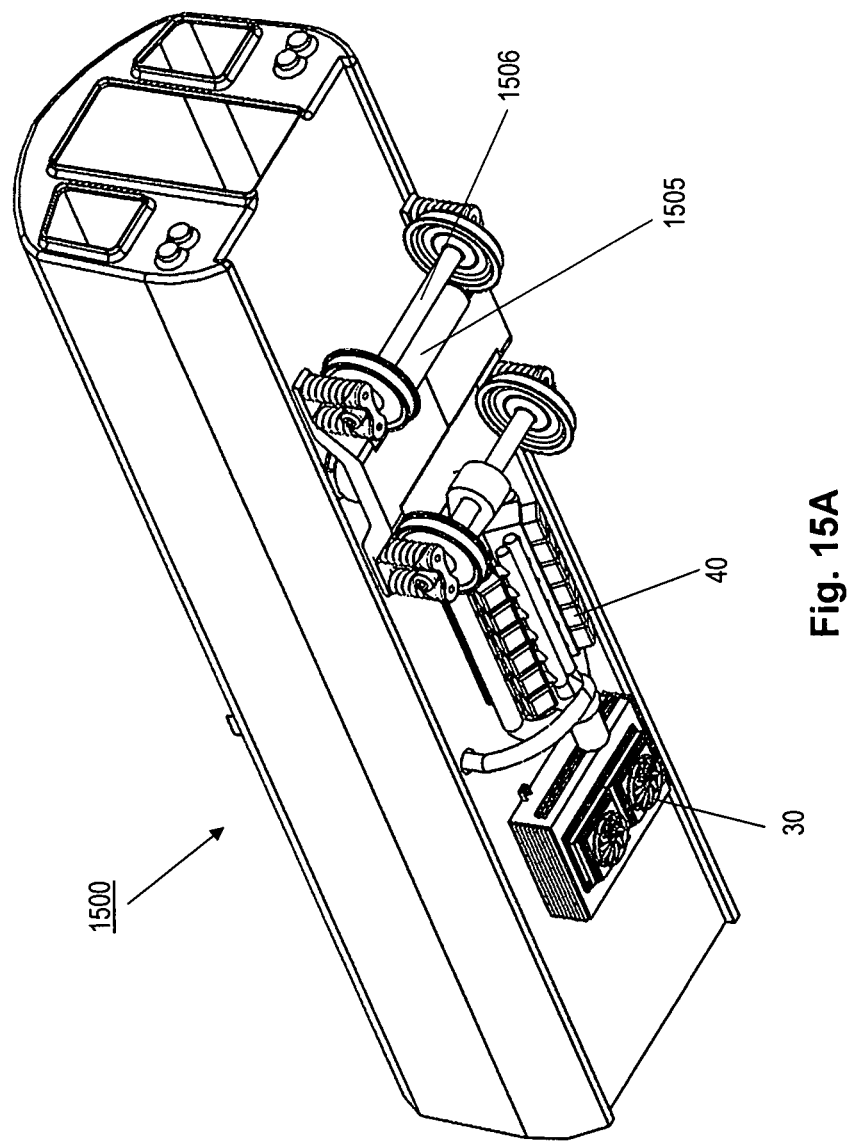

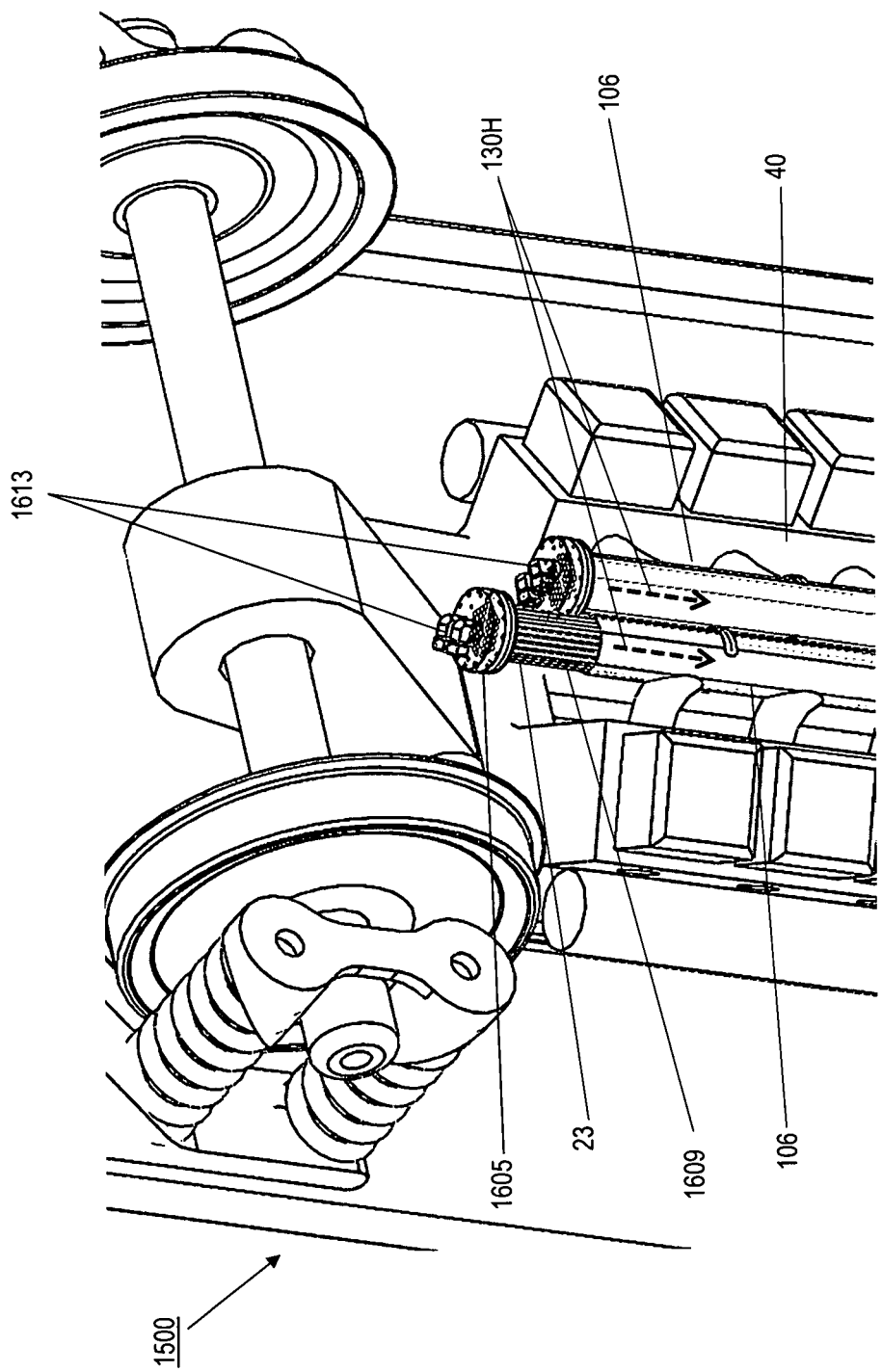

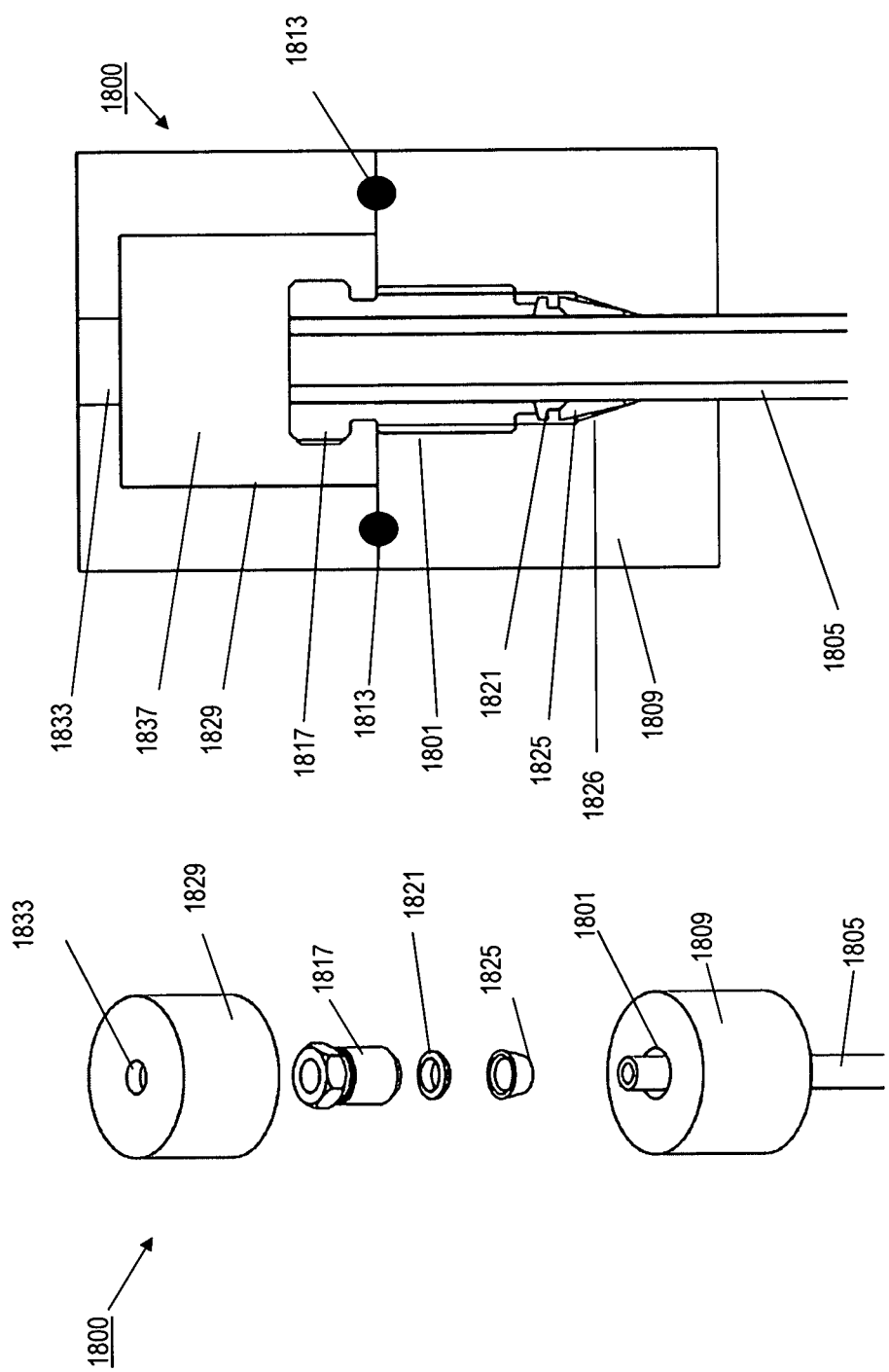

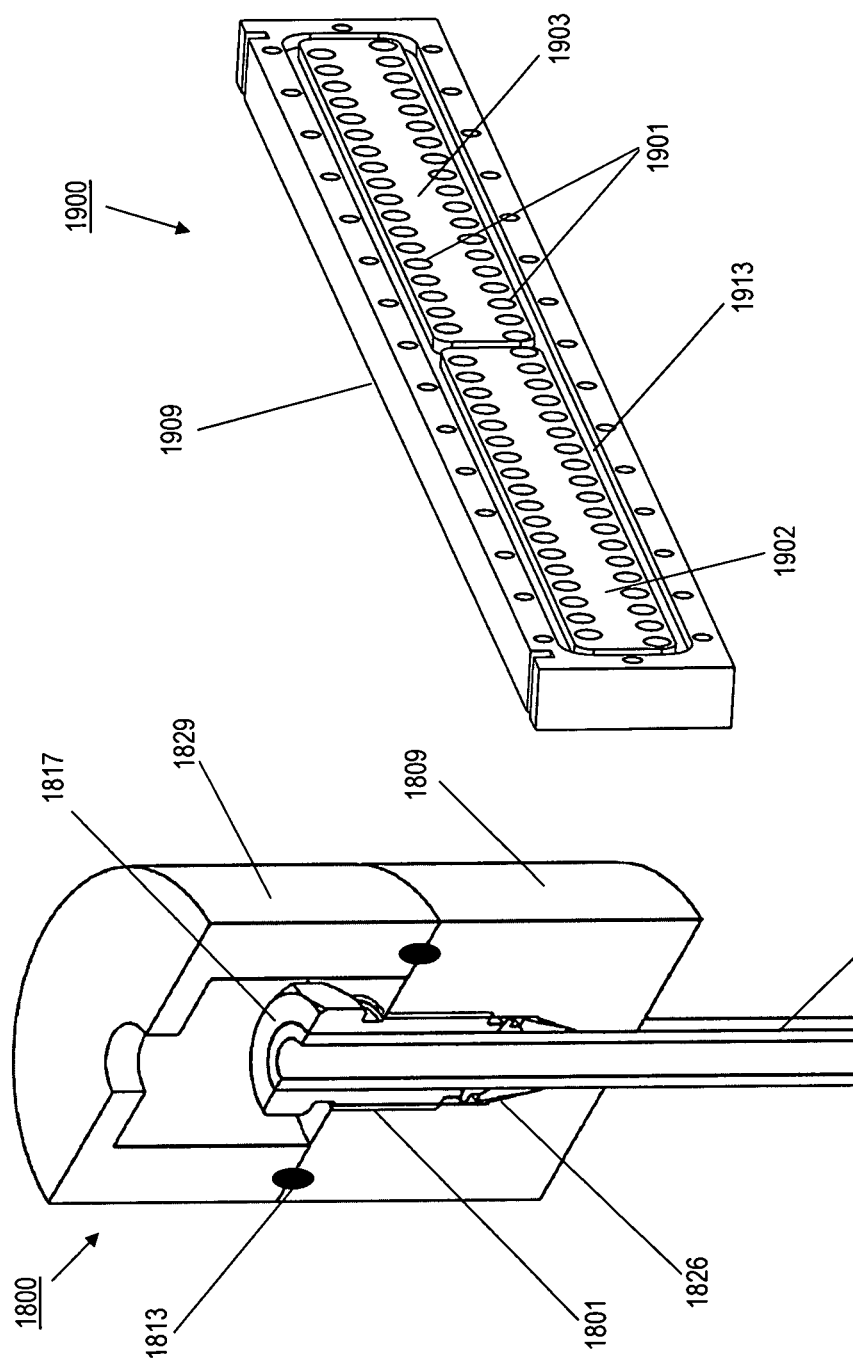

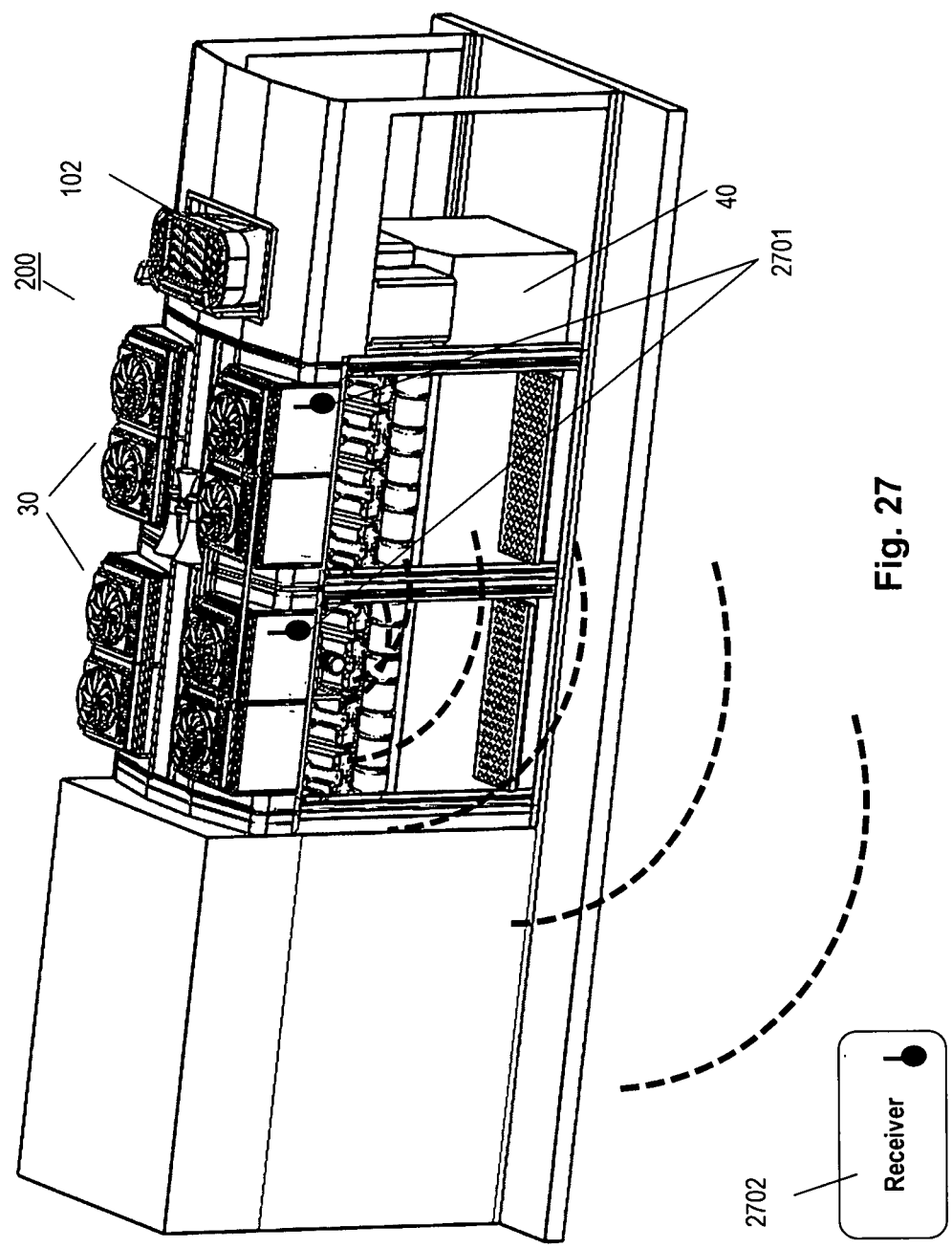

WASTE HEAT RECOVERY AND CONVERSION

CROSS REFERENCE TO RELATED APPLICATIONS

This application is a U.S. National Stage Application of PCT International Application No. PCT/US16/15963, filed on Feb. 1, 2016, which claims the benefit of priority to U.S. Provisional Patent Application No. 62/125,743, filed Jan. 30, 2015, and U.S. Provisional Patent Application No. 62/110,596, filed Feb. 1, 2015, the disclosures of which are hereby incorporated by reference herein in their entireties.

BACKGROUND

Power systems that convert thermal energy into usable energy (e.g., mechanical energy and/or electrical energy) are generally comprised of independent components that are thermally coupled (e.g., hydraulically and electrically) by flexible hoses and rigid tubing via flanges, fittings, couplings, electric conduits, etc. These couplings interconnect various parts of the power system, including valves, sensors, breakers, auxiliary monitoring equipment, control equipment, etc. Such couplings can be sources of inefficiencies and failures. For example, implementations involving vibratory stresses (e.g., vehicles) can induce resonances on components that propagate through the entire power system via the couplings. Accordingly, such implementations use mechanical decoupling to avoid failures and/or increase lifespans. However, decoupling can impose other strains on power systems. For example, mechanically decoupling closed-loop thermal-hydraulic and electrical systems may induce fatigue and resonant cycling on thermal-hydraulic tubing and electrical connections.

Moreover, power systems use the above-described couplings to transfer fluids between independent components. For example, some components execute thermodynamic functions (e.g., expansion, condensation, pressurization, depressurization, and increase/decrease of the fluid energy content) to produce torque and/or electricity. As a result, the system's efficiency, reliability and endurance generally decrease as the length of the couplings between the independent components increases. Accordingly, there is a need to minimize the number and length of couplings in power systems that operate in high-vibration environments.

Additionally, power systems may employ waste heat recovery systems that include heat exchangers to capture waste heat and use it to improve performance, reduce fuel consumption and pollutant emissions. However, heat exchangers can also be sources of failures and inefficiencies. For example, clusters of pressurized tubes may be welded to the heat exchanger headers to operate as tube-shell heat exchangers. If any of the tubes develops mechanical malfunctions and/or leakages (e.g., due to corrosion, fatigue) their removal from the header may be impossible and, thus, their repair and maintenance can be costly. Additionally, the welding processes generally adopted to seal the tubes to the heat exchanger header may lead to metallurgical stresses and accelerate corrosion and/or mechanical failure. Accordingly, there is a need to minimize the cost and effort to maintain or replace heat exchangers in power systems.

Overall, increasing the reliability of non-invasive retrofittable waste heat recovery and conversion system components by integrating them to shorten their thermal-hydraulic connections and simultaneously enhance their protection with respect to vibratory stressors, represents economic and environmental advantages. Such a waste heat recovery and conversion system can reduce pollutant emissions and enhance public safety.

SUMMARY

Embodiments in accordance with the present disclosure provide systems and methods for waste heat recovery and conversion. The waste heat recovery and conversion system includes a housing mountable onto an engine. The waste heat recovery and conversion system also includes a power conversion unit (PCU) within the housing. The PCU includes heat exchangers, an expander, an electrical power generator, and a fluid pump. The heat exchangers, the expander, the fluid pump, and the fluid reservoir form a thermodynamic loop that drives the electrical power generator using thermal energy from waste heat.

BRIEF DESCRIPTION OF THE DRAWINGS

The accompanying drawings, which are incorporated in and constitute a part of this specification, illustrate several embodiments of the present disclosure and together with the description, serve to explain the principles of the apparatus and methods describing the waste heat recovery and conversion systems and various components.

FIG. 3A illustrates a top perspective view of an exemplary PCU mounting assembly.

FIG. 3B illustrates a top perspective view of an exemplary locomotive engine compartment roof.

FIG. 4 illustrates a side perspective view of exemplary active isolators for a PCU mounting assembly.

FIG. 15A illustrates a bottom perspective view of an exemplary PCU coupled to a Diesel Multiple Unit (DMU).

FIG. 16 illustrates a perspective view of an exemplary fitting of a heat exchanger to an exhaust gas manifold.

FIG. 18A illustrates a side perspective view of an exemplary system for non-permanently fitting high-pressure seal tubes to a tube sheet of a heat exchanger header.

FIG. 18B illustrates a cross-sectional view of the system for fitting seal tubes to a tube sheet.

FIG. 19A illustrates a side perspective view of an exemplary non-permanent fitting for high-pressure seal tubes.

FIG. 19B illustrates a side perspective view of an exemplary heat exchanger header.

FIG. 27 illustrates a perspective view of a cluster of PCUs configured to transmit monitoring and operational data among each unit and to a data monitoring and collection center.

DETAILED DESCRIPTION

Figure 1A:
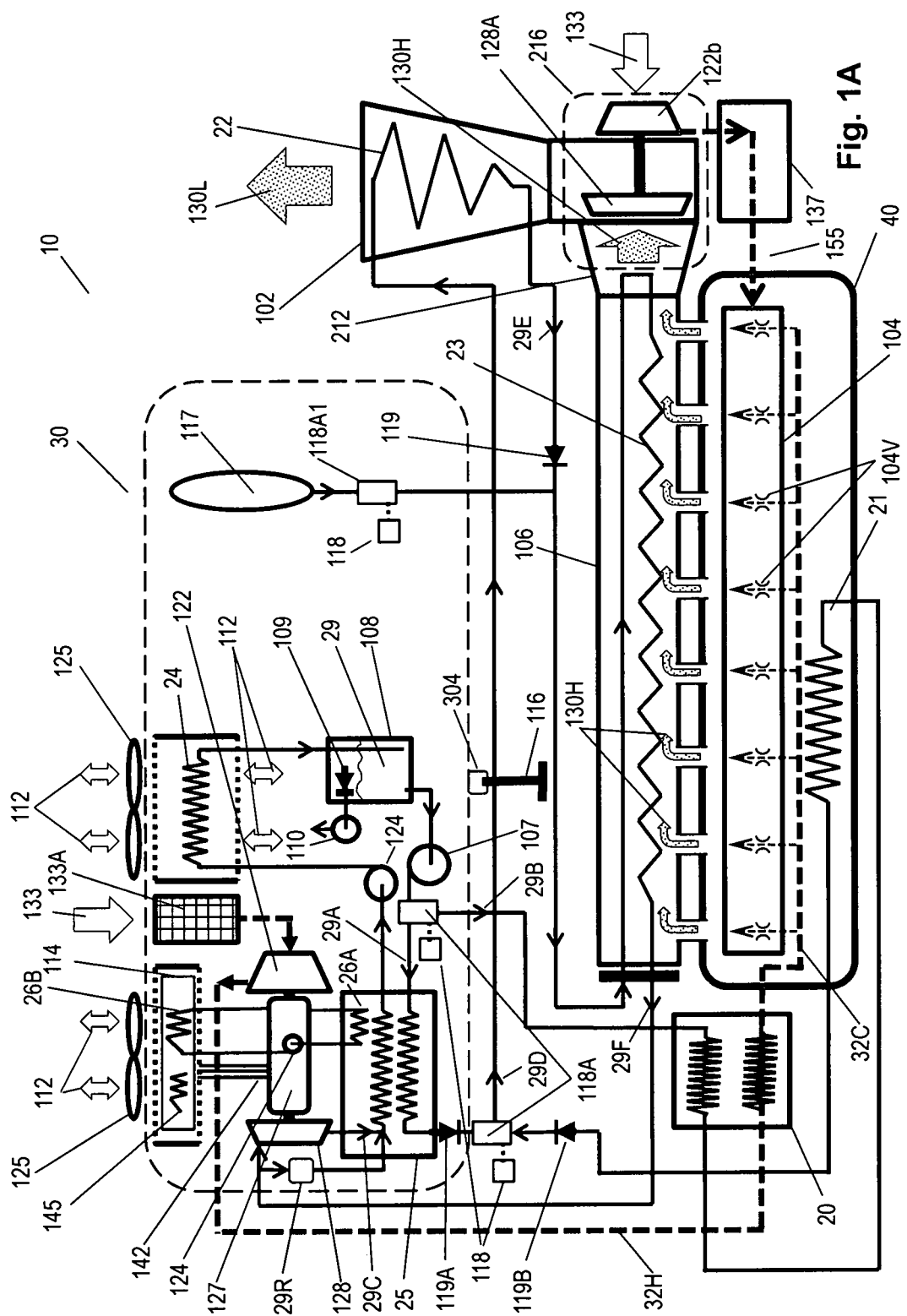
FIG. 1A represents a block diagram illustrating an exemplary configuration of a waste heat recovery and conversion system in accordance with various aspects of the present disclosure.

Reference will now be made in detail to the exemplary embodiments of the present disclosure, examples of which are illustrated in the referenced drawings grouped by Figures. Whenever possible, the same reference numbers or letters will be used throughout the drawings to refer to the same or like parts.

The present disclosure generally relates to systems and methods for integral, non-invasive, reversibly retrofittable waste heat recovery and conversion. More specifically, systems and methods disclosed herein extract waste thermal energy from one or more fluid sources by networking heat exchangers to form one or more thermodynamic closed-loops. Access to various specialized heat exchangers may be managed by a computer controller that maximizes the waste heat recovery efficiency when the waste thermal energy source (e.g., one or more fluid sources) is highly dynamic as, for example, for automotive, rail, marine applications as well as for stationary applications including power plants and generally all applications that discharge thermal energy to the environment.

Additionally, systems and methods disclosed herein provide a waste heat recovery system including a mounting assembly for mounting one or more PCUs to an internal combustion (IC) engine (e.g., rail, automotive, marine, mine haulers, dump trucks, mobile power plants, etc.) that is a minimally invasive, retrofittable, maintainable, and reversible. In accordance with various aspects of the present disclosure, the mounting assembly decouples the PCUs and the heat exchangers in the waste heat recovery system from the engine using passive and/or active isolators that attenuate vibrations and impacts during the operation of the engine. As the PCUs disclosed herein can be retrofitted onto existing platforms that were not designed to accommodate thermal-hydraulic and electrical coupling with add-on power systems, the mounting system of the present disclosure, all together with the PCUs, is configured to be minimally invasive by minimizing or avoiding interference with the configurations of components provided by the original equipment manufacturer (i.e., engine equipment and equipment located within the engine compartment).

Moreover, systems and methods disclosed herein provide a non-permanent integral tube sealing and mechanical supporting system configured to seal tubes to a tube sheet of a heat exchanger header. The integrated non-permanent tube sealing system may be applied to heat exchanger headers with one or multiple number of holes and can be sized to match any tube size utilized in, for example, implementations of a waste heat recovery system disclosed herein that involve tube attachment. The non-permanent integral tube sealing system allows for replacement of leaky or damaged tubes forming heat exchangers by avoiding removal of permanently welded tubes. Thus, the non-permanent integral tube sealing system reduces time and cost to replace leaky tubes, while increasing reliability of the heat exchanger.

FIG. 1A is a schematic diagram illustrating an exemplary configuration of a highly integrated, compacted, waste heat recovery and conversion (WHRC) system 10 with minimized or eliminated thermal hydraulic tubing and electrical conduits capable of operating in highly vibratory environments in accordance with various aspects of the present disclosure. WHRC system 10 may be configured to include a number of heat exchangers 20, 21, 22, 23, 24, 25, 26A and 26B, and 145. These heat exchangers are referred to herein as intercooler recuperator heat exchanger (IR-HEX) 20, engine cooling system heat exchanger (EC-HEX) 21, stack heat exchanger (S-HEX) 22, manifold heat exchanger (M-HEX) 23, condenser heat exchanger (C-HEX) 24, expander recuperator heat exchanger (EX-HEX) 25, generator/motor cooling heat exchanger (GEN-HEX) 26A and 26B, and electronic power module heat exchanger (EPM-HEX) 145. Heat exchangers 20, 21, 22, 23, 24, 25, 26A, 26B, and 145 operate in conjunction with at least one integral PCU 30 and a waste thermal energy source (WTES) from an engine 40. In this embodiment, the WTES is represented by high- and low-temperature waste fluids (referred to hereinafter as "second fluid" 130), where reference numbers 130L and 130H denote second fluid 130 with low-temperatures and high-temperatures, respectively. Heat exchangers 20, 21, 22, 23, 24, 25, 26A, 26B, and 145 may be configured to transfer thermal energy between second fluid 130 and a working fluid 29 (e.g., water, organic fluids, liquid metals, and heat transfer engineered fluids), sometimes referred to as "first fluid" 29, circulating within the components of WHRC system 10. First fluid 29 executes conversion of thermal energy from second fluid 130 to mechanical and electrical energy by means of Rankine power cycle components (i.e., turbine, pump, and heat exchangers).

In accordance with various aspects of the present disclosure, engine 40 may be represented by an internal combustion engine (e.g., gasoline-, diesel-, and gas-fueled engine). However, WHRC system 10 of the present disclosure may be coupled to and non-invasively retrofitted with any thermal source. In embodiments, engine 40 may be configured to include a high-temperature exhaust gas manifold 106, through which high-temperature second fluid (high temperature exhaust gases) 130H flows, a relatively low-temperature exhaust gas stack 102, through which low-temperature second fluid (low temperature exhaust gases) 130L flows, and an intake manifold 104. In this embodiment, exhaust gas manifold 106 and exhaust gas stack 102 can be original equipment manufacturer (OEM) components. The heat exchangers (e.g., EC-HEX 21, S-HEX 22, and/or M-HEX 23) mounted and/or thermally coupled to exhaust gas manifold 106 and exhaust gas stack 102 can vary from one engine to another and may be configured to non-invasively and reversibly retrofit with engine OEM components without modifying these components. Additionally, while not detailed in FIG. 1A, heat exchangers 20, 21, 22, 23, 24, 25, 26A, 26B, and/or 145 and other components, forming thermal-hydraulic closed Rankine cycle loops of WHRC system 10, may be configured to minimize or eliminate connecting tubes and electrical cabling normally networked among various thermal-hydraulic components forming a Rankine cycle, as the components of WHRC system 10 can be integrated entirely within a housing forming PCU 30. In some implementations in which OEM component constraints may induce adoption of connecting tubes, WHRC system 10 may be configured to include flexible, high-pressure, insulated tubing highly reduced in number and length as key waste heat recovery and conversion components are integrated with PCU 30, thus eliminating thermal-hydraulic connections represented by couplers, fittings, rigid tubes and the like.

PCU 30 converts thermal energy from first fluid 29 heated by heat exchangers 20, 21, 22, 23, 24, 25, 26A, 26B and/or 145 into electrical energy and/or mechanical energy, which may be utilized to augment power of engine 40, reduce fuel consumption, reduce pollutant emissions, and/or supply electric and/or mechanical power to auxiliary loads. As illustrated in FIG. 1A, PCU 30 and heat exchangers 20, 21, 22, 23, 24, 25, 26A, 26B and/or 145 can be reversibly retrofitted with OEM components of engine 40. Therefore, one of the advantages represented by WHRC 10 is the ability of its components to adapt to engine 40 and physical constraints of its engine compartment.

In embodiments, PCU 30 may be configured as a single, compact module in a mounting enclosure 302 that provides optimized thermal-hydraulic coupling by flanging components so as to minimize tubing length. For example, the maximum distance between components of PCU 30 (e.g., C-HEX 24, EX-HEX 25, GEN-HEX 26, fluid pump 107, fluid reservoir 108, check valve 109, gas ejector 110, controller 114, three-way valves 118A, pressurized vessel 117, pressure regulator (TV-PR) 118, check valve 119, turbo-compressor turbine 122, power generator/motor 127, and turbine expander 128) is a few feet (e.g., two feet or less). Additionally, in embodiments, components of PCU 30 are entirely contained within the housing such that all tubes and wires interconnecting the components of PCU 30 are entirely contained within the housing. As such, the components of PCU 30 are thermal-hydraulically and electrically coupled. PCU 30 may be configured to increases efficiency, reliability, and maintainability of WHRC system 10. In some implementations, several modular PCUs 30 may be fitted in parallel or serial configurations with a single engine 40 or a single WTES.

PCU 30 may comprise and integrate C-HEX 24, EX-HEX 25, and GEN-HEX 26A and 26B (collectively referred to herein as GEN-HEX 26). Additionally, PCU 30 can include and integrate at least one of the following components: fluid pump 107, fluid reservoir 108, check valve 109, gas ejector 110, actively- or passively-cooled electronic controller enclosure 114 (hereafter referred to as "controller" 114), reinforcing structure 116, active and/or passive vibration isolators 304, pressurized vessel 117, three-way valve pressure regulator (TV-PR) 118, three-way valve 118A, check valve 119, electrically- and turbine expander-driven turbo-compressor turbine 122, recuperator control pump 124, fans 125, power generator/motor 127, IR-HEX 20, and turbine expander 128. In accordance with various aspects of the present disclosure, the above components may be fully integrated and entirely housed within a single modular PCU 30 having all the components thermal-hydraulically and electrically coupled by channels and electrical connections embedded with their respective housing, thus minimizing or eliminating tubing and electrical cables within and outside of PCU 30.

Controller 114 can include redundant electronic control systems configured to monitor and control parameters of the thermodynamic and electrical variables characterizing the operational modes of generator/motor 127. Therefore, controller 114 regulates voltage output and manages the recovered and conditioned electric power. To execute high-accuracy control of energy recovered by WHRC system 10, controller 114 can also be configured to regulate the mass flow rate of first fluid 29 so as to condition the electricity generated by turbine expander 128 that drives generator/motor 127. As a result, controller 114 may control operational modes of generator/motor 127 in real time, e.g., as a function of the duty cycle of engine 40. For example, depending on the duty cycle (and total WTES generated), controller 114 may control motor/generator 127 to operate either as a generator to provide electricity and compressed air or as a motor to provide compressed air only. When generator/motor 127 is operating as a motor, controller 114 manages the electric power generated by engine 40 as the electrical source or electric power from batteries (see, e.g., reference number 2501 in FIG. 25) to compress intake air 32H via turbo-compressor turbine 122, thereby reducing pollutants.

Embodiments of WHRC system 10 can operate as follows. Fluid reservoir 108 contains first fluid 29 pressurized by pump 107, whose discharge pressure may be regulated by controller 114. The mass flow rate and pressure of first fluid 29 may be regulated via speed and torque control of pump 107 and/or by a combined or independent actuation of three-way valves 118A and TV-PR 118, where check valves 119A and 119B coupled to the inlets of TV-PR 118 prevent fluid flow reversal. After being pressurized at the discharge of pump 107, first fluid 29 may be split into a first portion 29A supplied to EX-HEX 25 and a second portion 29B supplied to IR-HEX 20. Controller 114, via control of TV-PR 118 and the characteristics of pump 107, controls and regulates the total mass flow rates of first fluid 29 circulating throughout WHRC system 10 and the mass flow rates of each of these portions 29A and 29B of first fluid 29.

In accordance with embodiments disclosed herein, reference numbers 29A, 29B, 29C, 29D, 29E, and 29F represent first fluid 29 in WHRC system 10 at different energy content (i.e., different pressure, temperature and mass flow rates). Alternatively, and non-exclusively, in some embodiments, first fluids 29, 29A, 29B, 29C, and 29D represent physically different working fluids, where each working fluid is optimized for high performance while circulating within dedicated heat exchangers forming the power cycle of WHRC system 10. When first fluid 29 is represented by various working fluids 29A, 29B, 29C, 29D, 29E, and 29F that cannot mix, the heat exchangers integrated within PCU 30 (e.g., heat exchangers 23, 24, 25, 26A, 26B and/or 145) as well as fluid reservoir 108 and pump 107 may be configured to operate with isolation among the various fluids. Accordingly, the heat exchangers may be configured to execute the functions of thermally coupling the various fluids without mixing the first and second fluids.

In an exemplary implementation, first portion 29A of first fluid 29 inletting EX-HEX 25 gains thermal energy via thermal coupling with first fluid 29C provided to EX-HEX 25 after expansion processes occurred within turbine expander 128. This implementation of WHRC system 10 can provide higher recovery efficiency because EX-HEX 25 recuperates losses of turbine expander 128. First portion 29A of first fluid 29, regulated by controlled TV-PR 118, outlets to EX-HEX 25 and may be supplied to S-HEX 22, which is non-invasively integrated with and/or mounted within exhaust gas stack 102. This portion of first fluid 29 gains thermal energy in exhaust gas stack 102 via thermal exchange with low-temperature waste energy second fluids 130L (the term "fluids," plural, is utilized to address waste energy fluids mixtures as, for example, those represented by the exhaust gases of engine 40). In the embodiments, second fluids 130L may represent the exhaust gases discharged by turbocharger 216, which can be an OEM component of engine 40. As first fluid 29D flows through S-HEX 22, it increases its thermal energy content through thermal coupling with second fluid 130L flowing through exhaust gas stack 102. At the outlet of S-HEX 22, first fluid 29E may be configured to inlet M-HEX 23 to further increase its energy content. Second fluid 130H is directly pumped into exhaust gas manifold 106 as a result of the combustion processes occurring within engine 40. As a result, second fluid 130H represents the hottest waste heat fluids. If the working fluid selected for WHRC system 10 is an organic fluid, check valve 119 may be configured to prevent or reduce back flow into S-HEX 22 when a pressurized inert gas, contained in pressure vessel 117, may be released by the actuation of valve 118A1 under control of controller 114. This feature may be activated when first fluid 29E is an organic fluid which may be damaged by the high-temperatures (relative to the organic fluid constraints) characterized by second fluid 130H at various locations within exhaust gas manifold 106 and possibly portions of exhaust gas stack 102 at a turbocharger exhaust gas turbine discharge 128A. In other words, when second fluid 130 represents high temperatures (second fluids 130H) and exceeds the organic fluid operating temperatures, controller 114 activates valve 118A1. As a result, an inert, non-combustible pressurized gas (e.g., $CO_2$, Argon) contained in pressure vessel 117 displaces first fluid 29 inventory contained in the channels forming M-HEX 23, thus removing first fluid 29 (when represented by organic fluids) from the WTES areas that might temporarily generate temperatures in excess of the tolerable temperatures of the organic fluids. The inert gas in pressure vessel 117 is, therefore, utilized as a safety feature to prevent damage to the organic-based fluids when utilized as first fluid 29. When this feature is activated, the inert gas is vented through an automatic de-gassing system represented by check valve 109 and a gas ejector 110 (e.g., vacuum pump). Specifically, the inert gas contained in pressure vessel 117 effectively displaces the organic-based working fluid 29 to be flashed out of M-HEX 23, through turbine expander 128, EX-HEX 25, and C-HEX 24. The resulting volume of inert gas ends up occupying a portion of fluid reservoir 108. Check valve 109 and gas ejector 110 vent the corresponding inert gas volume, thus resetting the hydraulic loops to be automatically refilled solely with working fluid 29 when resuming normal operations of WHRC system 10.

The portion of first fluid 29B supplied via regulation of TV-PR 118 and three-way valve 118A to IR-HEX 20 increases its energy content via thermal coupling with hot compressed air 32, hereafter referred to as hot "third fluid" 32H, produced by turbo-compressor turbine 122 integrated with PCU 30. As first fluid 29B exits IR-HEX 20, it enters EC-HEX 21, which can be fitted and/or mounted (non-invasively) with intake manifold 104 (e.g., an OEM component). EC-HEX 21 may also include thermal coupling with the engine cooling system of engine 40, so as to recover thermal energy from the engine coolant system and from the engine oil cooling system. EC-HEX 21 may be a jacketed engine cooling system thermally coupled to non-invasive heat exchanger surfaces co-located with engine equipment integrated within PCU 30. EC-HEX 21 further increases the energy content of first fluid 29B prior to mixing with first fluid 29A exiting EX-HEX 25 and inletting S-HEX 22 in exhaust gas stack 102 as pre-heated first fluid 29D.

In exhaust gas stack 102, S-HEX 22 increases the thermal energy content of first fluid 29D (formed by any proportion of working fluids 29A and 29B) by heat energy transferred from second fluid 130L. At this point, first fluid 29E inlets M-HEX 23 in gas exhaust manifold 106. As first fluid 29E flows through M-HEX 23, its thermal energy content is further increased and, depending on the type of working fluid, achieves superheating of first fluid 29E to higher energy content (i.e., first fluid 29F). After flowing through the heat exchangers described, first fluid 29, now superheated to first fluid 29F, inlets turbine expander 128, which is mechanically coupled to generator/motor 127. As first fluid 29F expands within turbine expander 128, its energy content is decreased. As an additional safety feature, first fluid 29F may be vented through relief valve 29R. This safety feature prevents the rotary components of PCU 30 to over-speed, for example, due to loss of electric load when motor/generator 127 is producing electricity. During abnormal operations, relief valve 29R, which is controlled and actuated passively or actively by controller 114, may bypass first fluid 29F to reduce the speed of turbine expander 128. During normal operations, at the discharge of turbine expander 128, first fluid 29C inlets EX-HEX 25 for transferring thermal energy content to cooler first fluid 29A, counter-flowing from fluid reservoir 108 as a result of an operation of pump 107. First fluid 29C exiting EX-HEX 25 enters C-HEX 24 (e.g., a condenser or radiator) passively by gravity and pressure differential or actively by recirculation pump 124 and returns back in a liquid state by thermal transfer with a fourth fluid 112, which can be cool air from the environment outside engine 40. First fluid 29 is now reset back into fluid reservoir 108.

WHRC system 10 can include a series of thermodynamic closed-loops that maximize transfer of the WTES represented by engine 40 to first fluid 29 via IR-HEX 20, EC-HEX 21, S-HEX 22, M-HEX 23, C-HEX 24, EX-HEX 25, and GEN-HEX 26A and 26B. The WTES is therefore converted into mechanical energy via turbine expander 128. The mechanical energy may be directly (via direct drive) or indirectly (via gear box) transferred to rotary components of electric generator/motor 127 to generate electrical energy controlled and conditioned by controller 114. As described, controller 114 can also distribute the converted pollutant-free electric power to augment performance of engine 40, reduce pollutant emissions, and supply additional electricity to auxiliary electric loads (e.g., air conditioners, lights, compressors, and servo-actuators). Additionally, the pollutant-free, converted electric and mechanical power produced by PCU 30 may be used to drive motors of cooling fans 125 and provide features for special applications. For example, as detailed below with regard to FIGS. 13C, 13D, and 15A, the special applications may comprise vehicle propulsion (e.g., by driving a motor coupled to an axle 1331 shown in FIG. 13D). WHRC system 10 operating according to the embodiments disclosed herein can provide a minimum of 5% to a maximum of 23% in fuel savings and corresponding pollutant emissions reduction, thus substantially improving the efficiency of engine 40.

Additionally, to further reduce pollutant emissions, while decreasing fuel consumption, WHRC system 10 may be configured to compress intake air inside intake manifold 104. In this configuration, rotary components of PCU 30 forming motor/generator 127 may be directly or indirectly coupled to one or multiple compressor turbines. Turbo-compressor turbine 122 may be configured to represent a compressor system formed by various turbine stages and turbine types (e.g., radial, axial, etc.). Hot third fluid 32H is the result of environmental air 133 flowing through filter 133A by turbo-compressor turbine 122. Depending on the duty cycle of engine 40 and settings of controller 114, PCU 30 may be driven by electrically powering motor/generator 127. Turbo-compressor turbine 122 may also be driven independently or in combination with the mechanical coupling of the rotary components of motor/generator 127 to expander 128. Hot compressed third fluid 32H inlets IR-HEX 20 so as to reduce temperature of compressed third fluid 32C prior to inletting intake manifold 104 of engine 40.

In some embodiments, the compressor system forming OEM turbocharger 216 may be configured to operate in tandem with turbo-compressor turbine 122. In this configuration, OEM turbocharger compressor 122b provides hot compressed air to OEM intercooler system 137 and inlets cooler compressed air into intake manifold 104. To avoid utilization of check valves and flow reversal toward turbo-compressor turbine 122, cold compressed third fluid 32C generated by the pollution reduction features of WHRC system 10 inlets intake air cylinder ports (not shown) via non-invasive venturi jets 104V retrofitted with intake manifold 104. In this configuration, turbo-compressor turbine 122 supplies electrically-driven cold compressed air 32C to the air intake ports of engine 40 when expander 128 does not provide mechanical energy to turbo-compressor turbine 122 and when OEM turbocharger 216 provides insufficient compressed air (e.g., idling and operating at low-power settings). When engine 40 is operated at intermediate and high-power settings, turbo-compressor turbine 122 is driven by expander 128. Therefore, the OEM compressor system formed by turbocharger 216, exhaust gas turbine 128A, and intercooler 137 may be configured to be supplemented with additional, independently intercooled, compressed air 32C to increase pressurization of intake manifold 104 when engine 40 is idling and at low power settings. Alternatively, in some embodiments, turbo-compressor turbine 122 may be configured to substitute turbocharger 216 and intercooling system 137.

Figure 1B:
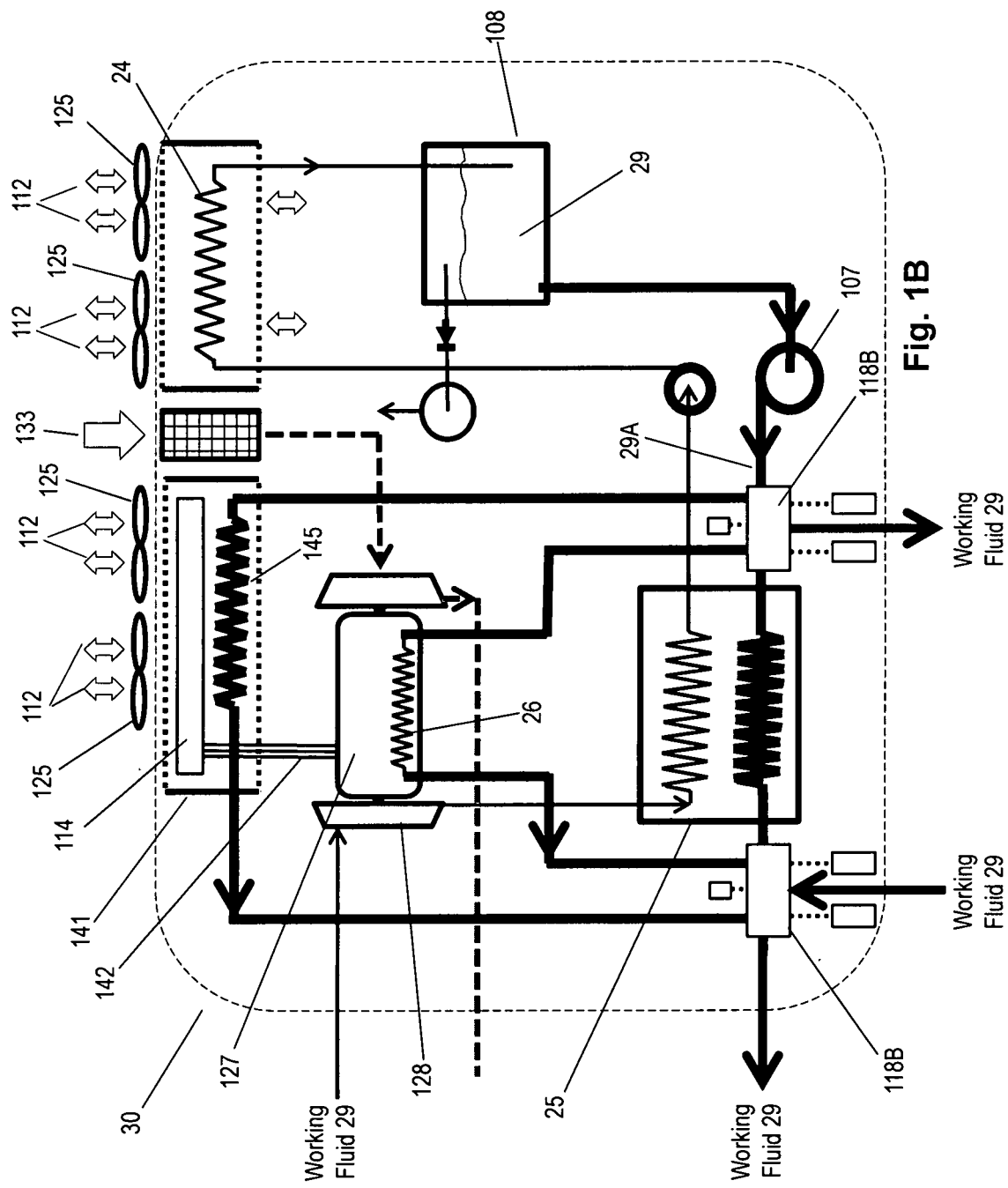
FIG. 1B is a block diagram illustrating an exemplary power conversion unit (PCU).

FIG. 1B shows a block diagram of an exemplary PCU 30, which can be the same or similar to that previously described. As shown in FIG. 1B, PCU 30 may include C-HEX 24, EX-HEX 25, and GEN-HEX 26. Additionally, PCU 30 may comprise controller 114, an electronic power module and conditioner enclosure 141 (hereafter referred to as "power conditioner" 141), and an electronic power module heat exchanger 145 (EPM-HEX). Power conditioner 141 comprises electronic components that execute electric power rectification and regulates voltage, frequency and current to process electric power output conditioned to/from power generator/motor 127. EPM-HEX 145 recovers waste thermal energy generated by controller 114 and all of the components comprised by power conditioner 141. PCU 30 also includes GEN-HEX 26, which recovers waste thermal energy generated by electrical generator/motor 127. Heat exchangers 24, 25, and 26 may utilize first fluid 29 to transfer thermal energy between components to be cooled (e.g., motor/generator 127 rotor, stator, bearings, the power modules forming controller 114, and the power modules comprised by power conditioner 141), while, at the same time, waste energy transferred to first fluid 29 increases the energy content of first fluid 29, and thus the efficiency of WHRC system 10. In FIG. 1B, power conditioner 141 can be an enclosure in which fourth fluid 112 may flow to provide cooling of controller 114 and its power modules, in addition to cooling represented by first fluid 29 provided after pressurization via pump 107. Fourth fluid 112 may flow passively or actively by operating fans 125. Fans 125 may be controlled by controller 114 and powered by electricity provided by PCU 30 or by engine 40.

Figure 1C:
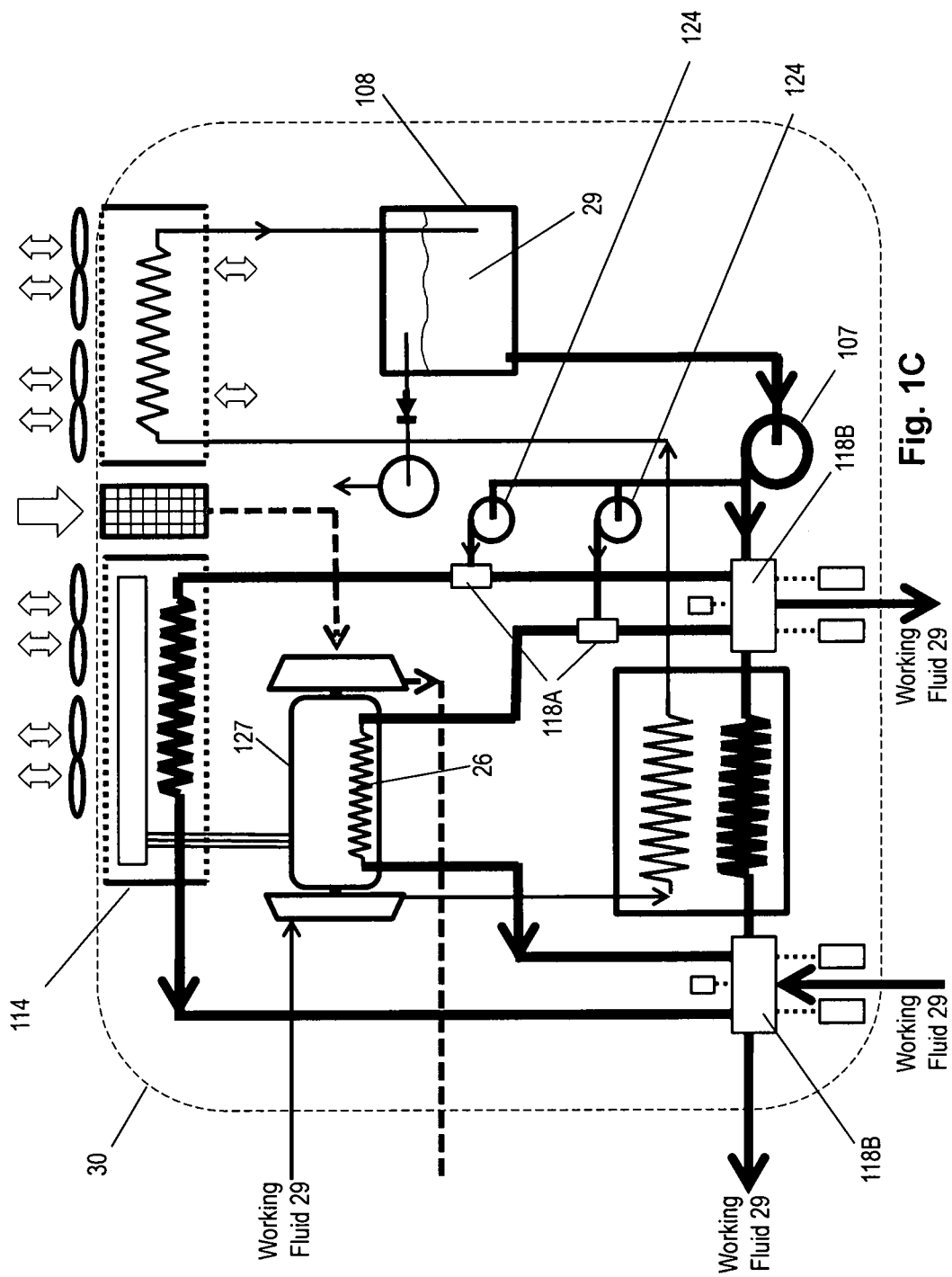
FIG. 1C is a block diagram illustrating another exemplary embodiment of PCU.

In addition to features of PCU 30 described in FIGS. 1A and 1B, a minimum of two four-way valves and pressure controllers 118B or multiple TV-PRs 118 (shown FIG. 1A) may be utilized to increase precision of the mass flow rates of the portions of first fluid 29 circulated through EPM-HEX 145, GEN-HEX 26, and EX-HEX 25, as shown in FIG. 1C. More specifically, FIG. 1C illustrates an embodiment of PCU 30 similar to that described above with regard to FIGS. 1A and 1B. In this embodiment, controller 114 controls mass flow rates of first fluid 29 through components of PCU 30, as well as through IR-HEX 20, EC-HEX 21, S-HEX 22, and M-HEX 23 by using pumps 124 controlled by controller 114 in addition to pump 107. The combined operations of pumps 124 and 107, 4-way valves 118B, and three-way valves 118A, controlled by controller 114, enable fine regulation of mass flow rates of first fluid 29 circulating in the various thermal-hydraulic loops shown. In this configuration, fine temperature control of the motor/generator 127 may be established by accurate regulation of the mass flow rate of first fluid 29 flowing through GEN-HEX 26.

Figure 1D:
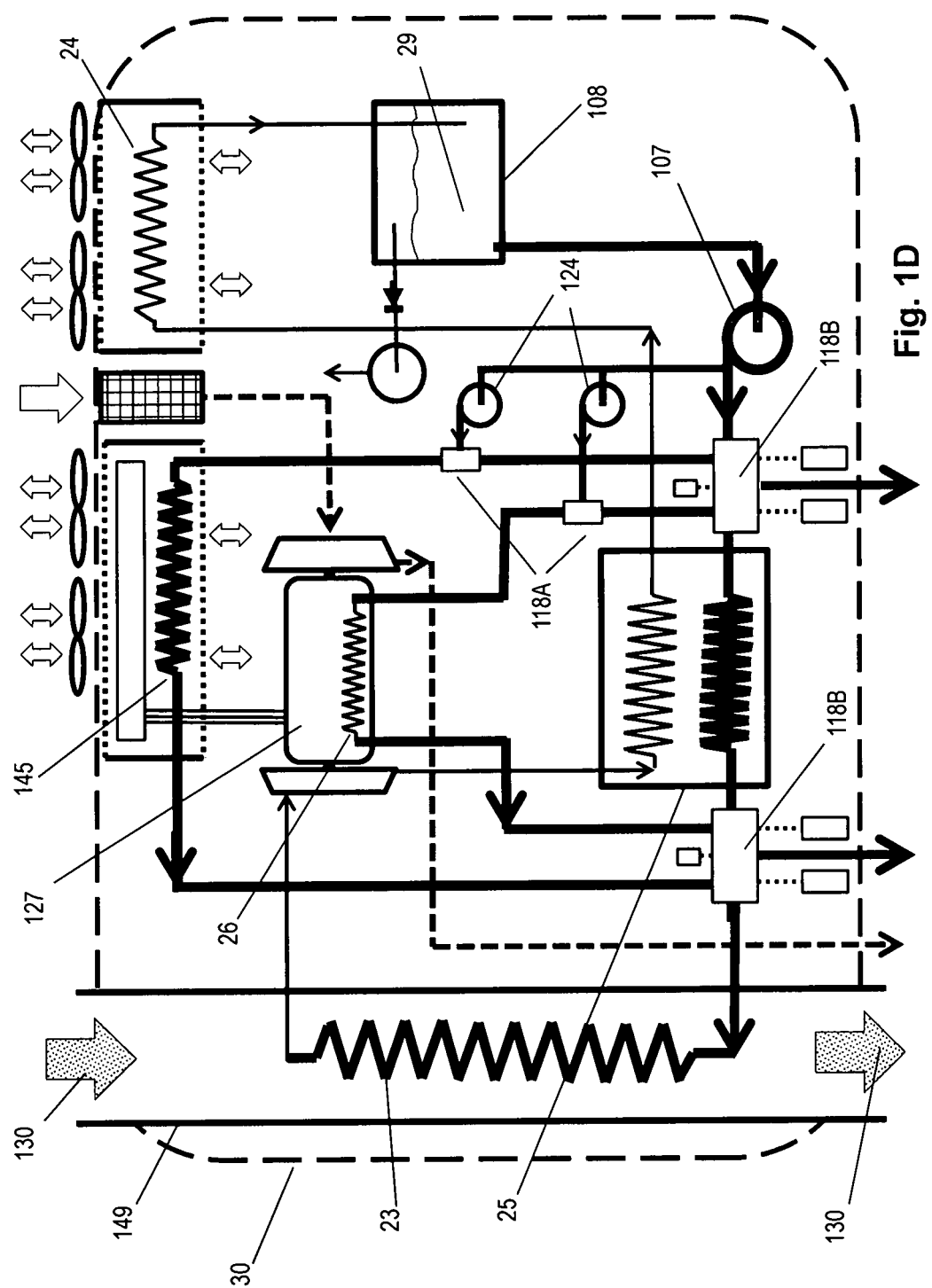
FIG. 1D is a block diagram illustrating another exemplary embodiment of PCU.

FIG. 1D is a block diagram illustrating another embodiments of PCU 30, which is similar to that previously described herein. PCU 30 incorporates another configuration of M-HEX 23 and/or S-HEX 22. More specifically, PCU 30 may include a conduit or manifold 149 (e.g., insulated pipe or conduit), where second fluids 130 with waste energy flow (i.e., high- or low-temperature exhaust gases 130H and 130L, respectively). As second fluid 130 flows through manifold 149, it transfers thermal energy to first fluid 29, circulating within M-HEX 23 or S-HEX 22 (high- or low-temperature restrictions imposed by the thermal-physical properties of first fluid 29) without mixing with second fluids 130, as these fluids are only thermally coupled through the heat exchangers (i.e., M-HEX 23 and/or S-HEX 22). In this embodiment, first fluid 29 from fluid reservoir 108 flows through the various components of PCU 30 as a result of pressurization executed by pumps 107 and pumps 124 with fine regulation of the mass flow rates of first fluid 29 executed by active actuation of valves 118A and 118B. In this arrangement, PCU 30 can be retrofitted with WTESs (e.g., second fluid 130) in a minimally invasive manner by coupling the OEM engine exhaust gas conduit or exhaust manifold to manifold 149 after the OEM turbocharger, where manifold 149 may be embedded with the components of PCU 30 and entirely housed within the enclosure representing PCU 30. Additionally, in this arrangement, the back pressure represented by M-HEX 23 or S-HEX 22 does not impact OEM turbocharger performance as second fluid 130 transfers thermal energy to WHRC system 10 only after having expanded within the OEM turbocharger. By regulating the mass flow rate of first fluid 29 through M-HEX 23 in the configuration shown in FIG. 1D, second fluid 130 may be cooled at temperatures that trigger condensation of the water vapors contained in the combustion products of engine 40. Accordingly, the back pressure manifested within manifold 149 may be represented by a vacuum, thus further increasing the performance and efficiency of the OEM turbocharger and engine 40.

In accordance with various aspects of the present disclosure, WHRC system 10 can be retrofit onto combustion engines dedicated to various applications. As an example, engine 40 may be represented by a locomotive engine, however, any internal combustion engine dedicated to mobile or stationary applications may be non-invasively retrofitted with WHRC system 10 of the present disclosure.

Figure 2A:
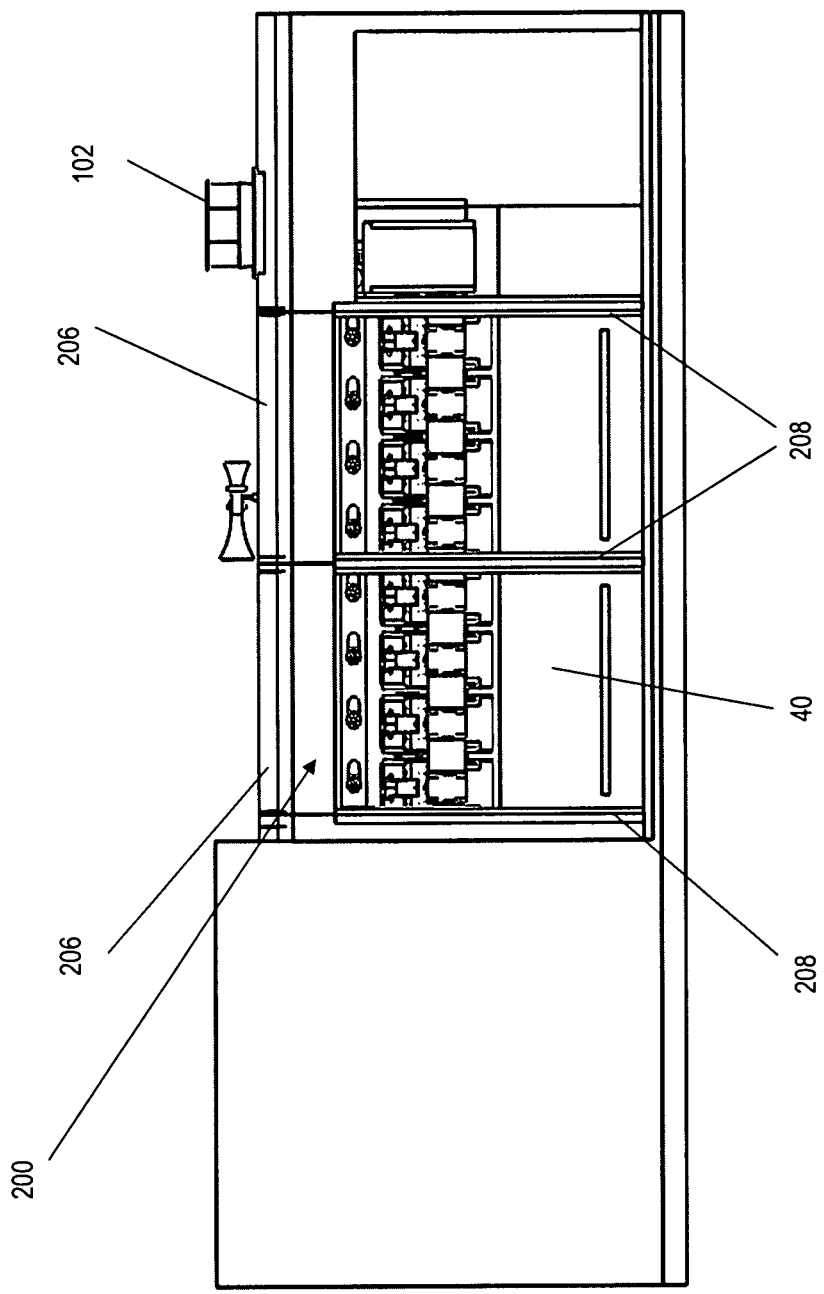
FIG. 2A illustrates a side view of an exemplary engine compartment.
Figure 2B:
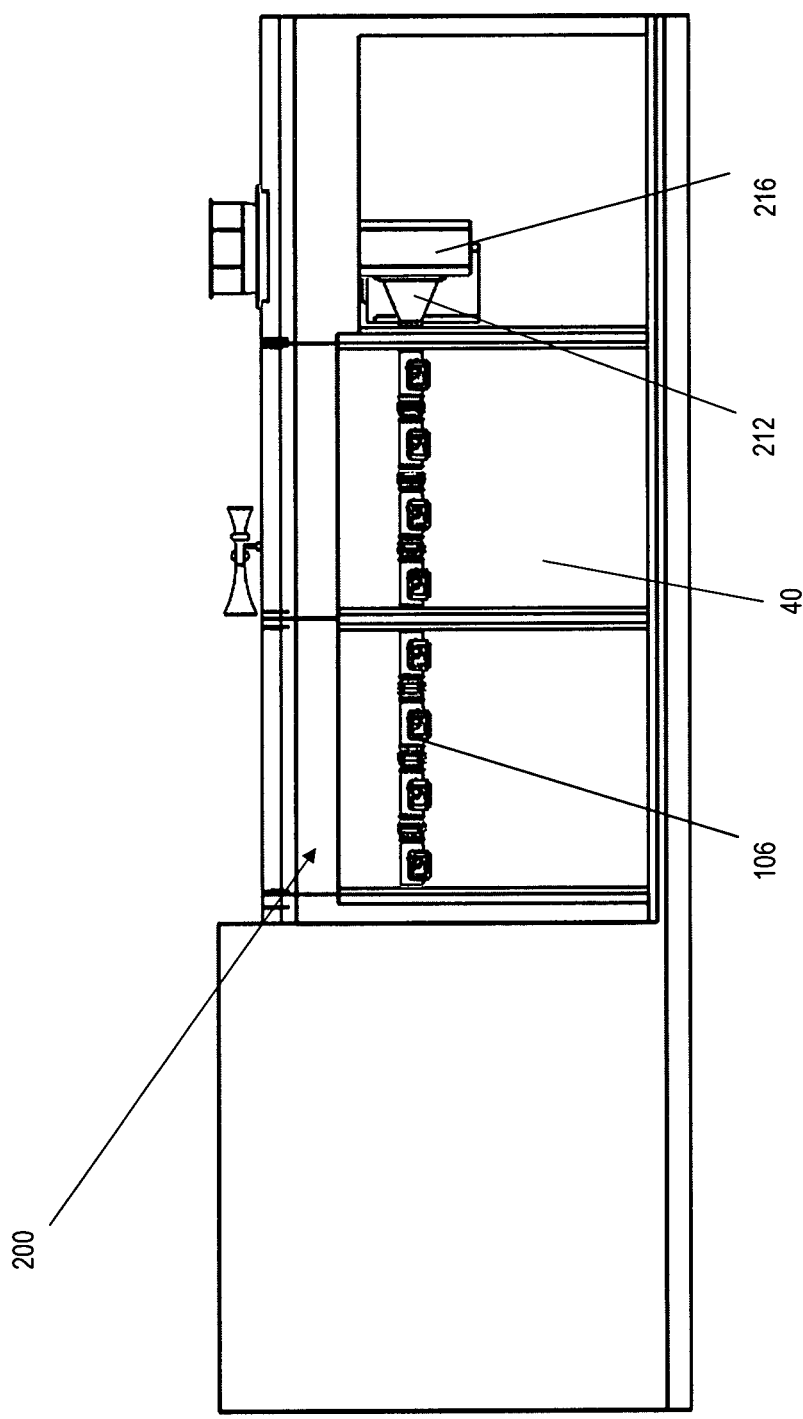
FIG. 2B illustrates another side view of an exemplary engine compartment.

FIGS. 2A and 2B illustrate side views of an exemplary locomotive engine compartment 200 consistent with embodiments disclosed herein. As shown in FIG. 2A, engine compartment 200 includes engine 40 and exhaust gas stack 102, which can be the same or similar to the exhaust gas stack previously described herein. Additionally, engine compartment 200 includes removable roof lids 206 and reinforcing structures 208. Removable roof lids 206 allow for replacement of a non-invasive mounting of an enclosure comprising components of PCU 30. Reinforcing structures 208 may comprise an assembly of metal tubes mounted around engine compartment 200 to support the weight of PCU 30 non-invasively retrofitted with engine 40 without interfering with OEM components located within engine compartment 200. Reinforcing structures 208 may be non-invasively, mechanically coupled (e.g., bolted or welded) around the frame of engine compartment 200 and removable roof lids 206. FIG. 2B depicts exhaust gas manifold 106 of engine 40 housed within engine compartment 200, which can be the same or similar to exhaust gas manifold 106 previously described. Additionally, FIG. 2B illustrates a manifold transition part 212 and the housing of OEM turbocharger 216, which are coupled to piston-cylinder assemblies (not shown) equipping engine 40.

Figure 3C:
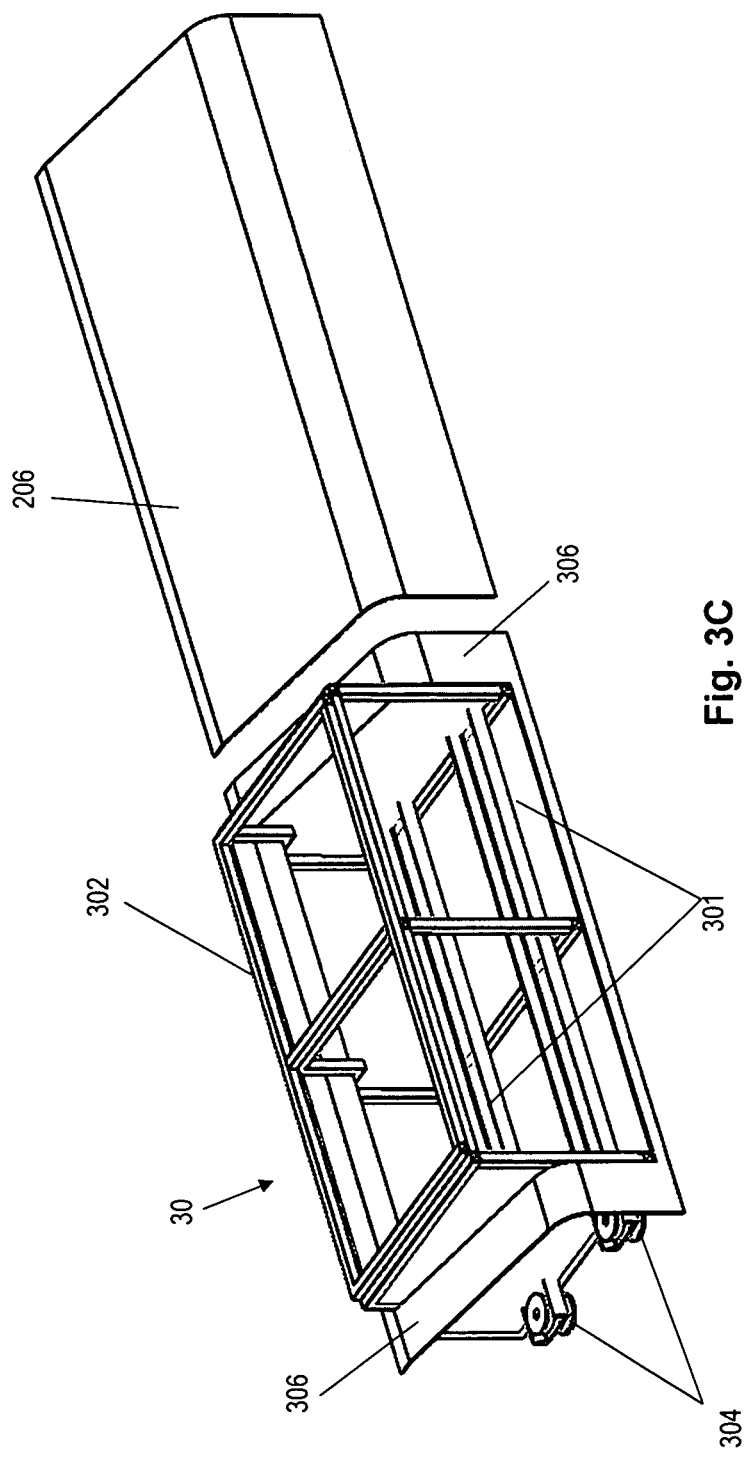
FIG. 3C illustrates a side perspective view of an exemplary PCU mounting assembly.

FIGS. 3A, 3B, and 3C illustrate perspective views of engine compartment 200 including reinforcing structures 208, which can be similar to or the same as those previously disclosed herein and referenced with number 116 in FIG. 1A. In accordance with various aspects of the present disclosure, engine compartment 200 is retrofitted with PCU 30, which can be the same or similar to that previously disclosed herein. More specifically, PCU 30 may be retrofitted with engine compartment 200 using mounting rails 301 (FIG. 3C) and a mounting enclosure 302, which may incorporate the various components of WHRC system 10 as a single module. To simplify the illustrations represented by FIGS. 3A, 3B and 3C, the various components of PCU 30 installed within mounting enclosure 302 are not illustrated. In these illustrations, mounting enclosure 302 is a skeletal representation of PCU 30.

FIGS. 3A, 3B and 3C illustrate PCU 30 retrofitted on a locomotive engine compartment (e.g., engine compartment 200) by removing roof lid(s) 206 and replacing it (them) with mounting enclosure 302 shaped so as to maintain the functions of roof lids 206 by means of extended lid surfaces 306 extending from the basic structure of mounting enclosure 302. Referring to FIGS. 3A and 3C, vibration isolators 304 (e.g., vibration absorbers, dampers, etc.), which may be the same or similar to those previously described herein, decouple PCU 30, mounting rails 301, and mounting enclosure 302 from the vibrations and shocks of engine compartment 200. In embodiments, vibration isolators 304 are coupled between a reinforcing structure retrofitted on the engine compartment (e.g., reinforcing structure 208) and mounting rails 301 or mounting enclosure 302. In embodiments, vibration isolators 304 may be actively controlled by a dynamic vibration attenuation system. FIGS. 3A, 3B, and 3C only illustrate a frame of PCU 30 and mounting enclosure 302 for simplicity, as PCU 30 comprises the components previously described herein with regard to FIGS. 1A, 1B, 1C and 1D.

FIG. 4 illustrates exemplary active isolators 403 in accordance with various aspects of the present disclosure. In this configuration, active isolators 403 may be represented by a bladder forming the isolators. In embodiments, active vibration control software (e.g., executed by controller 114) controls active isolators 403. For example, based on shocks or vibrations of engine compartment 200 (detected, e.g., by one or more accelerometers), the active vibration control software can output a vibration control signal 405 that causes active isolators 403 to actively change their shock dampening characteristics.

Figure 5:
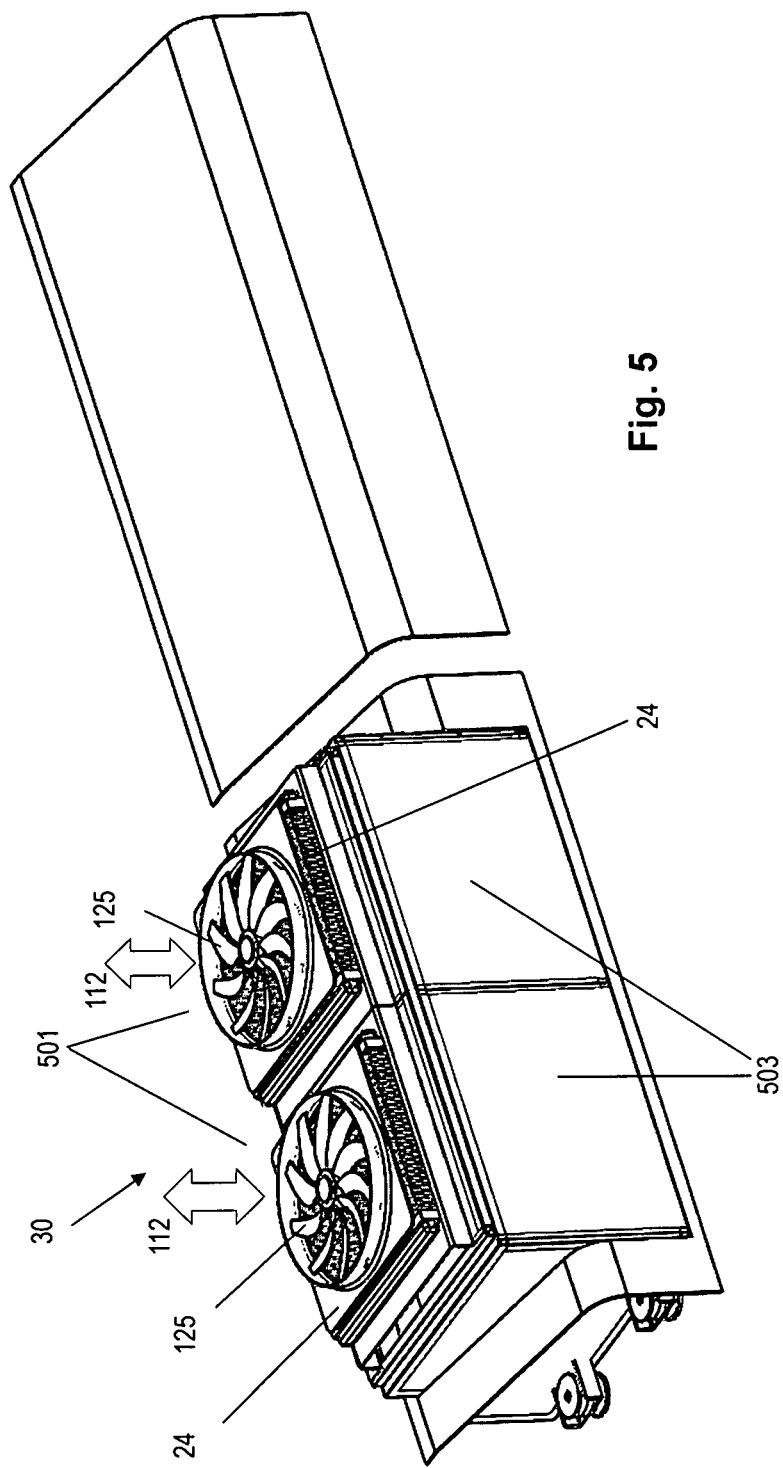
FIG. 5 illustrates a side perspective view of an exemplary PCU fitted on the hood covering an engine compartment.
Figure 6:
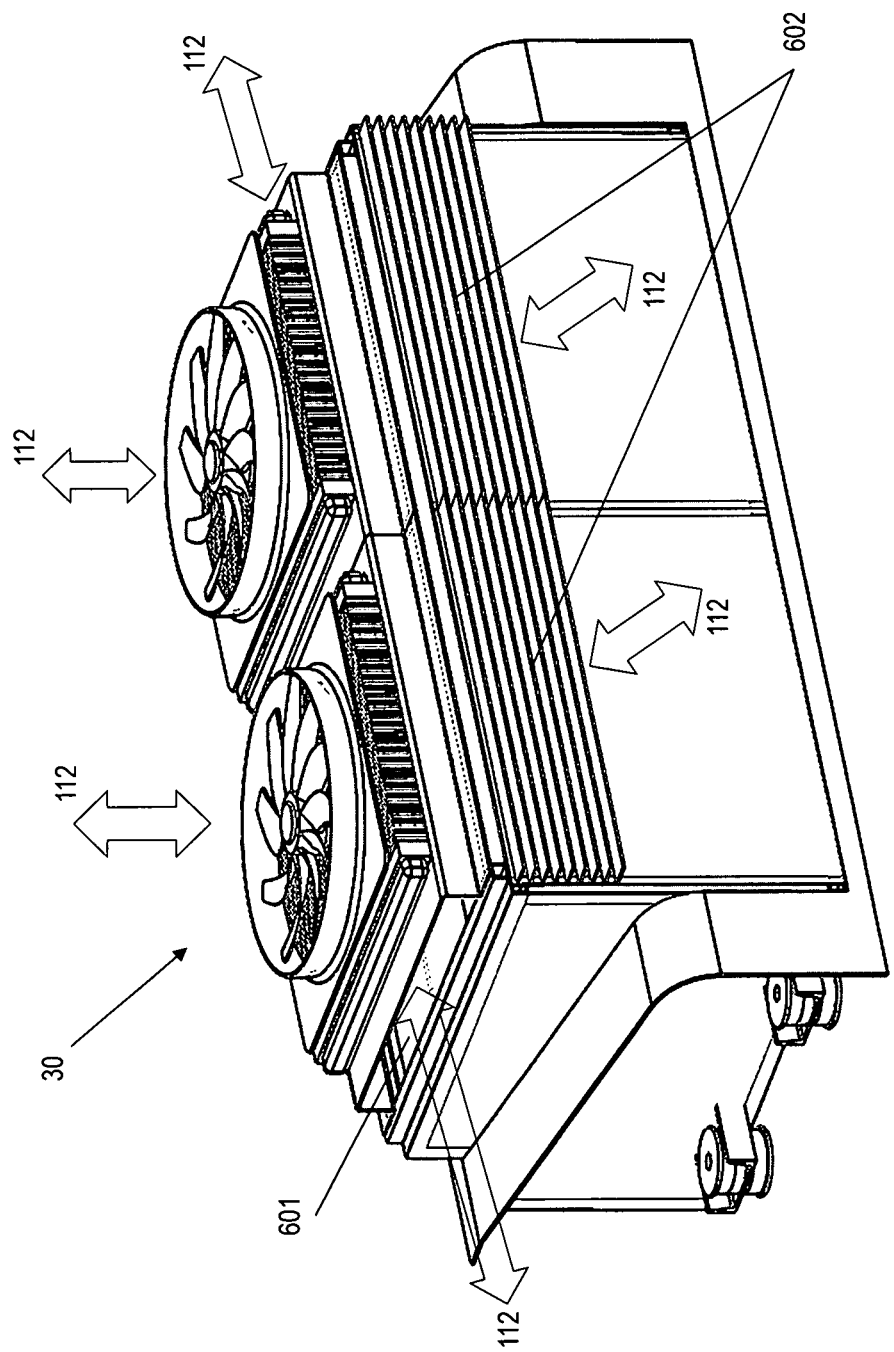
FIG. 6 illustrates a side perspective view of the exemplary PCU shown in FIG. 5.
Figure 7:
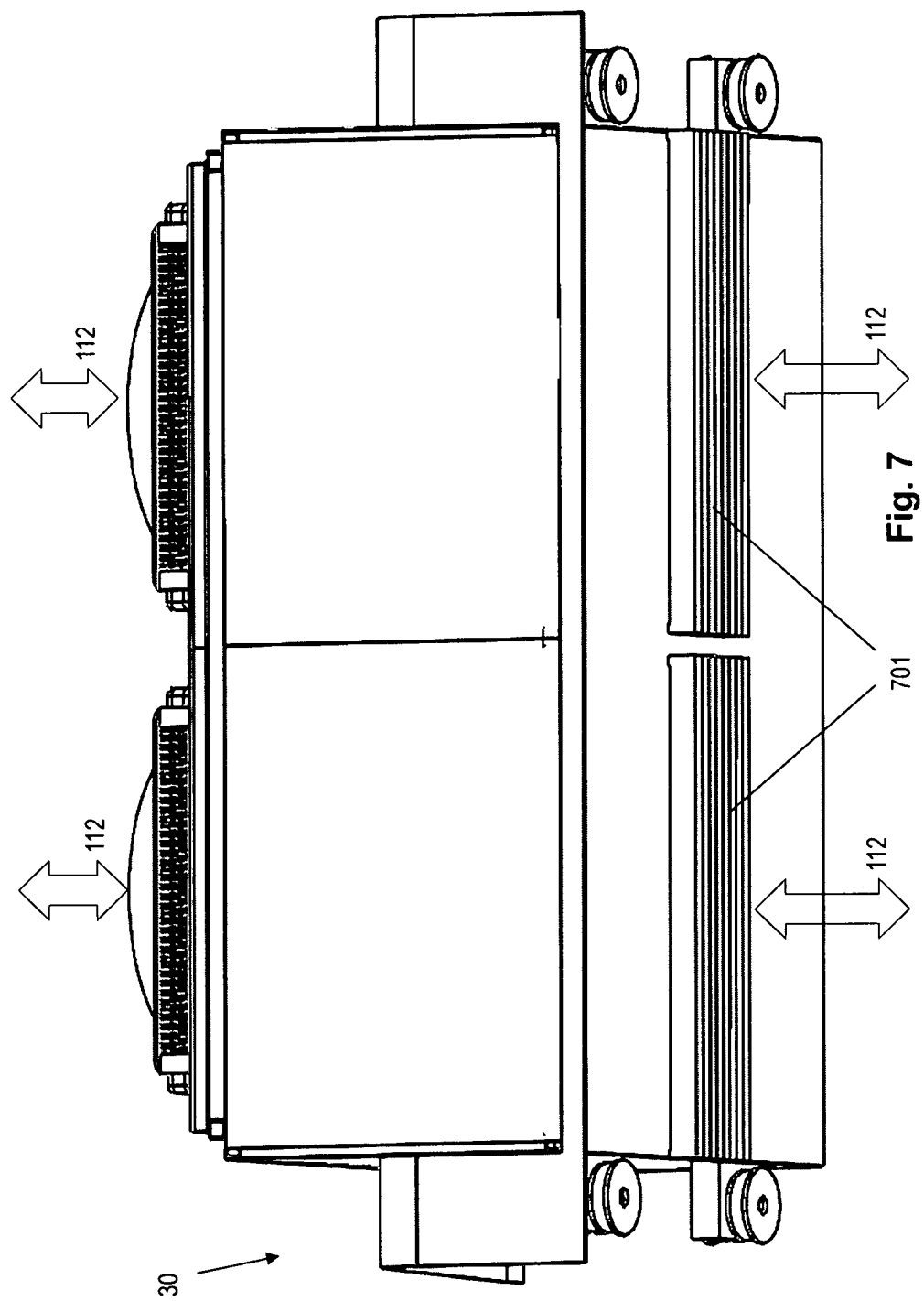
FIG. 7 illustrates a lower view of the exemplary PCU shown in FIG. 5.
Figure 8:
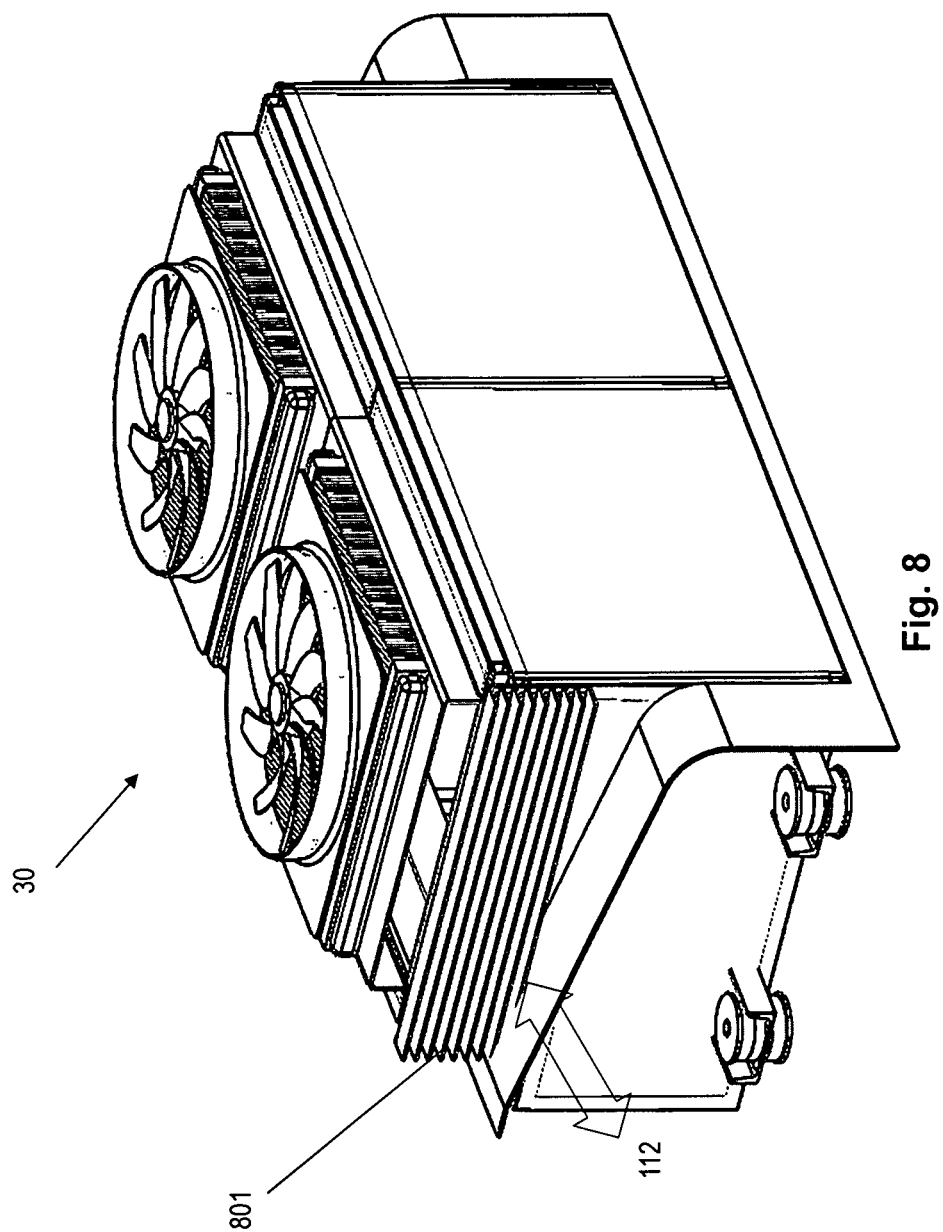
FIG. 8 illustrates a side perspective view of the exemplary PCU shown in FIG. 5.
Figure 9:
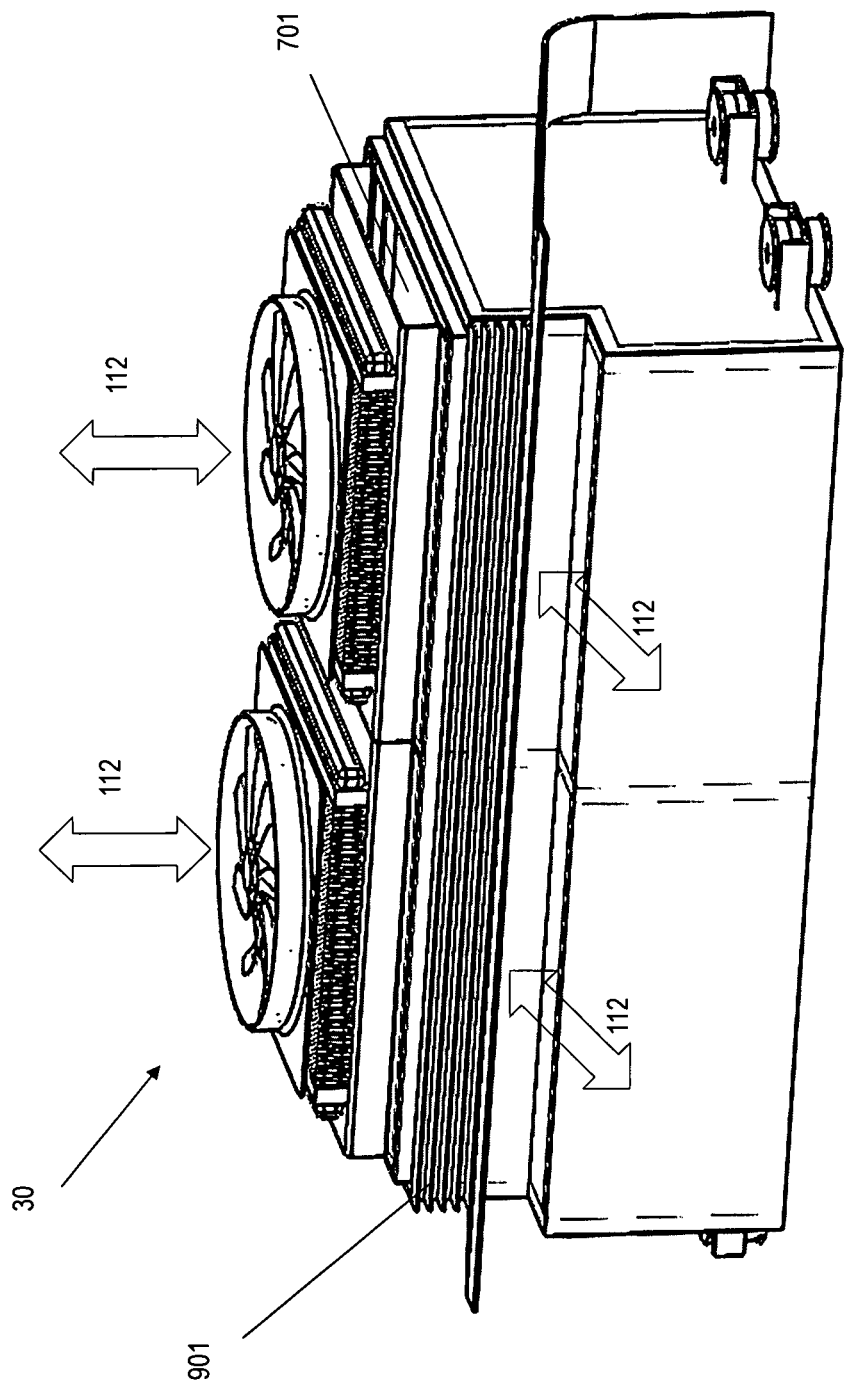
FIG. 9 illustrates a side perspective view of the exemplary PCU shown in FIG. 5.

FIG. 5 illustrates a perspective view of PCU 30 retrofitted on a structure that houses a locomotive engine compartment (e.g., engine compartment 200). In this configuration, PCU 30 is equipped with a cooling system 501 utilizing fourth fluid 112 (i.e., environmental air) and access doors 503. Cooling system 501 may be configured to include one or more C-HEXs 24 and fans 125, which can be the same or similar to those previously described herein. As depicted in FIG. 5, cooling system 501 is located on top of PCU 30. However, cooling systems 501 may be configured to exchange thermal energy with fourth fluid 112 at different locations with respect to PCU 30. For example, some of components of cooling system 501 can be located on the sides or bottom of PCU 30.

FIGS. 6, 7, 8, and 9 show exemplary configurations of one or more of cooling vents 702, 601, 602, 701, 801, and 901 that may be disposed at various locations of PCU 30, based on the flow direction of cooling fluid of different retrofitting applications.

Figure 10:
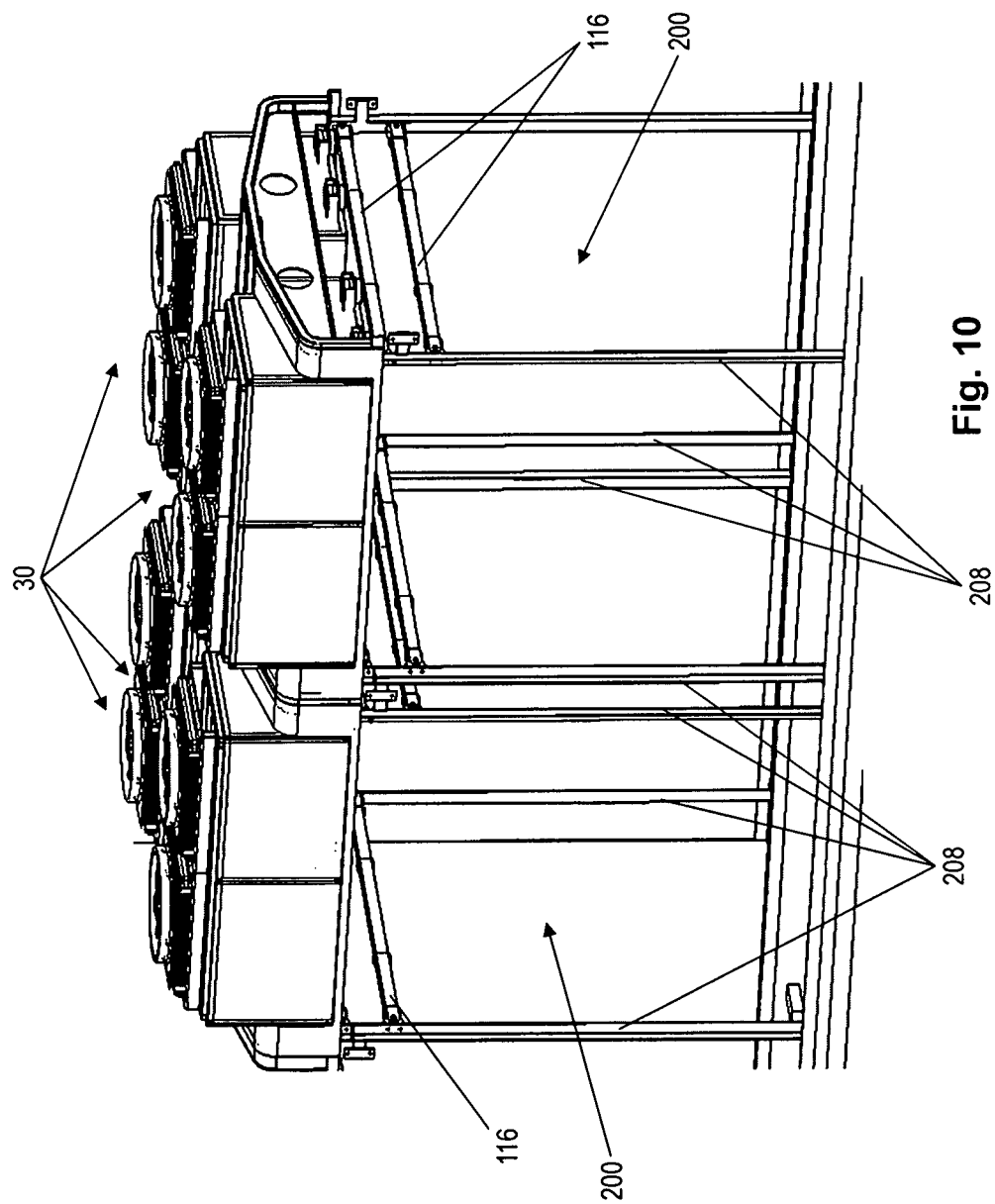
FIG. 10 illustrates a side perspective view of exemplary reinforcing structures for an engine compartment.
Figure 11:
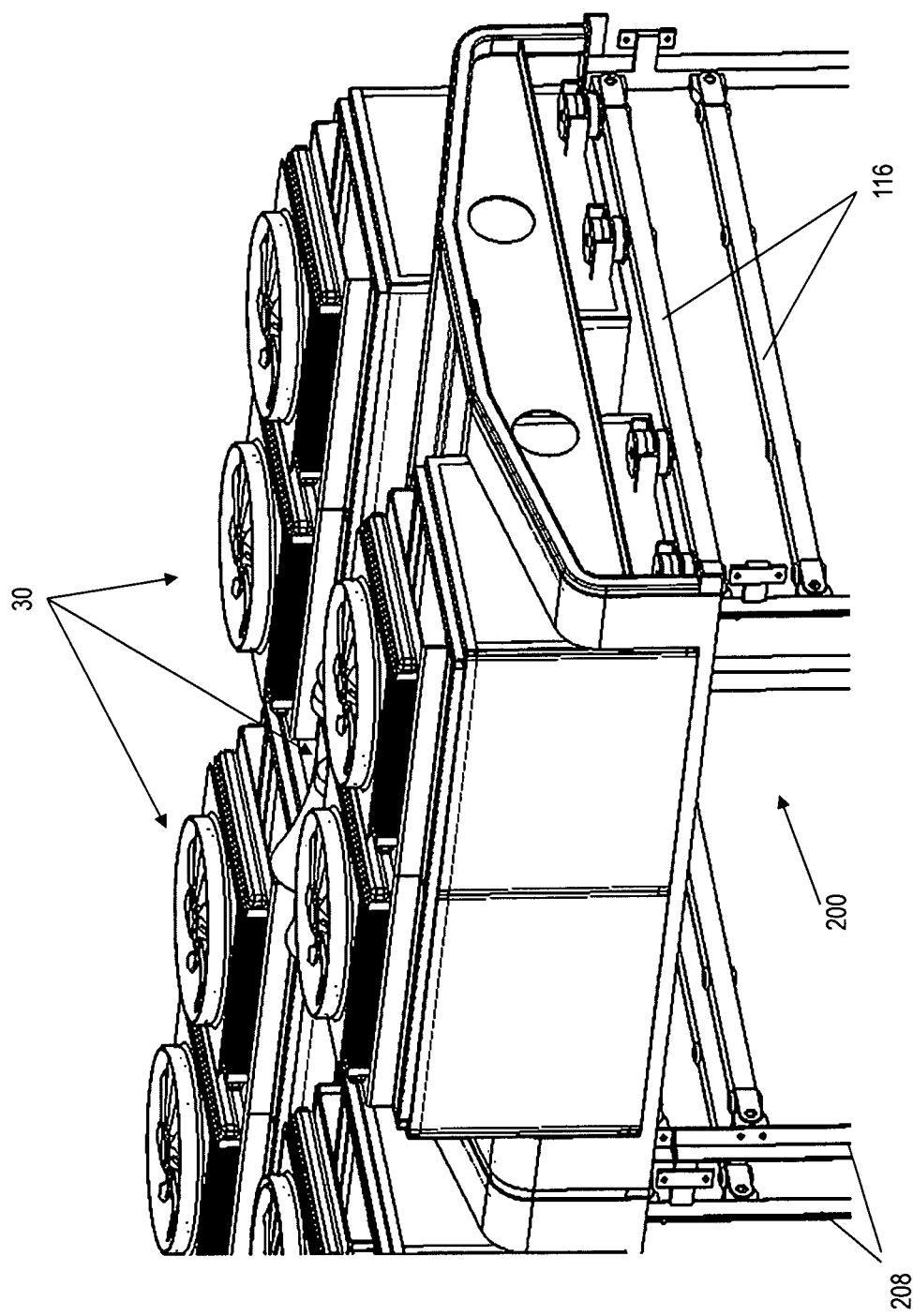
FIG. 11 illustrates side perspective view of exemplary reinforcing structures.

FIGS. 10 and 11 show exemplary perspective views of multiple PCUs 30 non-invasively replacing top lids (e.g., top lids 206 shown in FIGS. 3A and 3B) of a locomotive engine compartment (e.g., engine compartment 200) and reinforcing structures 116 and 208 forming an exoskeleton, which can be non-invasively retrofitted with engine compartment 200 to distribute the weight of one or multiple PCUs 30. Reinforcing structures 208 and 116 are non-invasive in that they do not interfere with existing structures or components in a fielded system. For example, an engine compartment (e.g., engine compartment 200) of a fielded locomotive may be retrofitted with reinforcing structures 208 and 116 to assist in supporting the weight of PCUs 30. Notably, PCU 30 may be configured to output different or same power ratings based on different engine duty cycles (e.g., of engine 40). As described in the examples, embodiments consistent with the present disclosure provide a locomotive mounting system forming the support and shield of PCU 30 that is non-invasive to the existing structure (e.g., roof lids 206) of engine compartment 200.

Figure 12A:
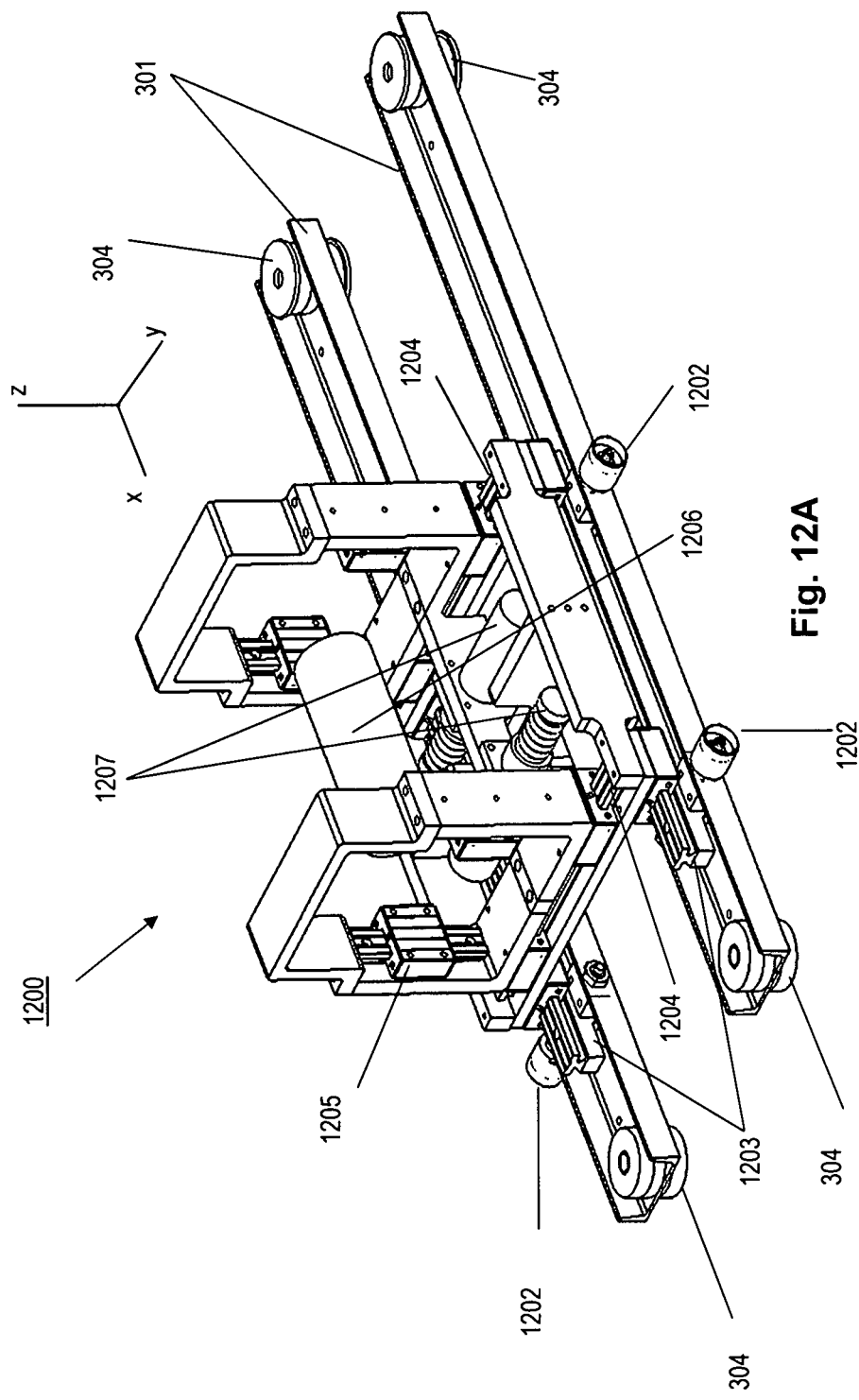
FIG. 12A illustrates a side perspective view of an exemplary vibration and impact attenuation system.
Figure 12B:
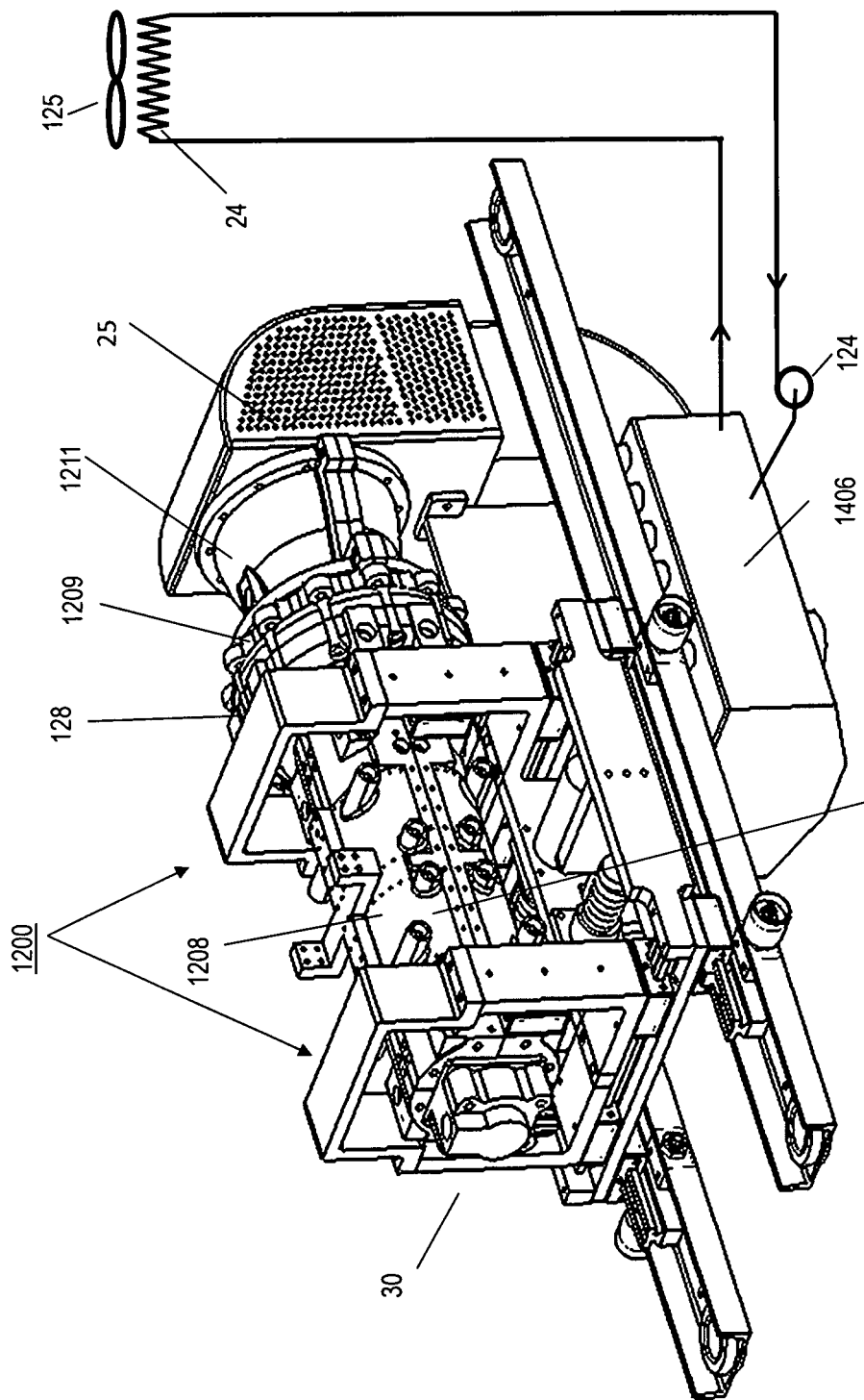
FIG. 12B illustrates a side perspective view of exemplary vibration and impact attenuation system.
Figure 12C:
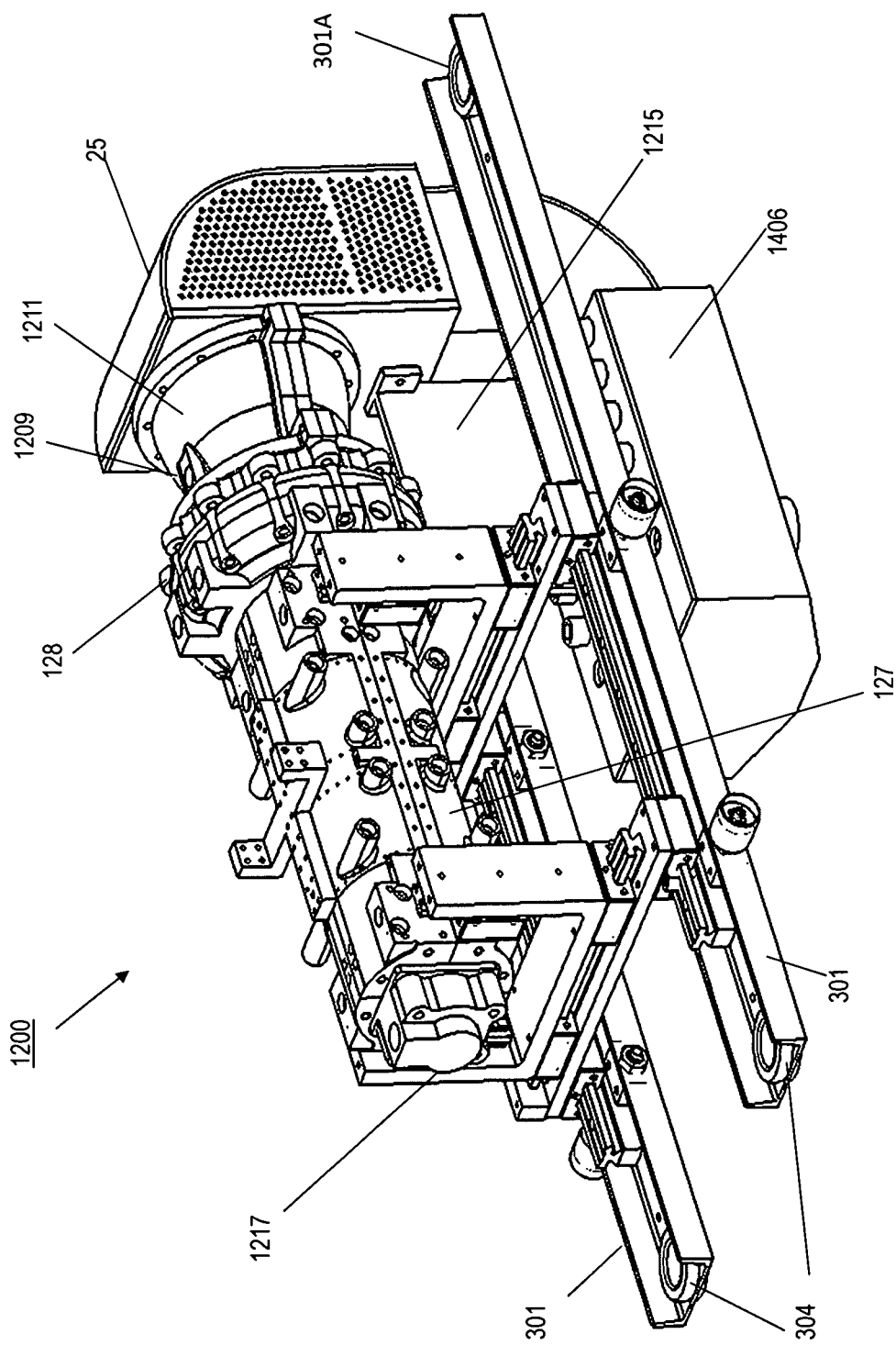
FIG. 12C illustrates a side perspective view of exemplary vibration and impact attenuation system.

FIGS. 12A, 12B, and 12C illustrate an exemplary vibration and impact attenuation system 1200 in accordance with various aspects of the present disclosure. Vibration and impact attenuation system 1200 includes mounting rails 301 and vibration isolators 304, which can be the same or similar to those previously described herein. Additionally, vibration and impact attenuation system 1200 includes a roller 1202, x-axis translators 1203, y-axis translator 1204 and z-axis translator 1205. Further, vibration and impact attenuation system 1200 includes a rotary mass 1206 representing the rotary components of PCU 30 integrated with motor/generator 127.

For clarity, FIG. 12A illustrates vibration and impact attenuation system 1200 in isolation. Vibration and impact attenuation system 1200 can be mounted on mounting rails 301 and vibration isolators 304. For reference, FIG. 12A depicts the primary x-, y-, and z-axes of motion, where the x-axis and the y-axis are in the plane of the ground, and the z-axis is vertical with respect to the ground. Vibration and impact attenuation system 1200 includes roller 1202, x-axis translators 1203, y-axis translator 1204 and z-axis translator 1205, which permit vibration and impact attenuation system 1200 to translate vertically, laterally, and longitudinally. For each axis translator, dedicated active or passive attenuation dampening systems 1207 are coupled to vibration and impact attenuation system 1200. Attenuation dampening systems 1207 may be spring-loaded shock and dampening absorbers (i.e., passive) or by active dampening system controlled by controller 114. Further, embodiments of vibration and impact attenuation system 1200 may include rotary masses 1206 coupled (e.g., by bearings) to brackets of z-axis translator 1205, which mitigates or neutralize vibrations, shocks, and impacts to the rotary mass and couplers in a PCU (e.g., electrical generator/motor 127, turbine expander 128, turbo-compressor turbine 122, couplers, and rotary components of bearing systems).

FIG. 12B illustrates vibration and impact attenuation system 1200 incorporating an exemplary PCU 30, which can be the same or similar to that previously described herein. Additionally, PCU 30 includes a housing 1208 and a volute 1209 containing bearings, multistage turbine stators and rotors, seals and pressure inlet(s) for a fluid (e.g., first fluid 29) to expand via turbine expander 128. Volute 1209 may be coupled to a diffuser system 1211. Diffuser 1211 may be configured to increase the discharge efficiency of first fluid 29 (e.g., working fluid) exiting turbine expander 128, prior to entering EX-HEX 25, by reducing back pressure at the discharge of turbine expander 128 while structurally supporting a flow deflector for first fluid 29 discharging from EX-HEX 25 and entering C-HEX 24 where pump 124 may be integrated within housing 1406.

FIG. 12C illustrates additional features of the integral internal components forming PCU 30 housed and coupled by vibration and impact attenuation system 1200. More specifically, a structural component 1215 mechanically couples electric generator/motor 127, turbine expander 128, volute 1209, diffuser 1211, and EX-HEX 25 (as well as the portions of C-HEX 24, shown in FIG. 12B, disposed within housing 1406) to provide a rigid system supported by a secondary vibration and impact attenuation system 1200, mounting rails 301, and primary vibration isolators 304, which extends protection of all components of PCU 30 from vibrations and impacts. Notably, a coupling 1217 provides an interface for compressor system (e.g., turbo-compressor turbine 122) to be mechanically coupled to the rotary components of electric generator/motor 127.

Figure 13A:
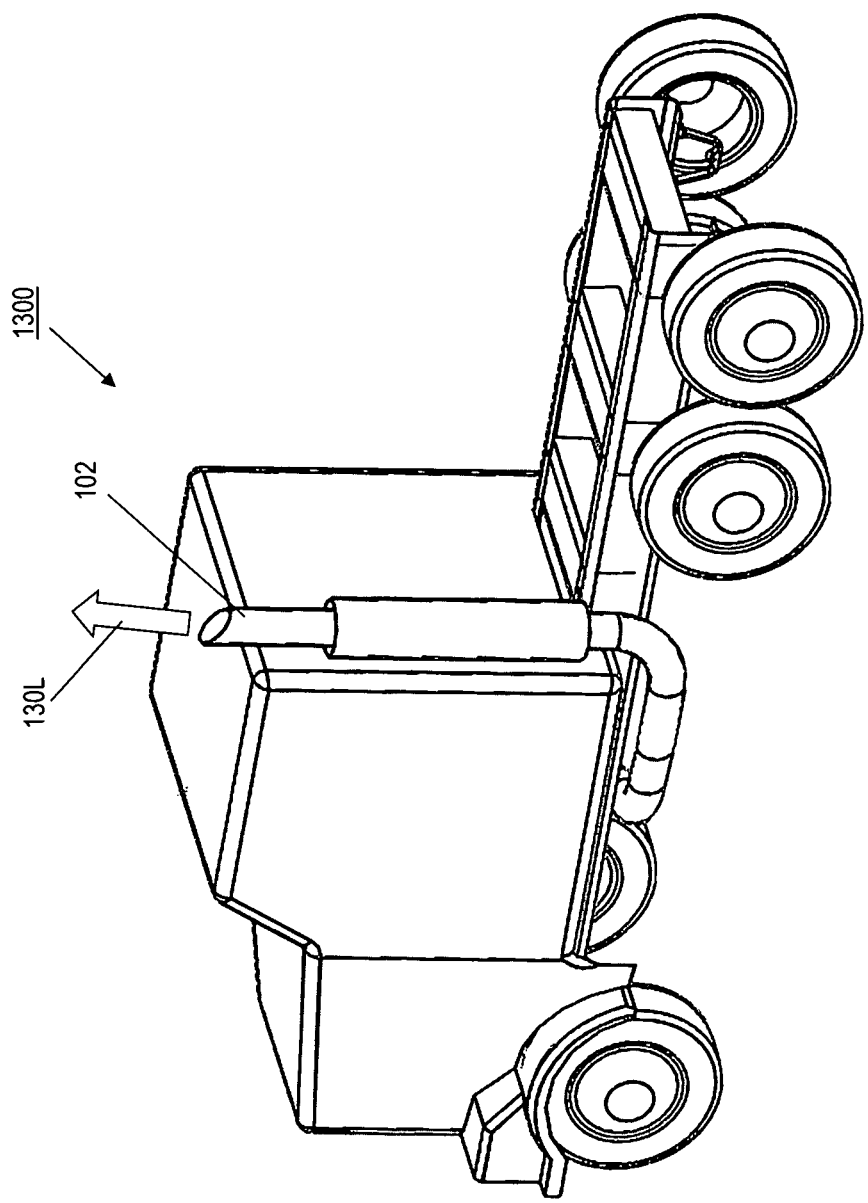
FIG. 13A illustrates a rear perspective view of an exemplary automotive vehicle platform.
Figure 13B:
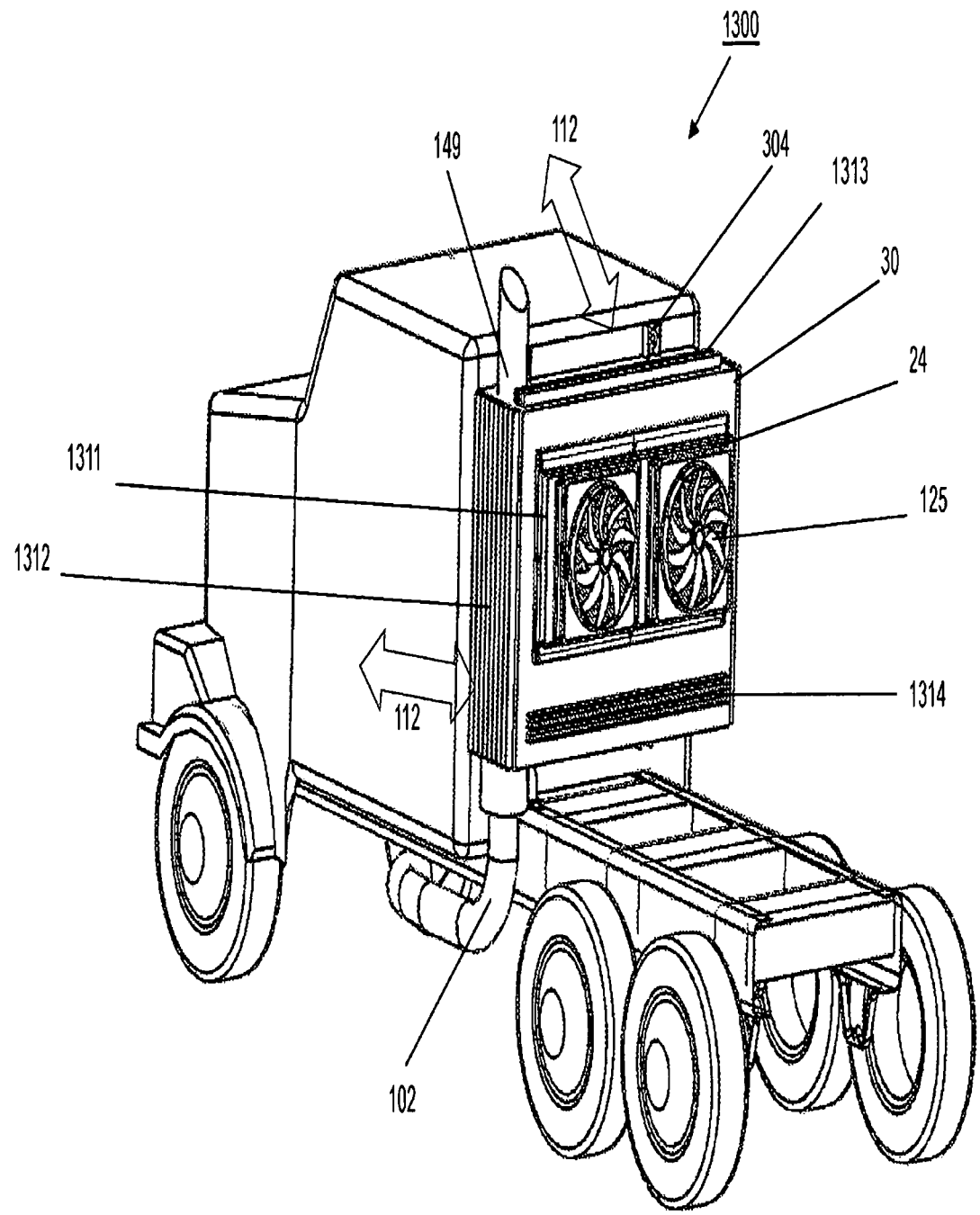
FIG. 13B illustrates a rear perspective view of an exemplary PCU fitted to an automotive vehicle platform in accordance with various aspects of the present disclosure.

FIGS. 13A to 13E illustrate an exemplary PCU 30 implemented on an automotive platform 1300. PCU 30 can be the same as or similar to that previously described herein. In accordance with various aspects of the present disclosure, PCU 30 can be non-invasively retrofitted on an existing and/or a previously fielded automotive platform 1300. Consistent with examples previously described herein, automotive platform 1300 includes an engine (e.g., engine 40) and exhaust gas stack 102, where relatively low-temperature second fluids 130L (e.g., exhaust gases) are vented to atmosphere. Additionally, automotive platform 1300 includes a primary vibration attenuation system (e.g., isolators 304) and a secondary vibration and shock attenuation system (e.g., vibration and impact attenuation system 1200), which can be the same as or similar to those previously described herein. FIG. 13B illustrates an example of PCU 30 mounted on the rear of automotive platform 1300. As shown, PCU 30 may be configured to encompass and/or to incorporate at least a portion of exhaust gas stack 102 so as to integrate conduit 149 described in FIG. 1D. PCU 30, including C-HEX 24 and fans 125, can be the same as or similar to those previously described herein. Further, PCU 30 includes cooling vents 1311, 1312, 1313, and 1314 that, along with fans 125 and C-HEX 24, may operate at varying rates based on the air-cooling flows surrounding automotive platform 1300. Exemplary embodiments of PCU 30 non-invasively retrofitted on automotive platform 1300 may be configured to provide cooling fourth fluid 112 flows (e.g., environmental air), through air flow baffles (not shown), proportionally to the speed of automotive platform 1300, thereby minimizing or eliminating the need for cooling fans 125 in PCU 30.

Figure 13C:
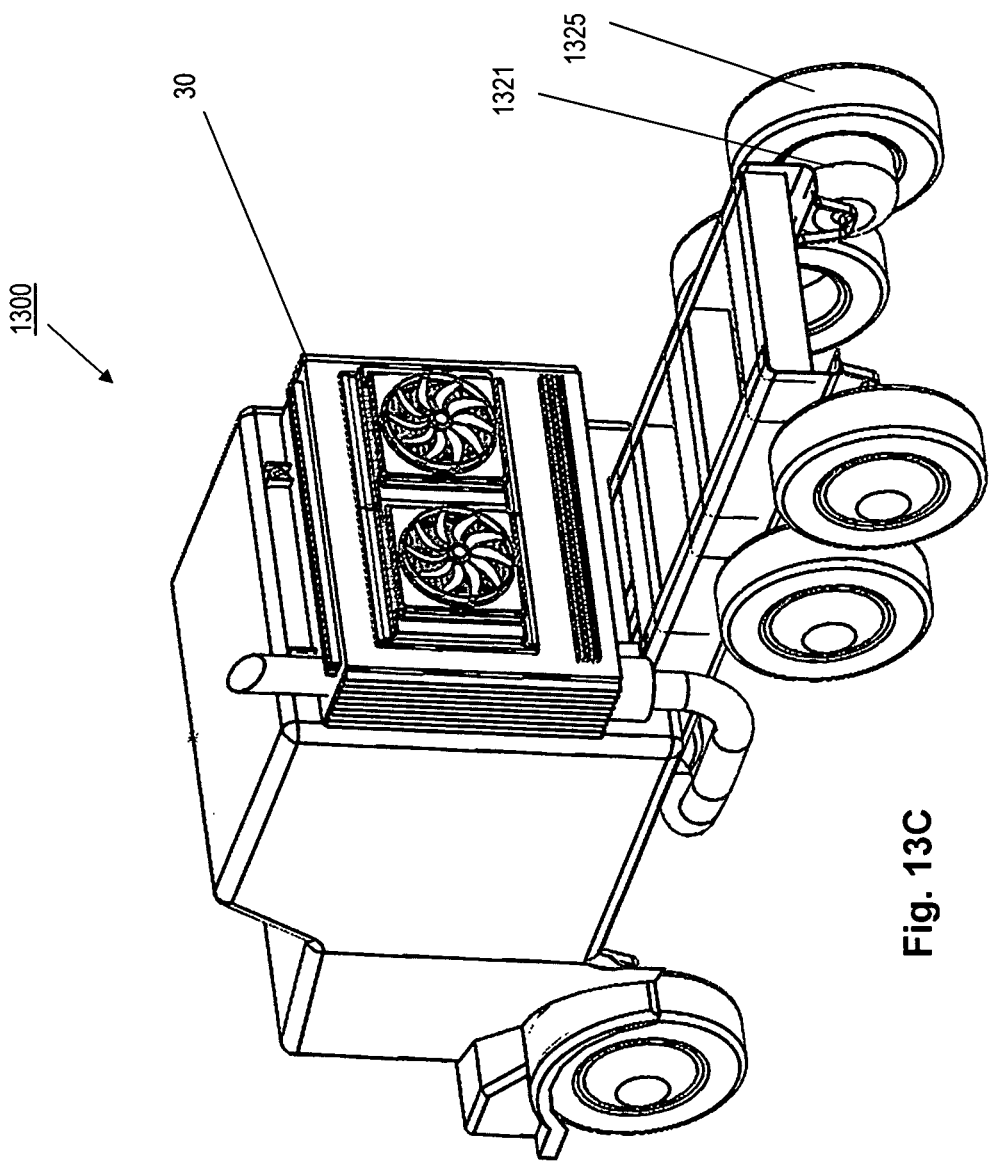
FIG. 13C illustrates a rear perspective view of an exemplary PCU fitted to an automotive vehicle platform.
Figure 13D:
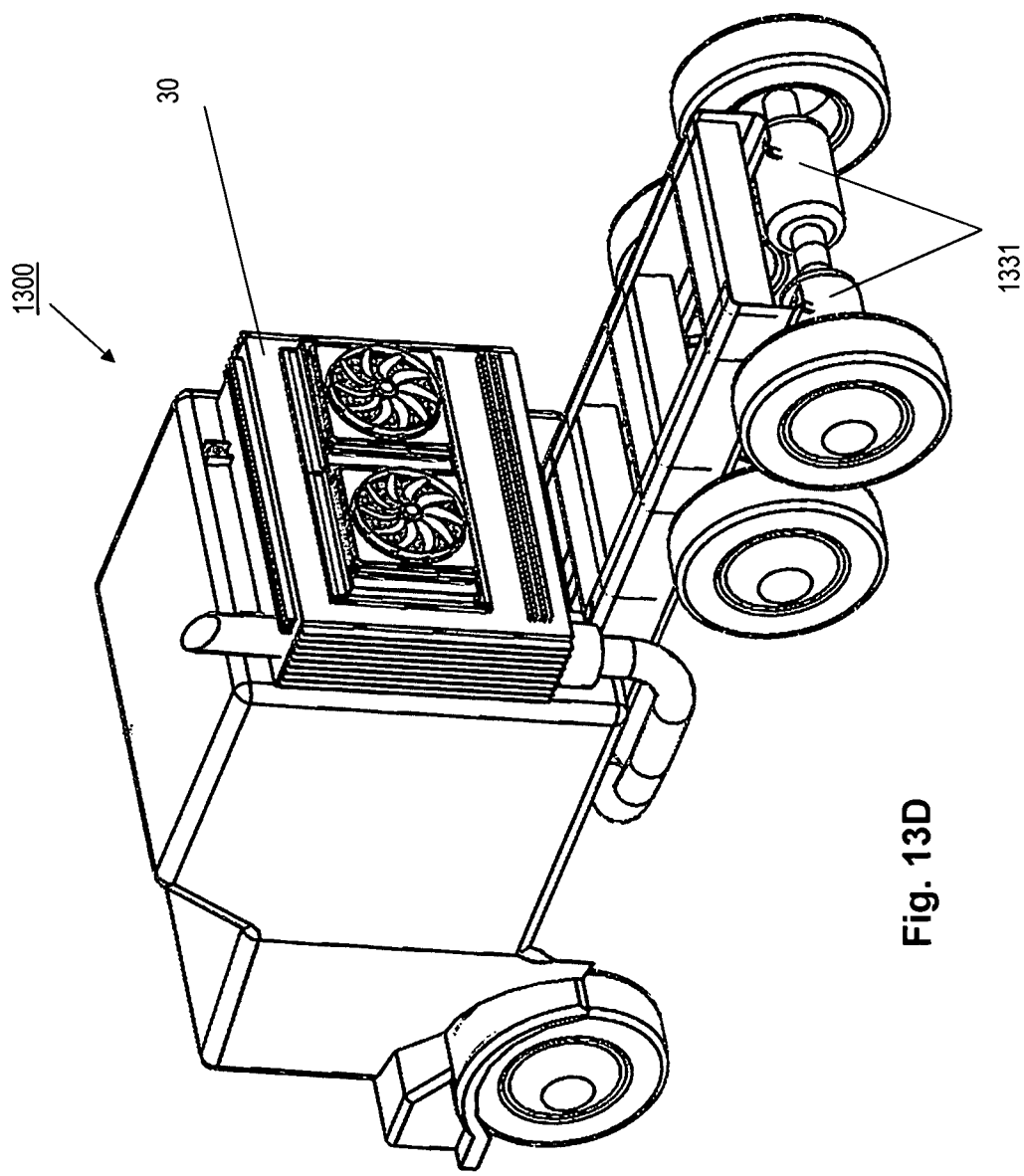
FIG. 13D illustrates a rear perspective view of an exemplary PCU fitted to an automotive vehicle platform.
Figure 13E:
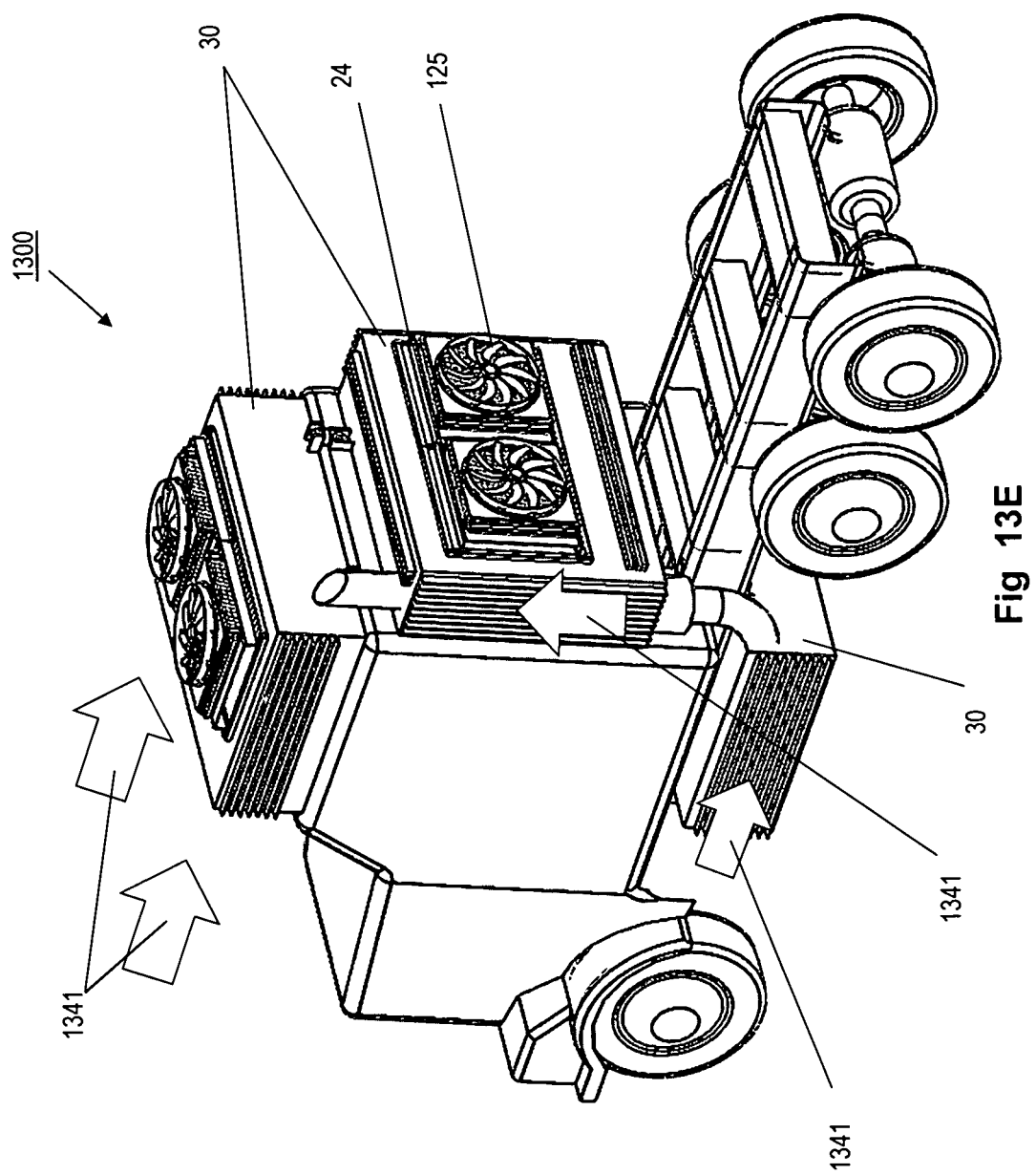
FIG. 13E illustrates a rear perspective view of an exemplary PCU fitted to an automotive vehicle platform.

As described previously, PCU 30 is part of a WHRC system 10 that generates electrical power using WTESs as those represented by the operation of the internal combustion engine (e.g., engine 40). In accordance with various aspects of the present disclosure, FIG. 13C illustrates a traction motor 1321 coupled to a wheel 1325 of automotive platform 1300. Traction motor 1321 comprises an electronic motor (induction or permanent magnet) that directly or indirectly drives wheel 1325. PCU 30 transforms waste thermal energy into electricity that can be utilized to support auxiliary electric loads (e.g., refrigeration units for special transports) of automotive platform 1300, as well as propulsion, which reduces fuel consumption and pollutant emissions. In embodiments, PCU 30 may also charge battery packs that can be charged by regenerative braking energy generated by traction motor 1321. FIG. 13D illustrates automotive platform 1300 fitted with one or multiple traction motors 1331 driven by PCU 30, which may be on automotive platform 1300 and may integrate battery packs representing an electric energy storage mechanism recharged by regenerative breaking and by motor/generator 127 of PCU 30. FIG. 13E describes various configurations of PCU 30 that utilize air-cooling flows 1341, generated by the motion of automotive platform 1300, to increase the efficiency of PCU 30 and reduce the size of C-HEX 24 and fans 125. In this configuration, PCU 30 cooling surfaces may be positioned in a manner that generate minimum friction with respect to the air flow generated by motion of automotive platform 1300. As shown, one or multiple PCU 30 may be configured for installation on top, sides, or bottom of automotive platform 1300. PCU 30 represented is not to scale.

Figure 14:
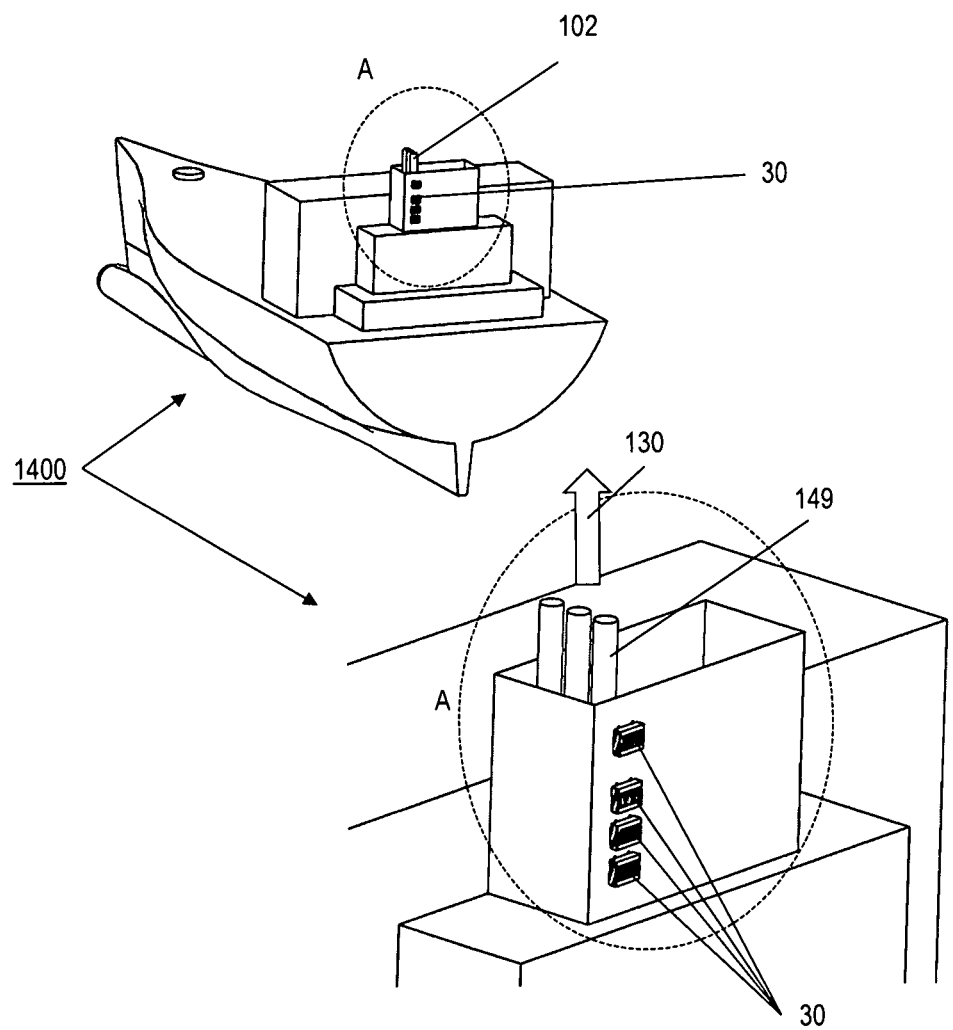
FIG. 14 illustrates perspective views of an exemplary PCU fitted to a marine transport platform in accordance with various aspects of the present disclosure.

WHRC system 10 and PCU 30 in accordance with the present disclosure are not limited to implementations on locomotives and automobiles. For example, FIG. 14 illustrates one or multiple PCUs 30 clustered in the vicinity of exhaust gas stacks 102 so as to convert waste thermal energy produced by a marine platform 1400. In this configuration, the electricity produced by conversion of second fluids 130 (e.g., exhaust gases) from one or multiple marine diesel engines equipping, for example, a transoceanic marine vessel, may be conditioned by PCUs 30 (e.g., using controller 114, electrical generator/motor 127, and power conditioner 141) for distribution to a marine platform switchyard and electric bus. In this configuration, a single PCU 30 may be scaled to match the power rating represented by the waste energy contained in second fluids 130. Alternatively, a plurality of modular PCUs 30 may be clustered (e.g., as shown in the magnified "area A" illustrated in FIG. 14) to match the total energy represented by second fluid 130.

FIG. 15A illustrates an exemplary PCU 30 coupled to a Diesel Multiple Unit (DMU) 1500 having one or multiple engines 40 in accordance with various aspects of the present disclosure. PCU 30 and engine 40 can be the same as or similar to those previously described herein. PCU 30 can be mounted to DMU 1500 using a primary vibration and shock attenuation system (e.g., vibration isolators 304 and/or active isolators 405) and a secondary vibration and shock attenuation system (e.g., vibration and impact attenuation system 1200) in a manner that is the same as or similar to that previously descried herein. Further, vents (e.g., vents 1311, 1312, 1313 and 1314), C-HEX (e.g., C-HEX 24) and fans (e.g., fans 125), which can be the same as or similar to those previously described herein, can be configured to not interfere with existing equipment of DMU 1500 and to maximize air-cooling flows for high conversion efficiency of PCU 30.

Figure 15C:
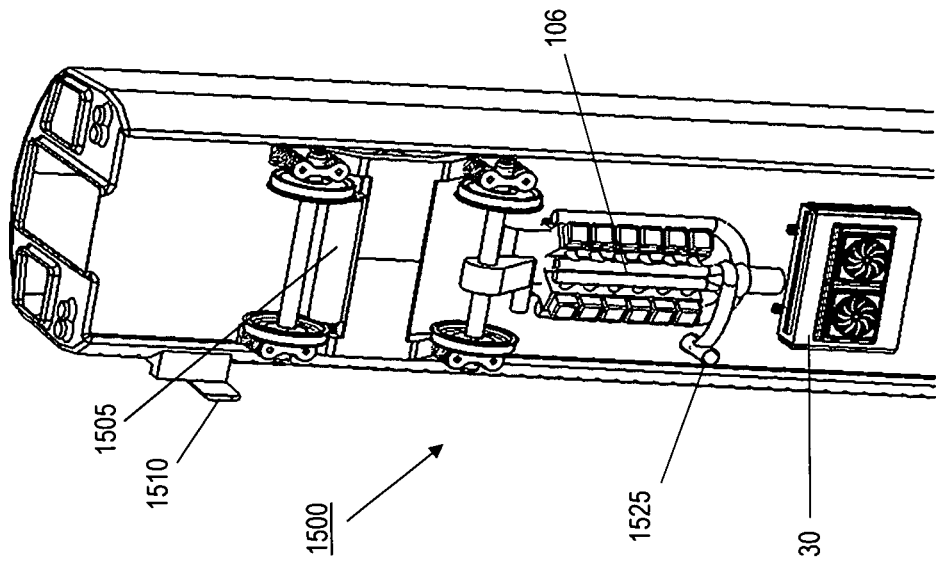
FIG. 15C illustrates a bottom perspective view of an exemplary PCU coupled to a DMU.
Figure 15B:
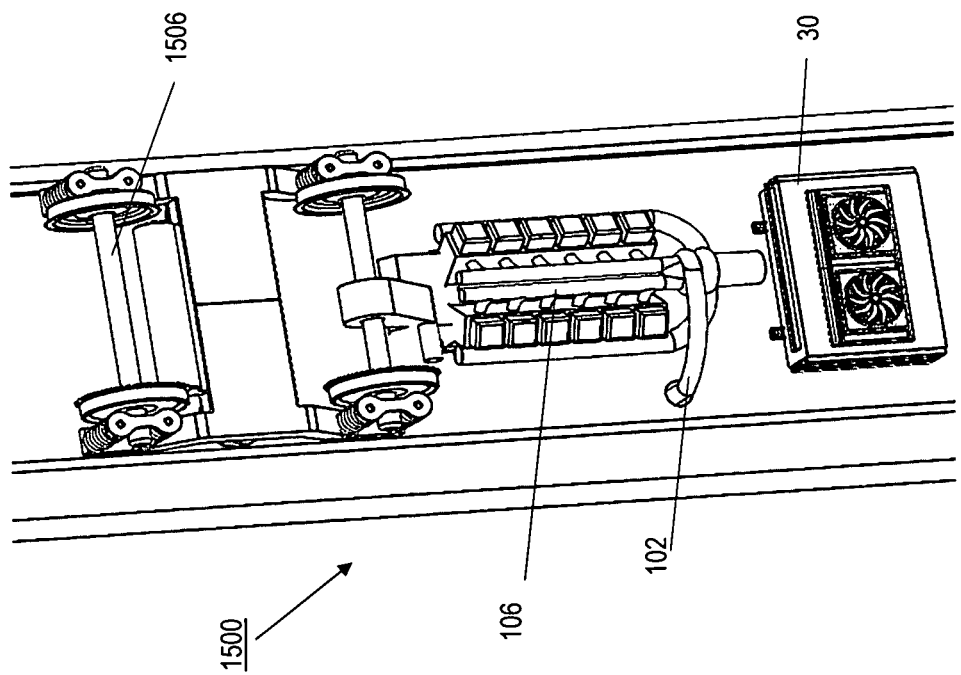
FIG. 15B illustrates a bottom perspective view of an exemplary PCU coupled to a DMU.

As previously described herein, PCU 30 can convert waste heat generated by engine 40 (e.g., thermal energy of electrical and exhaust systems) to electric power, which may be then distributed to the various loads. For example, electricity generated by PCU 30 (e.g., using electric generator/motor 127 and turbine expander 128) may be distributed to support auxiliary loads (e.g., cooling systems) and batteries, as well as OEM or retrofitted traction motors 1505. Additionally, in some examples, PCU 30 may distribute power to an electrical supply grid via a third rail connection or a pantograph connection. Traction motors 1505 may be configured as a permanent magnet or as an induction machine retrofitted and coupled with at least one of axles 1506 of DMU 1500. FIGS. 15B and 15C illustrate examples of DMU 1500 including a fitting of exhaust gas stack 102 in FIG. 15B to a modified stack 1525 (FIG. 15C) to allow retrofitting of S-HEX 22.

Figure 21A:
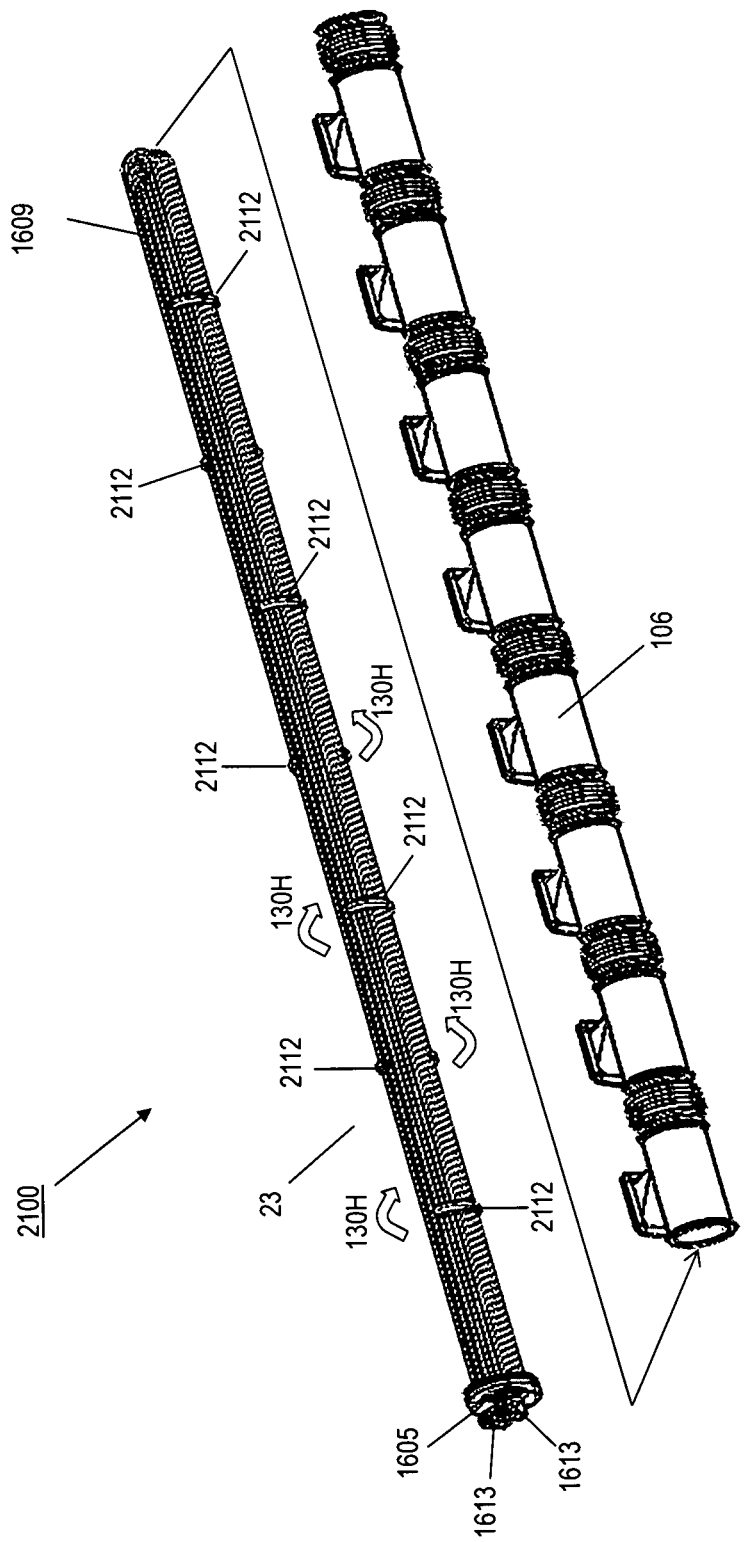
FIG. 21A illustrates a side perspective view of an exemplary process of fitting a manifold heat exchanger.

FIG. 16 illustrates an exemplary fitting (or retrofitting) of M-HEX 23 through exhaust gas manifold 106 of DMU 1500 in accordance with various aspects of the present disclosure. M-HEX 23, exhaust gas manifold 106, and DMU 1500 can be the same as or similar to those previously described herein. M-HEX 23 includes a sealing header 1605, tube bundles 1609, and inlets/outlets 1613. Sealing header 1605 may be configured to be non-invasive and reversibly retrofitted to exhaust gas manifold 106 by coupling and sealing it to an end portion of exhaust gas manifold 106. First fluid 29 may circulate through tube bundles 1609 via inlets and outlets 1613, while on the "shell side" now formed by exhaust gas manifold 106, high temperature second fluid 130H circulates as a result of operation of engine 40. An exemplary configuration of tube bundles 1609 is also shown in FIG. 21A.

Figure 17A:
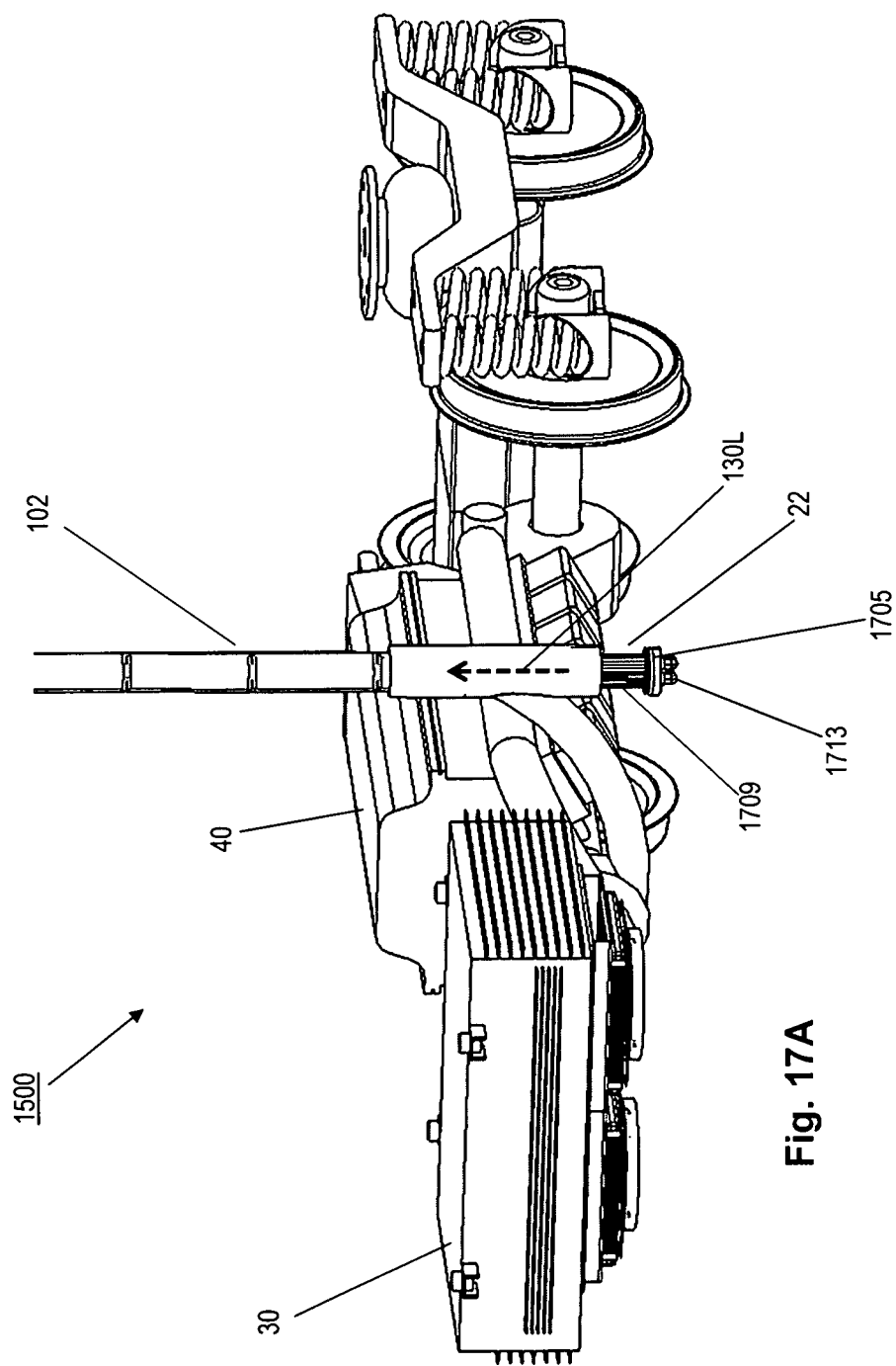
FIG. 17A illustrates a side perspective view of an exemplary fitting of a stack heat exchanger to an exhaust stack.
Figure 17B:
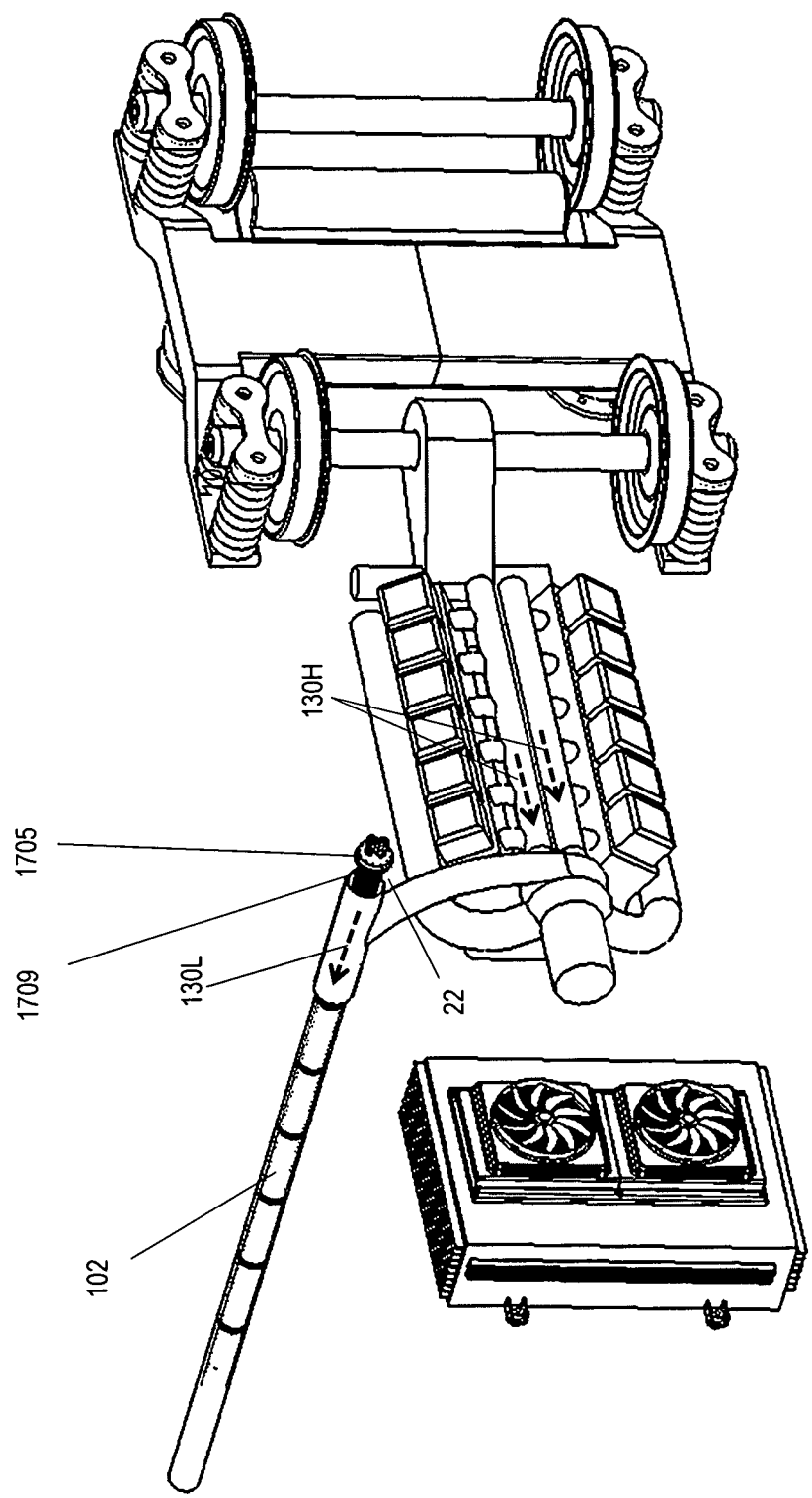
FIG. 17B illustrates a bottom perspective view of an exemplary fitting of a stack heat exchanger to an exhaust stack.

FIGS. 17A and 17B illustrate perspective views of an exemplary fitting (or retrofitting) of S-HEX 22 through exhaust gas stack 102. S-HEX 22 and exhaust gas stack 102 can be the same as or similar to those previously described herein. S-HEX 22 includes a sealing header 1705, tube bundle 1709, and inlets/outlets 1713. The dashed arrow indicates the direction in which tube bundle 1709 (e.g., S-HEX 22) is inserted in exhaust gas stack 102 for final positioning. Sealing header 1705 may be non-permanently fit to exhaust gas stack 102 by coupling it to an end portion of exhaust gas stack 102 to seal exhaust gas stack 102. First fluid 29 may circulate through tube bundles 1709 via inlets and outlets 1713, while low temperature second fluid 130L (e.g., exhaust gases after expansion in the OEM turbocharger) circulates on the "shell side" formed by the outer surfaces of tube bundle 1709 and the inner surfaces of exhaust gas stack 102.

FIGS. 18A and 18B illustrate a non-permanent, high-pressure heat exchanger sealing header 1800, which may be the same as or similar to sealing header 1605 and sealing header 1705 previously described herein. Sealing header 1800 seals a tube 1805 (e.g., tube bundles 1609 and 1709) to tube sheet 1809 by utilizing a hole 1801 (e.g., a custom profiled hole) in tube sheet 1809 that receives a nut 1817 (e.g., a custom designed or standard nut), a cutting ring 1821 and a ferrule 1825 for a close fitting into conical seat 1826 concentric with hole 1801. More specifically, nut 1817 mechanically engages tube sheet 1809 (e.g., by thread) and compresses cutting ring 1821 and ferrule 1825 against conical seat 1826 (e.g., a specially designed seat) inside hole 1801 to force cutting ring 1821 and ferrule 1825 into the outer wall of tube 1805. Cutting ring 1821 aligns ferrule 1825 between cutting ring 1821 and nut 1817, thereby sealing and enhancing mechanical coupling of the assembly, even under severe vibrations. The contact between cutting ring 1821 and ferrule 1825, tube sheet 1809 and tube 1805 executed by tightening nut 1817 secures tube 1805 in tube sheet 1809 and provides a high-pressure seal between tube 1805 and tube sheet 1809. The high pressure seal allows any fluid to inlet header cap 1829 through inlet/outlet 1833 into header cavity 1837 and ensures that a fluid may inlet or outlet tube 1805 without leakage at the interface between tube sheet 1809 and tube 1805. Header cap 1829 and tube sheet 1809 may be mechanically coupled and sealed by seal 1813. The integrated nature of the custom or special hole profile allows for this method and apparatus to be applied to heat exchanger headers with any number of holes/tubes and can be adjusted for any size tube utilized in any application involving tube sealing and mechanical support. This non-permanent tube sealing feature allows for replacement of leaky or damaged tubes without major equipment requirements to remove permanently affixed tubes and thus reduce the time and cost to replace a leaky tube from heat exchangers.

FIGS. 19A and 19B illustrate a large tube header 1900 fitted with high-pressure heat exchanger sealing tube-header interface similar to that described in FIGS. 18A and 18B. More specifically, FIG. 19A shows a sealing method between sealing header 1809 and a header cup 1829 of a single exemplary tube 1805. FIG. 19B shows large tube header 1900, where tube header 1909 may be configured to seal multiple tubes 1805 (not shown) through holes 1901. Holes 1901 are configured to accommodate internally conical seats similar to or the same as those shown in FIGS. 18A, 18B and 19A (e.g., conical seat 1826). The exemplary embodiment of large tube header 1900 may be configured to have partitions to separate a given number of tubes 1901 from another given number of tubes 1901 sealed to the same tube header 1909. For example, tube header 1909 includes a first header portion 1902 and a second header portion 1903, which may be symmetrical with respect to one another. First header portion 1902 and second header portion 1903 may be configured to seal two different first fluids 29 as seal 1913 separates and seals these symmetrical header portions 1902 and 1903. The shape of tube header 1900 may be any suitable shape, such as circular, rectangular, square, triangular, polygonal, and curved. Accordingly, the shape of the header cup may have a shape matching that of tube header 1909.

Figure 20A:
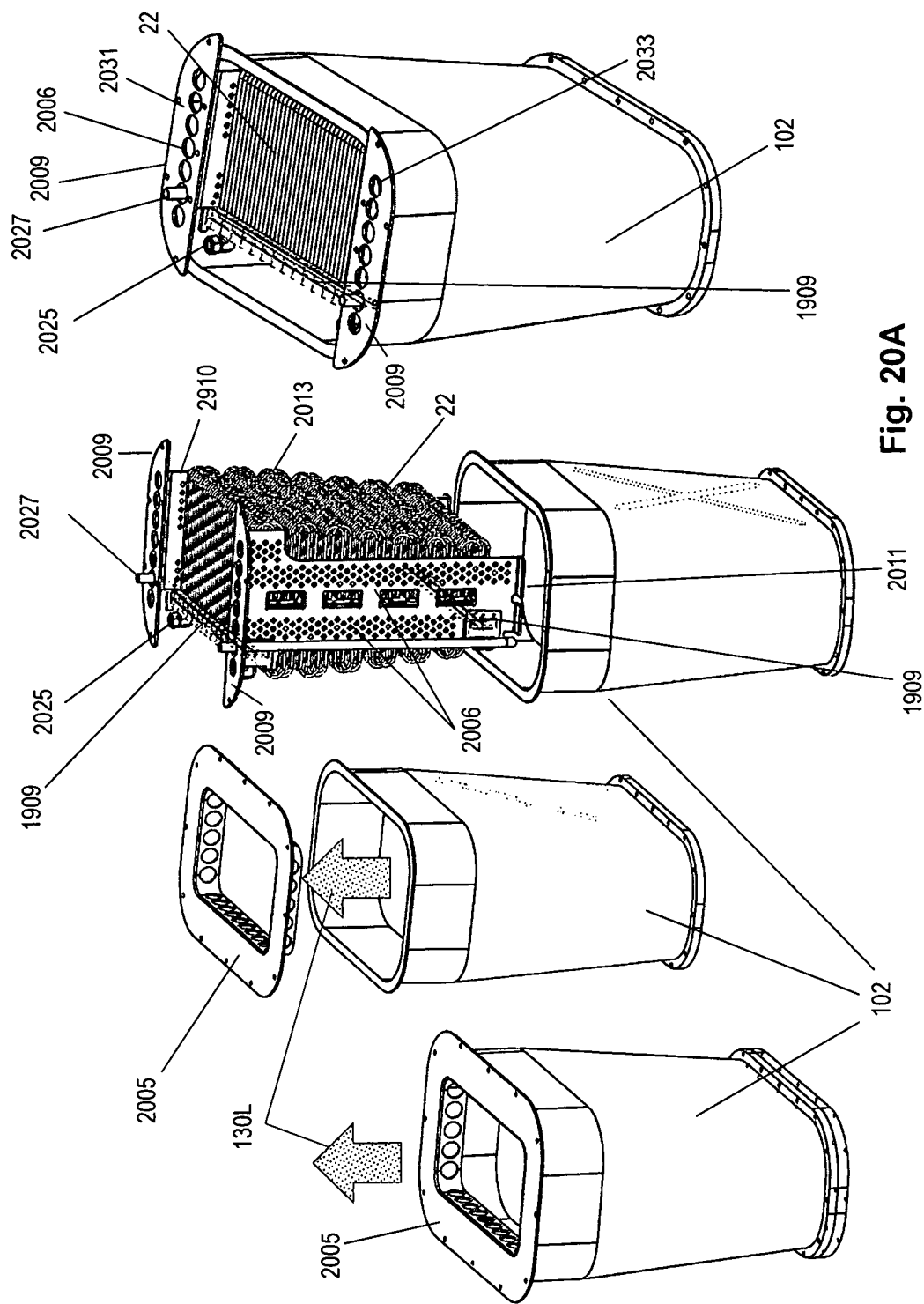
FIG. 20A illustrates a functional assembly diagram of an exemplary system for fitting a stack heat exchanger to an exhaust gas stack.

FIG. 20A illustrates an exemplary method for retrofitting exhaust gas stack 102 with a specialized or customized S-HEX 22. Exhaust gas stack 102 and S-HEX 22 can be the same as or similar to those previously described herein. S-HEX 22 is configured to non-invasively fit or retrofit exhaust gas stack 102 by mounting within the internal volume of exhaust gas stack 102. This can be done by removing an existing flange 2005 and inserting S-HEX 22 from the top. Top flanges 2009 and bottom flanges 2011 allow S-HEX 22 to align with the internals of exhaust gas stack 102 and mechanically couple for structural robustness, while preventing the heat exchanger from being ejected. Each structural component forming S-HEX 22 may be geometrically shaped to offer minimum fluid drag and may be equipped with holes 2006 to maximize turbulence while maintaining low back pressure on second fluid 130 flowing through the shell side (e.g., exhaust gas side) of the heat exchanger. S-HEX 22 may be configured to represent a series of tube bundles 2013 with tubes bent with a tapered shape so as to closely mimic the inner geometry of corresponding exhaust gas stack 102 shown in this Figure. The embodiment includes a top non-permanent sealing tube header 1909 and a bottom non-permanent sealing tube header 1909. Inlet and/or outlets 2025 and 2027 (symmetrical in this configuration), coupled to the tube header caps (not shown), enable sealed circulation of first fluid 29 (e.g., working fluid 29). When S-HEX 22 is lowered into exhaust gas stack 102, it can be secured through perforated symmetrical flanges or lids 2009 with holes 2006 with various diameters to decrease backpressure and acoustic signature.

Figure 20C:
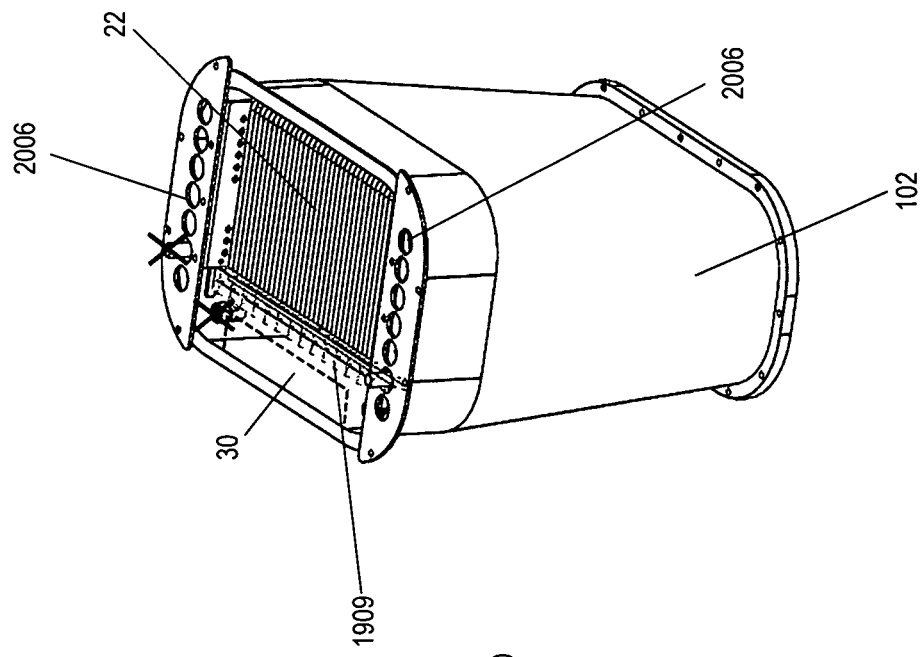
FIG. 20C illustrates another exemplary waste heat recovery and conversion system, where a PCU is embedded with an internal structure of the exhaust gas stack.
Figure 20B:
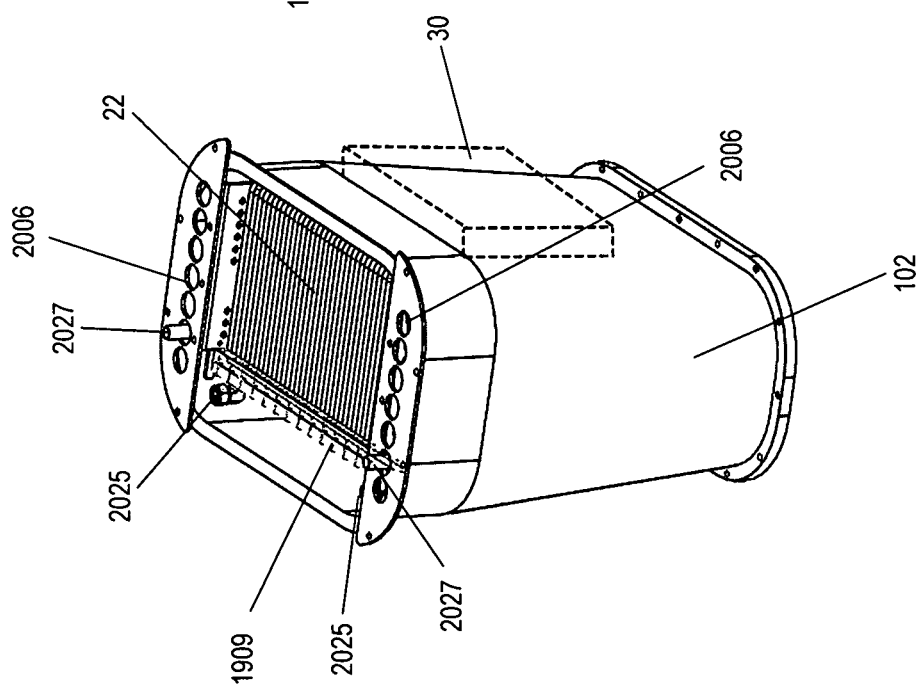
FIG. 20B illustrates a fully integrated waste heat recovery and conversion system, where a PCU is embedded with an external structure of the exhaust gas stack.

FIG. 20B shows exhaust gas stack 102 non-invasively retrofitted with S-HEX 22, where the inlet and outlet of the heat exchanger are coupled directly to PCU 30 integrated with exhaust gas stack 102. In this configuration, the components forming PCU 30 are disposed within exhaust gas stack 102 or positioned externally to exhaust gas stack 102, so as to minimize or eliminate the thermal-hydraulic connections between S-HEX 22 and components of PCU 30. FIG. 20B shows, as an example, PCU 30 configured to be coupled to the external structures of exhaust gas stack 102. FIG. 20C shows, as another example, PCU 30 configured to be fully integrated with the structures of gas exhaust stack 102. In this configuration, the surfaces of C-HEX 24 would be exposed to fourth fluid 112 by positioning and integrating C-HEX 24 on top or sides of exhaust gas stack 102, and the symmetrical inlets/outlets (e.g., 2027 and 2025) of S-HEX 22 would be eliminated as the heat exchanger header caps may be integrated with volute 122 of expander turbine 122 and the outlet of EX-HEX 25.

Figure 21B:
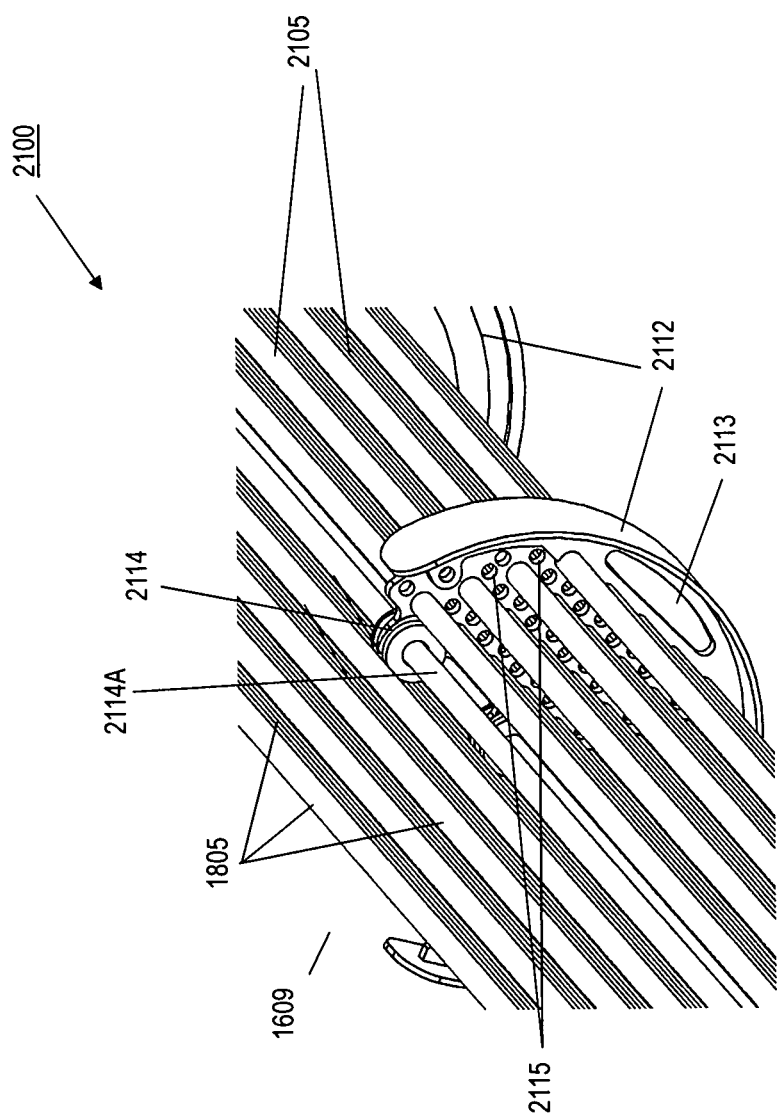
FIG. 21B illustrates a side perspective view of the internals of an exemplary manifold heat exchanger.
Figure 21C:
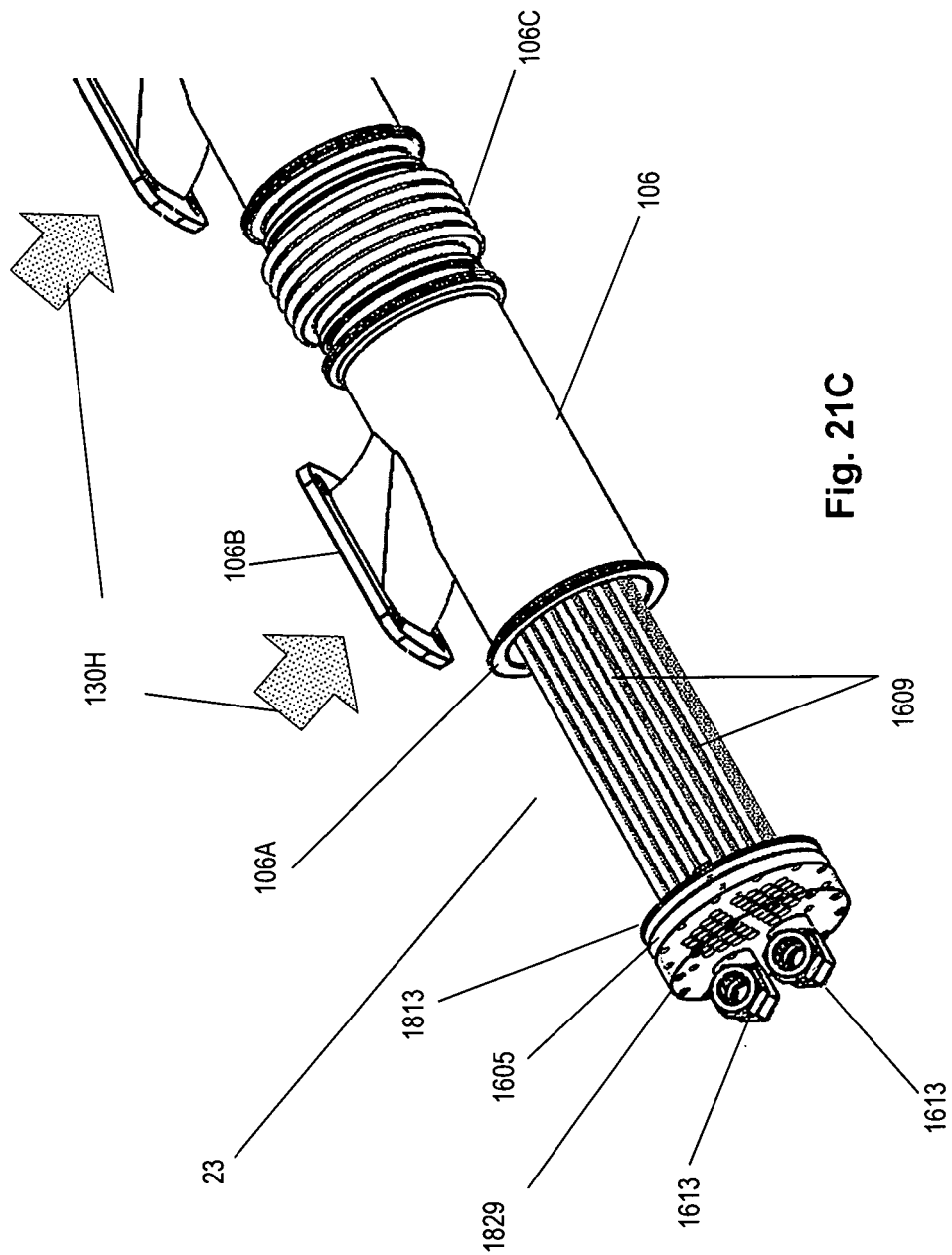
FIG. 21C illustrates a functional flow diagram of an exemplary process for fitting a manifold heat exchanger.

FIGS. 21A, 21B, and 21C illustrate an exemplary fitting (or retrofitting) of M-HEX 23 in exhaust gas manifold 106 in accordance with various aspects of the present disclosure. M-HEX 23 may be formed by tube bundle 1609, a non-permanent sealing header 1605, and interchangeable inlets/outlets 1613, each of which can be the same as or similar to that previously described herein. Additionally, M-HEX 23 can include sliding supporting vanes 2112. Sliding supporting vanes 2112 redirect the flow of hot second fluid 130H while circulating inside exhaust gas manifold 106. Additionally, sliding supporting vanes 2112 support tube bundle 1609. Sliding supporting vanes 2112 include suitable shapes and passages to maintain structural strength while minimizing backpressure. In this configuration, tubes 1805 forming tube bundle 1609 can freely expand and contract inside exhaust gas manifold 106 as this heat exchanger can slide inside exhaust gas manifold 106. A non-invasive retrofitting installation of M-HEX 23 configured as tube bundle 1609 includes sliding tube bundle 1609 and sealing flange 1605 inside exhaust gas manifold 106 without the need to modify exhaust gas manifold 106.

FIG. 21B illustrates an embodiment 2100 of tube bundle 1609 with details on sliding supporting vanes 2112. As shown, sliding supporting vanes 2112 may be configured to allow tubes 1805 to expand and contract by sliding over the inner walls of exhaust gas manifold 106. Sliding supporting vanes 2112 are mechanically coupled to a support tube 2114A by a lock 2114. To reduce backpressure while driving the flow of second fluid 130H, as shown in FIG. 21A, sliding supporting vanes 2112 may be equipped with pass-through holes 2013 and 2015.

FIG. 21C illustrates sealing header 1605 being non-invasively fitted in exhaust gas manifold 106 in accordance with various aspects of the present disclosure. An exemplary method of non-invasively recovering thermal energy from exhaust gases (e.g., second fluid 130) includes retrofitting straight portions of exhaust gas manifolds 106 with tube bundle 1609 and sealing exhaust gas manifold 106 with a seal 1813 and a compression clamp (not shown) or via any other flanging method. In this example, tube bundle 1609, representing M-HEX 23, may be non-invasively retrofitted by sliding it into exhaust gas manifold 106 from an end opposite to turbocharger 216 (FIG. 1A). Accordingly, as tube bundle 1609 is fully inserted inside exhaust gas manifold 106, a clamp coupling the end portion of exhaust gas manifold 106 and tube header 1605 exerts a compression force to compress seal 1813 of tube header 1605, thereby ensuring sealing of the shell side formed by the outer surfaces of tube bundle 1609 and the inner walls of exhaust gas manifold 106. As cylinders of engine 40, which are mechanically coupled to exhaust gas manifold 106 via port and flange 106B, move during operation and exhaust gas manifold 106 thermally expands and contracts, flexible members 106C allow exhaust gas manifold 106 to freely expand or contract. In this configuration, mechanical movement by exhaust gas manifold 106 does not cause stresses to tube bundle 1609 as the tubes are supported by sliding supporting vanes 2112 (shown in FIGS. 21A and 21B).

Figure 22:
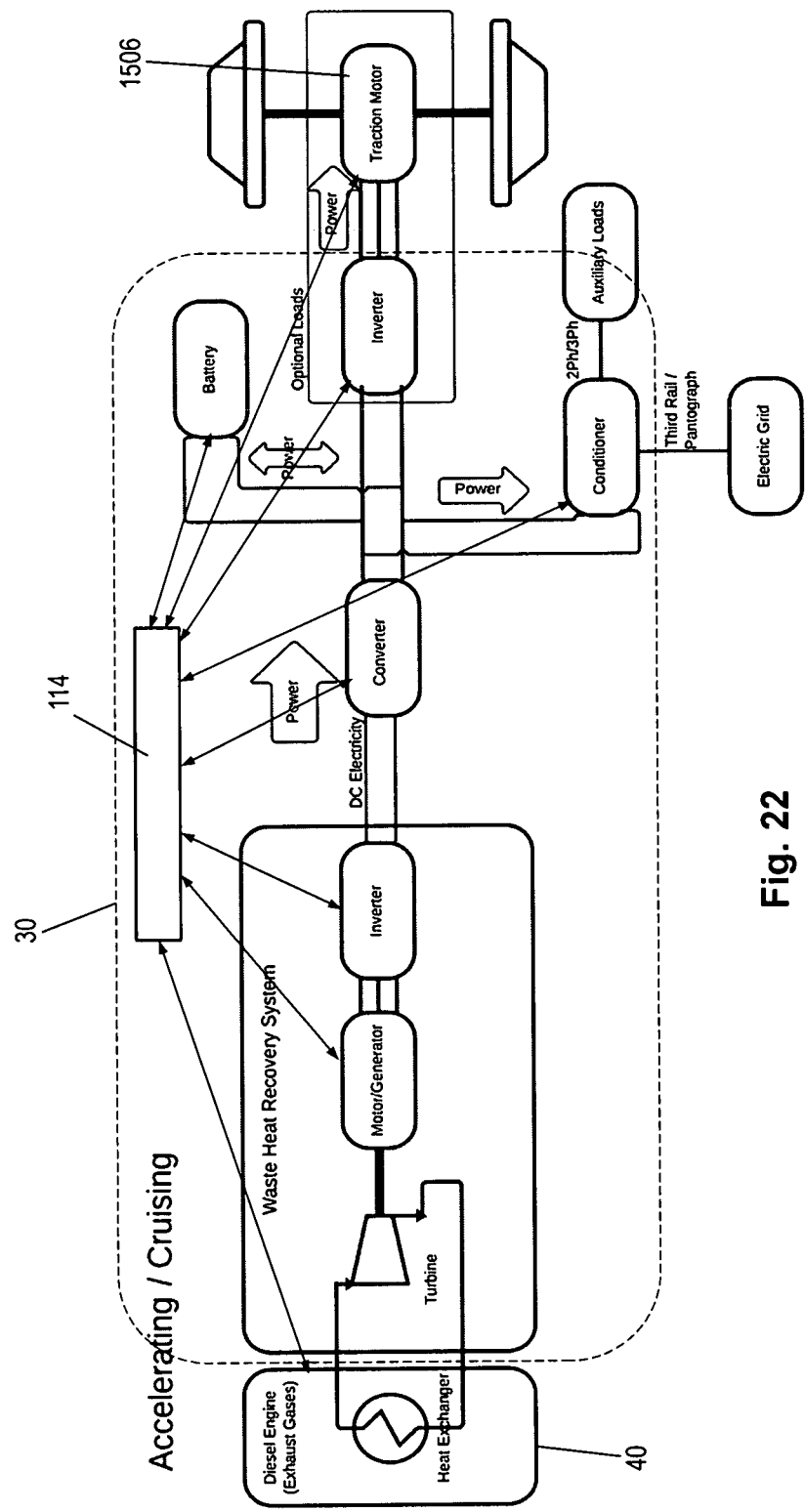
FIG. 22 illustrates an exemplary block diagram of a waste heat recovery system applied to a diesel-powered vehicle and showing the conversion of thermal energy source (i.e., exhaust gases) into conditioned electricity for electric power distribution to the power train, batteries bank, and the electric grid by a power management system during acceleration and at cruising conditions.
Figure 23:
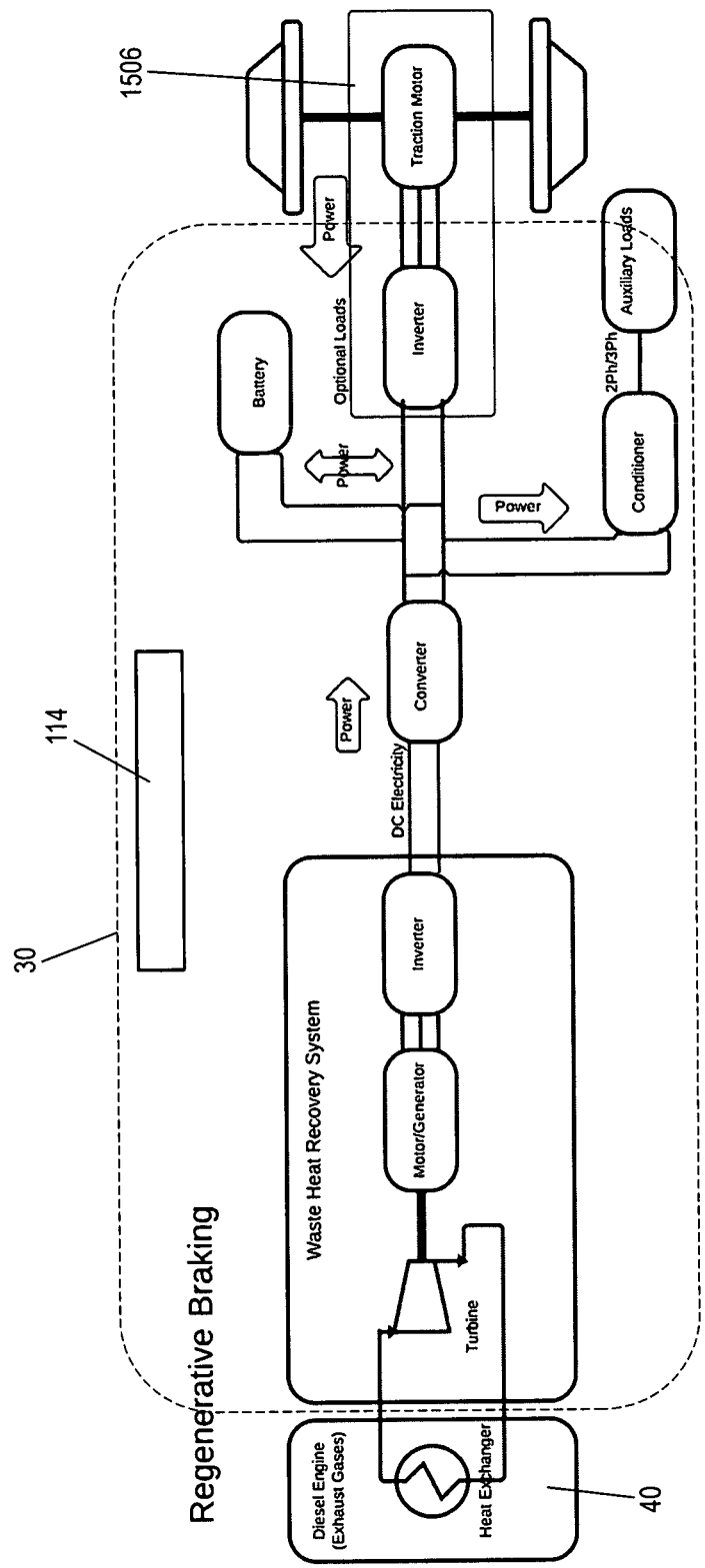
FIG. 23 illustrates exemplary block diagram of a waste heat recovery system applied to a diesel powered vehicle and showing the conversion of thermal energy source (i.e., exhaust gases) into conditioned electricity to support the power management system regulating power generated during braking to charge batteries, and to supply auxiliary loads.
Figure 24:
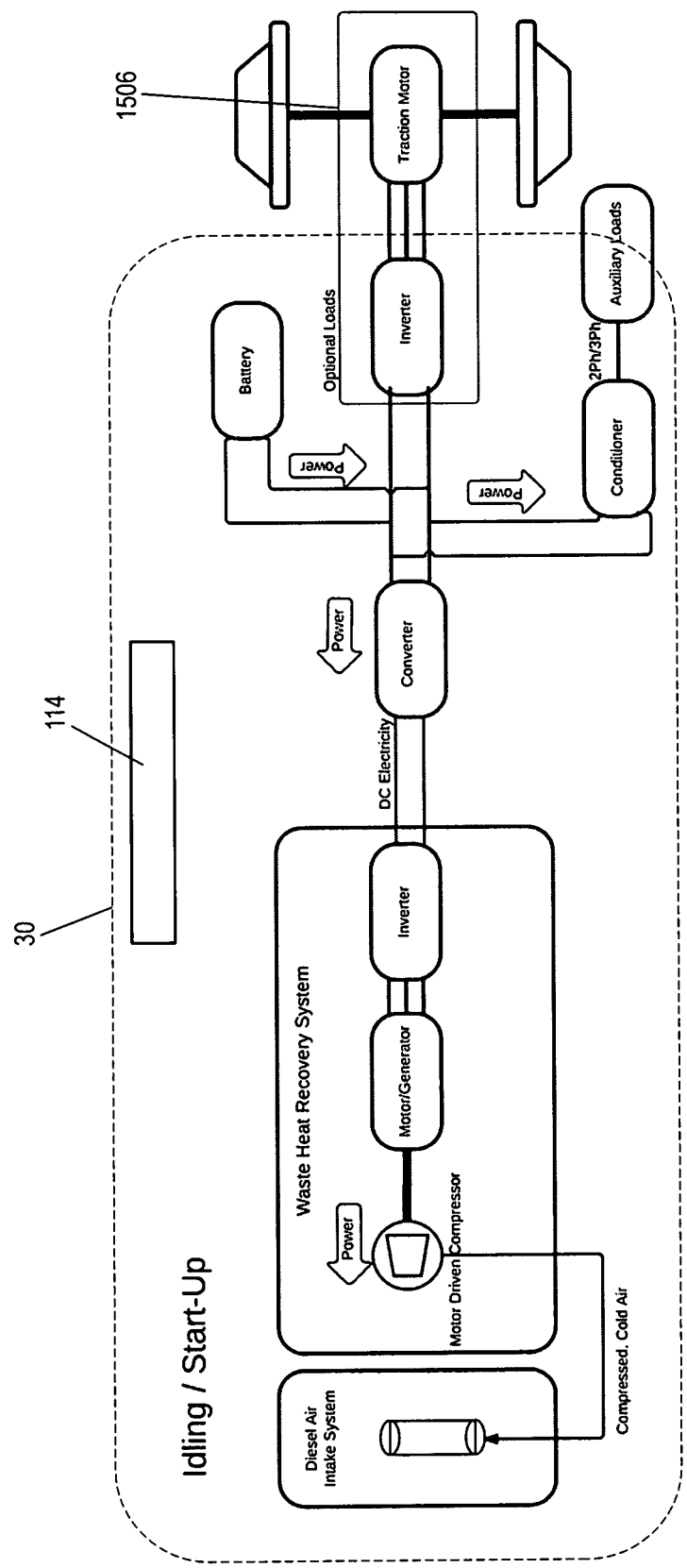
FIG. 24 illustrates an exemplary block diagram of a waste heat recovery system applied to a diesel powered vehicle and showing the conversion of conditioned electricity from batteries bank to drive compressors to reduce pollutant emissions by compressing engine intake air.

FIGS. 22-24 illustrate exemplary block diagrams showing "power flows" from a WHRC system (e.g., WHRC system 10) retrofitted on a combustion engine platform (e.g., locomotive, automotive, DMU, marine, and stationary) with PCU 30. PCU 30 is configured to hybridize and increase efficiency of the combustion engine by integrating electric storage systems (e.g., batteries) and including with the retrofit a customized traction motor (e.g., 1321, 1331, 1506) to augment the power of the combustion engine and to recover electric energy during regenerative braking.

FIG. 22 illustrates an exemplary embodiment of PCU 30 of a WHRC system of the present disclosure for automotive and rail applications, where the vehicle is operating in acceleration and cruise modes. As shown, under the accelerating/cruising operational modes, the arrow "Power" flows in the direction of the converter, where a portion of the recovered energy may be stored through battery banks, conditioned for electrical auxiliary loads operating with 2 or 3 phases or inverted to drive the traction motor (e.g., 1321, 1331, 1506). Power management is executed by controller 114.

FIG. 23 describes a block diagram summarizing the configuration of PCU 30 of a WHRC system of the present disclosure for automotive and rail applications, where the vehicle is decelerating or braking. Under these operational modes, the traction motor may be configured to operate as a generator to recharge batteries and/or to dispatch energy to auxiliary loads (or to the grid via, for example, third rail 1510 in FIG. 15C). Similarly, controller 114 may be configured to manage regenerative braking when the vehicle is decelerating.

FIG. 24 describes a block diagram summarizing the configuration of PCU 30 of a WHRC system of the present disclosure for automotive and rail applications, where the vehicle is idling or at start-up. The battery system of PCU 30 may be configured to provide power to augment engine air-intake and reduce pollutant emissions in agreement with the pollution reduction features of PCU 30 described herein.

Figure 25:
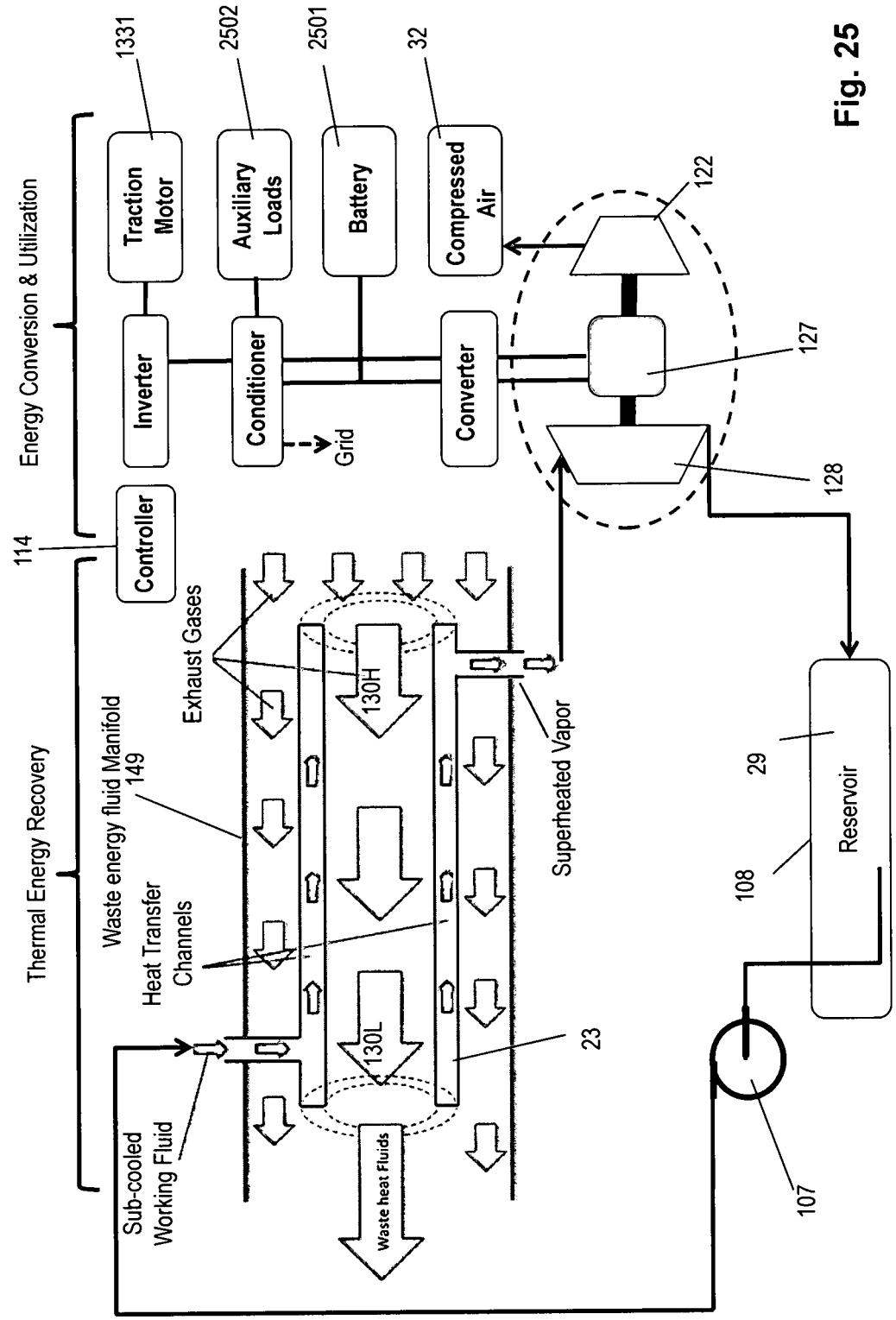
FIG. 25 illustrates an exemplary block diagram of a waste heat recovery system utilizing waste energy fluids flowing through a manifold or channel to convert the thermal energy recovered via heat exchangers to mechanical torque, electricity and compressed air where the converted energy is managed by an energy conversion and utilization system supported by PCUs.

FIG. 25 is a block diagram illustrating an exemplary configuration of PCU 30 for hybridization of vehicles and stationary platforms powered by combustion engines (e.g., engine 40) in accordance with various aspects of the present disclosure. The diagram shown in this Figure summarizes the thermal energy recovery components and the conversion electrical components for the generation and distribution of conditioned electrical power. FIG. 25 generalizes various operational modes (e.g., acceleration/cruising, deceleration and regenerative braking, and pollution reduction) via compressed air produced by the electrically driven turbo-compressor turbine 122. In this summarizing representation, the heat exchanger is represented by the cumulative effects of most of the heat exchangers described herein (e.g., Ex-HEX 25, IR-HEX 20, EC-HEX 21, S-HEX 22, M-HEX 23, and GEN-HEX 26). In this configuration, C-HEX 24 is integrated with fluid reservoir 108.

Figure 26:
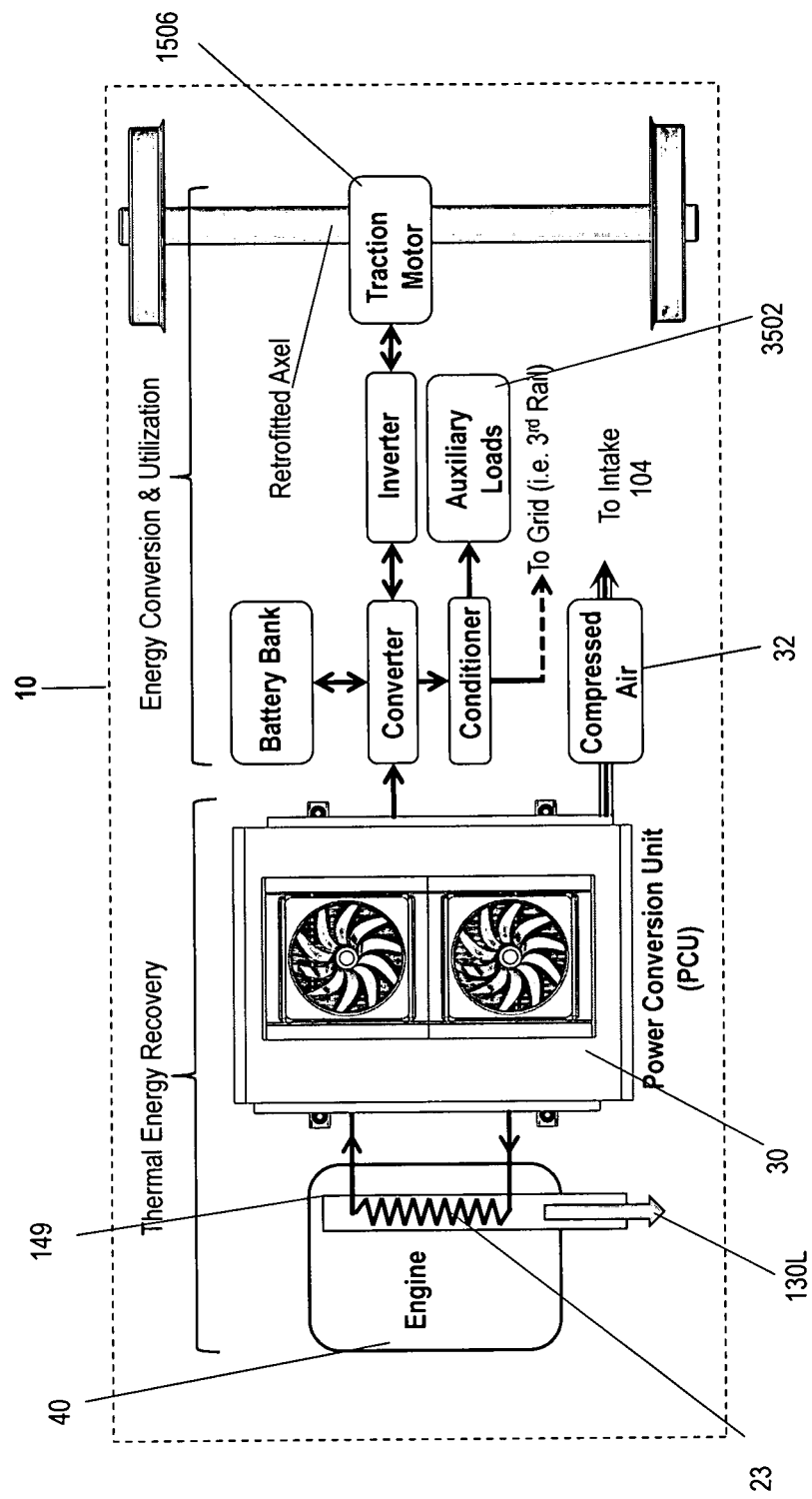
FIG. 26 illustrates a block diagram of an exemplary layout of the components forming a waste heat recovery and conversion system applied to a DMU vehicle (or any transport platform).

FIG. 26 illustrates a block diagram of an exemplary layout of WHRC system 10 comprising PCU 30, engine exhaust gas manifold 149, and other components described herein in accordance with various aspects of the present disclosure.

FIG. 27 illustrates a cluster of PCUs 30 retrofitted with a locomotive engine (e.g., engine 40), where each PCU 30 may be configured to provide power ratings that best match locomotive operations and duty cycle. In this configuration, PCU 30 may be configured to output maximum efficiencies at low, intermediate and maximum locomotive power settings. In this configuration, a given PCU may be optimized to operate with organic fluid as first fluid 29 to recover very low waste heat energy generated by engine 40 when idling and/or operating at low power settings. Another PCU may be configured to operate with a different organic fluid as first fluid 29, so as to maximize efficiency for waste heat energy characteristics matching locomotive engine operations at intermediate power settings. Remaining PCU 30 may be configured to operate with water as first fluid 29 to maximize the power recovery without the temperature limitations of organic fluids. Additionally, PCUs 30 forming the cluster may be configured to maximize total production of conditioned recovered electric energy by electronically and thermal-hydraulically transferring power from one PCU to another. In this configuration, at any moment, each individual PCU 30 may increase or decrease its electric power production proportionally to the amount of waste energy being recovered and depending on the real-time locomotive engine duty cycle. Additionally, in case of failure of any of PCUs in a cluster, remaining PCUs 30 may automatically reconfigure to increase electric production so as to not impact the net amount of electricity produced and the proportional fuel savings. Under this scenario, the faulty unit or any of the remaining operational unit may wirelessly alert a remote receiver so as to organize PCU swapping at the earliest and most convenient opportunity for the locomotive operators. Wireless communication transceivers 2701, which may be integrated with controller 114 or managed independently as stand-alone transceivers, may also be utilized to transmit technical data under standard data transmission protocols. Data collected by controller 114 and (wirelessly) transmitted by transmitters 2701 may include electricity/power rates, cumulative production rates (e.g., kWhr), thermodynamic parameters, vibration and wear and tear parameters, which may be utilized for real-time technical and economic performance evaluations and to plan refurbishing of replacing components prior to undergoing damages or failures.

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A system for recovering waste heat from a locomotive engine and converting the recovered waste heat into useable energy, the system comprising:
    a first heat exchanger comprising a stack heat exchanger mounted to an exhaust gas stack of the locomotive engine and configured to transfer heat from an exhaust gas flowing through the exhaust gas stack of the engine to a working fluid;
    a turbine expander driven by the working fluid;
    a power generator coupled to the turbine expander;
    a turbo-compressor turbine coupled to the power generator and configured to compress intake air;
    a fluid reservoir configured to contain the working fluid; and
    a fluid pump configured to pump the working fluid from the fluid reservoir to the first heat exchanger,
    wherein the first heat exchanger, the turbine expander, the fluid reservoir, and the fluid pump comprise a thermodynamic loop that drives the power generator and are controlled by a controller,
    wherein at least the turbine expander, the power generator, and the turbo-compressor turbine constitute a power conversion unit for converting the heat from the working fluid into useable energy, and
    wherein the power conversion unit is enclosed in a mounting enclosure mounted above the locomotive engine adjacent the exhaust gas stack.

2. The system of claim 1, wherein the turbo-compressor turbine is configured to be driven by the turbine expander and/or the power generator.

3. The system of claim 1, further comprising a plurality of vibration isolators mounted between the mounting enclosure and the engine.

4. The system of claim 1, wherein the power conversion unit further comprises a plurality of second heat exchangers configured to transfer heat from one or more components of the power conversion unit to the working fluid.

5. The system of claim 4, wherein the plurality of second heat exchangers comprise a condenser heat exchanger configured to exchange heat between the working fluid and air.

6. The system of claim 4 or 5, wherein the plurality of second heat exchangers comprise an expander heat exchanger configured to transfer heat between the working fluid before flowing into the fluid reservoir and the working fluid after flowing out of the fluid reservoir.

7. The system of claim 4, wherein the plurality of second heat exchangers comprise a generator heat exchanger configured to transfer heat from the power generator to the working fluid.

8. A system for recovering waste heat from a locomotive engine and converting the recovered waste heat into useable energy, the system comprising:
 a first heat exchanger configured to transfer heat from the engine to a working fluid;
 a turbine expander driven by the working fluid;
 a power generator coupled to the turbine expander;
 a turbo-compressor turbine coupled to the power generator and configured to compress intake air;
 a fluid reservoir configured to contain the working fluid; and
 a fluid pump configured to pump the working fluid from the fluid reservoir to the first heat exchanger,
 wherein the first heat exchanger, the turbine expander, the fluid reservoir, and the fluid pump comprise a thermodynamic loop that drives the power generator and are controlled by a controller,
 wherein at least the turbine expander, the power generator, and the turbo-compressor turbine constitute a power conversion unit for converting the heat from the working fluid into useable energy,
 wherein the power conversion unit is enclosed in a mounting enclosure that is configured to be mounted to a housing structure mounted above the locomotive engine, and
 wherein the power conversion unit comprises a power module heat exchanger configured to transfer heat from one or more electronic components of the controller to the working fluid.

9. The system of claim 1, further comprising an engine cooling heat exchanger mounted to an intake manifold of the engine and configured to transfer heat from an engine cooling system to the working fluid.

10. The system of claim 1, wherein the stack heat exchanger is mounted within an internal volume of the exhaust gas stack of the locomotive engine.

11. The system of claim 10, wherein the mounting enclosure is mounted to the exhaust gas stack.

12. The system of claim 1, wherein the first heat exchanger comprises a manifold heat exchanger mounted to an exhaust gas manifold of the engine and configured to transfer heat from the exhaust gas flowing through the exhaust gas manifold to the working fluid.

13. The system of claim 12, wherein the manifold heat exchanger is configured to fit inside the exhaust gas manifold of the engine.

14. The system of claim 12, wherein the manifold heat exchanger is located inside the mounting enclosure of the power conversion unit.

15. The system of claim 1, wherein the mounting enclosure comprises a plurality of vents configured to receive cooling air.

16. The system of claim 1, wherein the power conversion unit occupies at least a part of an engine compartment of the engine and protrudes externally from the engine compartment.

17. The system of claim 1, wherein the power conversion unit is mounted to a roof lid above an engine compartment of the engine.

18. The system of claim 1, wherein the housing structure comprises a reinforcing structure configured to support a weight of the power conversion unit.

* * * * *